United States Patent
Hong et al.

(10) Patent No.: US 12,149,331 B2
(45) Date of Patent: Nov. 19, 2024

(54) SATELLITE COMMUNICATION METHOD FOR PERFORMING ORCHESTRATION OF SATELLITE COMMUNICATION ASSETS AND APPARATUS THEREFOR

(71) Applicant: Intellian Technologies, Inc., Pyeongtaek-si (KR)

(72) Inventors: Sang Young Hong, Yongin-si (KR); Chan Kim, Hwaseong-si (KR)

(73) Assignee: Intellian Technologies, Inc., Pyeongtaek-si (KR)

( * ) Notice: Subject to any disclaimer, the term of this patent is extended or adjusted under 35 U.S.C. 154(b) by 0 days.

(21) Appl. No.: 18/446,907

(22) Filed: Aug. 9, 2023

(65) Prior Publication Data
US 2024/0031014 A1 Jan. 25, 2024

Related U.S. Application Data

(62) Division of application No. 17/365,016, filed on Jul. 1, 2021, now Pat. No. 11,764,865, which is a division
(Continued)

(30) Foreign Application Priority Data

Oct. 30, 2019 (KR) .................. 10-2019-0136877

(51) Int. Cl.
*H04B 7/185* (2006.01)
*H04B 7/06* (2006.01)
(Continued)

(52) U.S. Cl.
CPC ....... *H04B 7/18519* (2013.01); *H04B 7/0608* (2013.01); *H04B 7/0834* (2013.01);
(Continued)

(58) Field of Classification Search
CPC .......... H04B 7/185–195; H04B 7/0608; H04B 7/0834
See application file for complete search history.

(56) References Cited

U.S. PATENT DOCUMENTS

| 6,329,957 | B1 | 12/2001 | Shea et al. |
| 10,637,561 | B2 | 4/2020 | Cappaert et al. |

(Continued)

FOREIGN PATENT DOCUMENTS

| JP | 2002325009 A | 11/2002 |
| KR | 100590674 B1 | 6/2006 |

(Continued)

OTHER PUBLICATIONS

International Search Report and Written Opinion received for Application No. PCT/KR2019/015036 mailed on Jul. 22, 2020, 12 pages.

*Primary Examiner* — Raymond S Dean
(74) *Attorney, Agent, or Firm* — Mintz Levin Cohn Ferris Glovsky and Popeo, P.C.

(57) ABSTRACT

A satellite communication device and a method therefor are disclosed. The satellite communication device includes a first processor that generates schedule data about a satellite communication asset, a second processor that is located on a mobile vehicle spaced apart from the first processor and generates a control signal based on the schedule data, and a mediator that dynamically switches a link between at least one antenna and at least one modem based on the control signal.

5 Claims, 46 Drawing Sheets

Related U.S. Application Data of application No. 16/726,707, filed on Dec. 24, 2019, now Pat. No. 11,082,126.

(51) Int. Cl.
*H04B 7/08* (2006.01)
*H04W 24/10* (2009.01)

(52) U.S. Cl.
CPC ..... *H04B 7/18508* (2013.01); *H04B 7/18513* (2013.01); *H04B 7/18515* (2013.01); *H04W 24/10* (2013.01)

(56) References Cited

U.S. PATENT DOCUMENTS

| | | |
|---|---|---|
| 10,938,473 B1 | 3/2021 | Regada Alvarez et al. |
| 11,082,126 B2 | 8/2021 | Hong et al. |
| 11,764,865 B2 | 9/2023 | Hong et al. |
| 2003/0027568 A1 | 2/2003 | Berger |
| 2006/0025171 A1 | 2/2006 | Ly et al. |
| 2008/0102752 A1 | 5/2008 | Lee |
| 2008/0111738 A1 | 5/2008 | Han |
| 2011/0250926 A1 | 10/2011 | Wietfeldt et al. |
| 2013/0076567 A1 | 3/2013 | Chaudhary et al. |
| 2013/0294301 A1 | 11/2013 | Bitton et al. |
| 2014/0250469 A1 | 9/2014 | Locatori |
| 2014/0266927 A1 | 9/2014 | Qi et al. |
| 2014/0301493 A1 | 10/2014 | Govindswamy et al. |
| 2015/0263893 A1 | 9/2015 | Alexis et al. |
| 2017/0012698 A1* | 1/2017 | Laufer ............... H04B 7/18536 |
| 2017/0086255 A1 | 3/2017 | Jayasimha et al. |
| 2017/0094590 A1 | 3/2017 | Wang et al. |
| 2017/0264020 A1 | 9/2017 | Jackson et al. |
| 2018/0098247 A1 | 4/2018 | Gopal et al. |
| 2018/0138931 A1 | 5/2018 | Lung et al. |
| 2018/0183511 A1 | 6/2018 | Oga et al. |
| 2019/0044611 A1 | 2/2019 | Treesh |
| 2019/0305402 A1 | 10/2019 | Dalmia et al. |
| 2019/0393905 A1 | 12/2019 | Patel et al. |
| 2020/0008079 A1* | 1/2020 | Halsey ................. G08G 5/0039 |
| 2020/0028578 A1 | 1/2020 | Coleman et al. |
| 2020/0052778 A1 | 2/2020 | Oh et al. |
| 2021/0135748 A1 | 5/2021 | Hong et al. |
| 2021/0336691 A1 | 10/2021 | Hong et al. |

FOREIGN PATENT DOCUMENTS

| | | |
|---|---|---|
| KR | 1020070061102 A | 6/2007 |
| KR | 1020100103104 A | 9/2010 |
| KR | 101218714 B1 | 1/2013 |
| KR | 101230591 B1 | 2/2013 |
| KR | 1020180034593 A | 4/2018 |

\* cited by examiner

SATELLITE COMMUNICATION METHOD FOR PERFORMING ORCHESTRATION OF SATELLITE COMMUNICATION ASSETS AND APPARATUS THEREFOR

CROSS-REFERENCE TO RELATED APPLICATION(S)

This application is a divisional application of U.S. patent application Ser. No. 17/365,016, filed Jul. 1, 2021, which is a divisional application of U.S. patent application Ser. No. 16/726,707, filed Dec. 24, 2019, which claims the benefit of Korean Patent Application No. 10-2019-0136877, filed on Oct. 30, 2019, in the Korean Intellectual Property Office, which is incorporated herein by reference.

BACKGROUND

1. Field of the Invention

Example embodiments relate to a method and apparatus for performing orchestration of satellite communication assets.

2. Description of the Related Art

There are many limitations when moving mobile vehicles, for example, airplanes, ships, or land mobile vehicles, perform satellite communication with satellites. Particularly, there are more limitations to performing satellite communication on a ship moving at sea than performing satellite communication on land. This is because the ship moves by the waves and sails continuously.

Due to the nature of moving mobile vehicles such as airplanes, ships, and land mobile vehicles, although a plurality of satellite antennas, modems, and mediators are used, there is downtime in which connections with satellites are released due to a blockage or a problem departing from the range of the footprint.

During satellite communication, when connection with a satellite is released, persons manually manipulate communication assets to connect the communication assets to another trackable satellite. Thus, it is necessary for persons to perform continuous monitoring.

There is a need for a system for automatically managing satellite communication assets not to be disconnected from satellites without human intervention.

SUMMARY

A satellite communication technology of performing orchestration of satellite communication assets is provided.

According to an aspect, there is provided a satellite communication device including: a first processor that generates schedule data about a satellite communication asset, a second processor that is located on a mobile vehicle spaced apart from the first processor and generates a control signal based on the schedule data, and a mediator that dynamically switches a link between at least one antenna and at least one modem based on the control signal.

The schedule data may include a policy for the control signal, a condition for the control signal, and at least one instruction according to the policy and the condition.

The policy may include at least one of a priority for an orbit of a satellite, a priority for a communication band of the satellite, a priority for the at least one antenna, a priority for the at least one modem, and a service provider priority.

The condition may include at least one of a location of the second processor, a time, an environmental condition of the location, and a state of the satellite communication asset.

The at least one instruction may include a configuration parameter for the satellite communication asset.

The second processor may generate the control signal based on at least one of an orbit of a satellite, a communication band of the satellite, and a priority for the at least one antenna.

The second processor may manage an option file including a communication band of the at least one modem, configuration information of the at least one antenna and the at least one modem, a list of available satellites, locations of the satellites, and beam information used for satellite communication.

The mediator may monitor a state of the satellite communication asset to generate monitoring data and may transmit the monitoring data to the second processor.

The monitoring data may include at least one of a matrix corresponding to the link, a heartbeat signal for the satellite communication asset, and information about the satellite communication asset.

The second processor may update the control signal based on the monitoring data.

The second processor may generate an alarm when the monitoring data exceeds a threshold and may transmit the alarm to the first processor.

The second processor may determine whether to switch the link, based on a state of a first antenna included in the at least one antenna, may select a second antenna among the at least one antenna based on a policy and a condition included in the schedule data, when it is determined to switch the link, and may generate the control signal to connect a link between the second antenna and the at least one modem.

The second processor may select the second antenna based on properties and a state of the at least one antenna.

The second processor may select an antenna, which supports the same band as the first antenna and has the largest size, among the at least one antenna as the second antenna.

The second processor may determine whether to switch the link, based on a state of a first modem included in the at least one modem, may select a second modem among the at least one modem based on a policy and a condition included in the schedule data, when it is determined to switch the link, and may generate the control signal to connect a link between the second modem and the at least one antenna.

The second processor may select the second modem based on properties and a state of the at least one modem.

The second processor may select a modem, which supports the same service provider and the same band as the first modem, among the at least one modem, as the second modem.

The second processor may generate the control signal to change a role of the at least one antenna based on a time schedule of a satellite. The role may include primary, secondary, and backup roles.

The second processor may receive weather information and may generate the control signal to change the link based on the weather information.

The second processor may receive location information of the second processor and may generate the control signal to change the link based on the location information.

The second processor may receive location information of the second processor, may obtain a communication speed, service cost information, and a bandwidth of each of the plurality of service providers which provide satellite communication based on the location information, and may generate the control signal to change a service provider based on the communication speed, the service cost information, and the bandwidth.

The second processor may include an active processor and a standby processor. The mediator may include a first mediator and a second mediator. The active processor may generate the control signal to control one of the first mediator and the second mediator.

The mediator may include a first mediator and a second mediator. The second processor may generate the control signal such that the first mediator and the second mediator switch a link between different antennas.

The schedule data may include first schedule data and second schedule data. The control signal may include a first control signal and a second control signal. The at least one antenna may include a first antenna and a second antenna. The second processor may generate the first control signal based on the first schedule data and may generate the second control signal based on the second schedule data The mediator may connect the at least one modem and the first antenna based on the first control signal. The mediator may connect the at least one modem and the second antenna based on the second control signal.

The first processor may be located at a fixed point. The second processor may be located on each of a plurality of mobile vehicles. The first processor may transmit the schedule data to a plurality of second processors respectively located on the plurality of mobile vehicles.

According to another aspect, there is provided a satellite communication method including: generating schedule data about a satellite communication asset, generating a control signal based on the schedule data, on a mobile vehicle spaced apart from a location where the schedule data is generated, and dynamically switching a link between at least one antenna and at least one modem based on the control signal.

The schedule data may include a policy for the control signal, a condition for the control signal, and an instruction according to the policy and the condition.

The policy may include at least one of a priority for an orbit of a satellite, a priority for a communication band of the satellite, a priority for the at least one antenna, a priority for the at least one modem, and a service provider priority.

The condition may include at least one of a location where the control signal is generated, a time, an environmental condition of the location, and a state of the satellite communication asset.

The instruction may include a configuration parameter for the satellite communication asset.

The generating of the control signal may include generating the control signal based on at least one of an orbit of a satellite, a communication band of the satellite, a priority for the at least one antenna.

The generating of the control signal may include managing an option file including a communication band of the at least one modem, configuration information of the at least one antenna and the at least one modem, a list of available satellites, locations of the satellites, and beam information used for satellite communication.

The satellite communication method may further include monitoring a state of the satellite communication asset to generate monitoring data and transmitting the monitoring data.

The monitoring data may include at least one of a matrix corresponding to the link, a heartbeat signal for the satellite communication asset, and information about the satellite communication asset.

The generating of the control signal may include updating the control signal based on the monitoring data.

The satellite communication method may further include generating an alarm, when the monitoring data exceeds a threshold and transmitting the alarm.

The generating of the control signal may include determining whether to switch the link, based on a state of a first antenna included in the at least one antenna, selecting a second antenna among the at least one antenna based on a policy and a condition included in the schedule data, when it is determined to switch the link, and generating the control signal to connect a link between the second antenna and the at least one modem.

The selecting of the second antenna may include selecting the second antenna based on properties and a state of the at least one antenna.

The selecting of the second antenna based on the properties and the state of the at least one antenna may include selecting an antenna, which supports the same band as the first antenna and has the largest size, among the at least one antenna as the second antenna.

The generating of the control signal may include determining whether to switch the link, based on a state of a first modem included in the at least one modem, selecting a second modem among the at least one modem based on a policy and a condition included in the schedule data, when it is determined to switch the link, and generating the control signal to connect a link between the second modem and the at least one antenna.

The selecting of the second modem may include selecting the second modem based on properties and a state of the at least one modem.

The selecting of the second modem based on the properties and the state of the at least one modem may include selecting a modem, which supports the same service provider and the same band as the first modem, among the at least one modem, as the second modem.

The generating of the control signal may include generating the control signal to change a role of the at least one antenna based on a time schedule of a satellite. The role may include primary, secondary, and backup roles.

The generating of the control signal may include receiving weather information and generating the control signal to change the link based on the weather information.

The generating of the control signal may include receiving location information of a point where the control signal is generated and generating the control signal to change the link based on the location information.

The generating of the control signal may include receiving location information of a point where the control signal is generated, obtaining a communication speed, service cost information, and a bandwidth of each of the plurality of service providers which provide satellite communication based on the location information, and generating the control signal to change a service provider based on the communication speed, the service cost information, and the bandwidth.

The control signal may be generated by an active processor and a standby processor. The switching may be performed by a first mediator and a second mediator. The generating of the control signal may include generating the control signal to control one of the first mediator and the second mediator through the active processor.

The switching may be performed by a first mediator and a second mediator. The generating of the control signal may include generating the control signal such that the first mediator and the second mediator switch a link between different antennas.

The schedule data may include first schedule data and second schedule data. The control signal may include a first control signal and a second control signal. The at least one antenna may include a first antenna and a second antenna. The generating of the control signal may include generating the first control signal based on the first schedule data and generating the second control signal based on the second schedule data. The switching may include connecting the at least one modem and the first antenna based on the first control signal and connecting the at least one modem and the second antenna based on the second control signal.

The schedule data may be generated at a fixed point. The control signal may be generated on each of a plurality of mobile vehicles. The schedule data may be transmitted to each of the plurality of mobile vehicles.

According to another aspect, there is provided a satellite communication device including: a processor that generates a control signal based on schedule data and a mediator that dynamically switches a link between at least one antenna and at least one modem based on the control signal.

The processor may receive the schedule data from another processor spaced apart from the processor or generates the schedule data.

The processor may determine whether to switch the link, based on a state of a first antenna included in the at least one antenna, may select a second antenna among the at least one antenna based on a policy and a condition included in the schedule data, when it is determined to switch the link, and may generate the control signal to connect a link between the second antenna and the at least one modem.

The processor may select the second antenna based on properties and a state of the at least one antenna.

The processor may select an antenna, which supports the same band as the first antenna and has the largest size, among the at least one antenna, as the second antenna.

The processor may determine whether to switch the link, based on a state of a first modem included in the at least one modem, may select a second modem among the at least one modem based on a policy and a condition included in the schedule data, when it is determined to switch the link, and may generate the control signal to connect a link between the second modem and the at least one antenna.

The processor may select the second modem based on properties and a state of the at least one modem.

The processor may select a modem, which supports the same service provider and the same band as the first modem, among the at least one modem, as the second modem.

The processor may generate the control signal to change a role of the at least one antenna based on a time schedule of a satellite. The role may include primary, secondary, and backup roles.

The processor may receive weather information and may generate the control signal to change the link based on the weather information.

The processor may receive location information of the processor and may generate the control signal to change the link based on the location information.

The processor may receive location information of the processor, may obtain a communication speed, service cost information, and a bandwidth of each of the plurality of service providers which provide satellite communication based on the location information, and may generate the control signal to change a service provider based on the communication speed, the service cost information, and the bandwidth.

The processor may include an active processor and a standby processor. The mediator may include a first mediator and a second mediator. The active processor may generate the control signal to control one of the first mediator and the second mediator.

The mediator may include a first mediator and a second mediator. The processor may generate the control signal such that the first mediator and the second mediator switch a link between different antennas.

The schedule data may include first schedule data and second schedule data. The control signal may include a first control signal and a second control signal. The at least one antenna may include a first antenna and a second antenna. The processor may generate the first control signal based on the first schedule data and may generate the second control signal based on the second schedule data. The mediator may connect the at least one modem and the first antenna based on the first control signal. The mediator may connect the at least one modem and the second antenna based on the second control signal.

Additional aspects of example embodiments will be set forth in part in the description which follows and, in part, will be apparent from the description, or may be learned by practice of the disclosure.

BRIEF DESCRIPTION OF THE DRAWINGS

These and/or other aspects, features, and advantages of the invention will become apparent and more readily appreciated from the following description of example embodiments, taken in conjunction with the accompanying drawings of which:

FIG. 19 illustrates an example of a user experience interface (UXI) for setting an asset at a second processor;

FIG. 20 illustrates another example of a UXI for setting an asset at a second processor;

Figure 22:
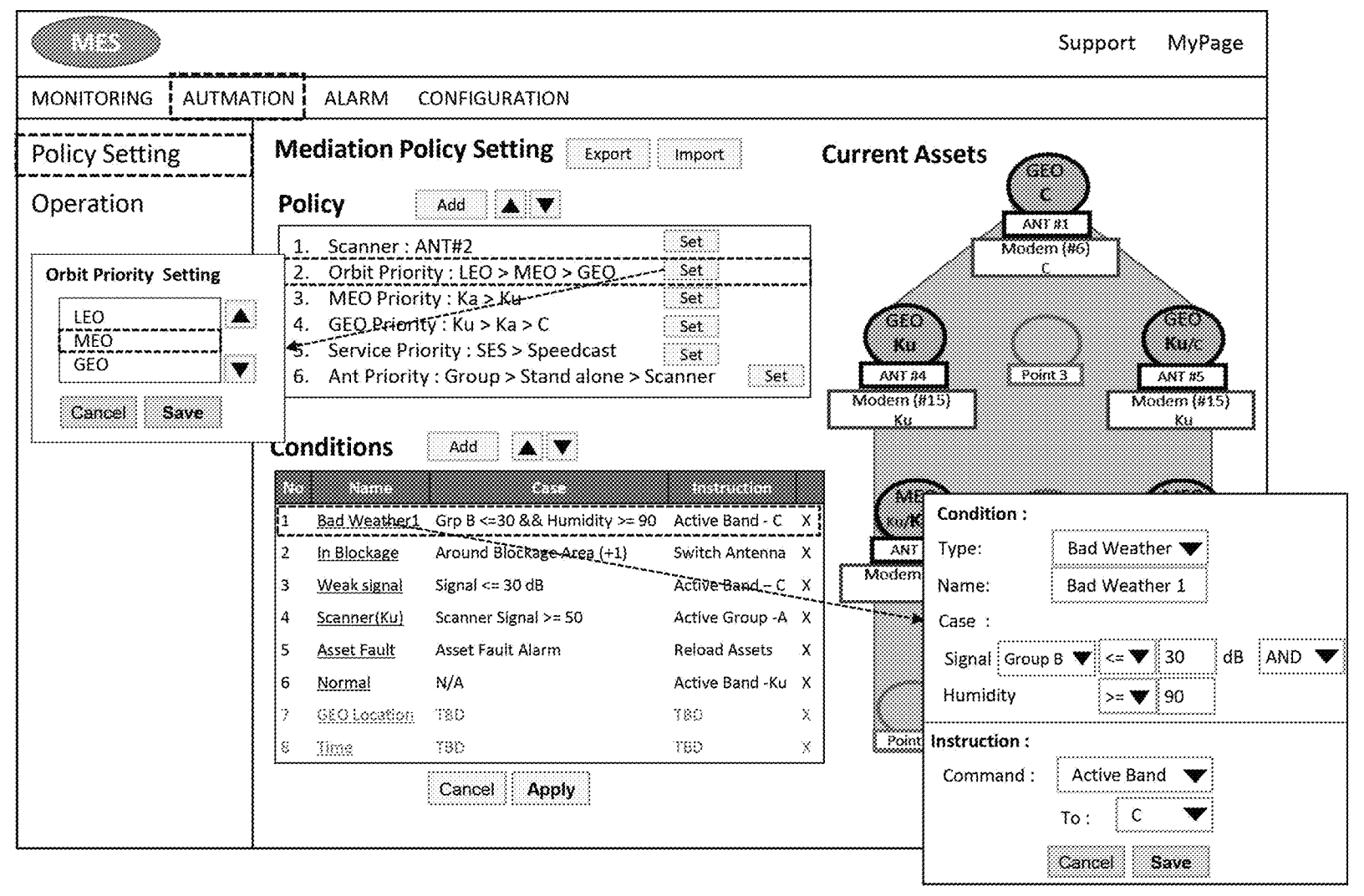

FIG. 22 illustrates an example of a UXI for a setting about mediation of a second processor;

DETAILED DESCRIPTION

Figure 1:
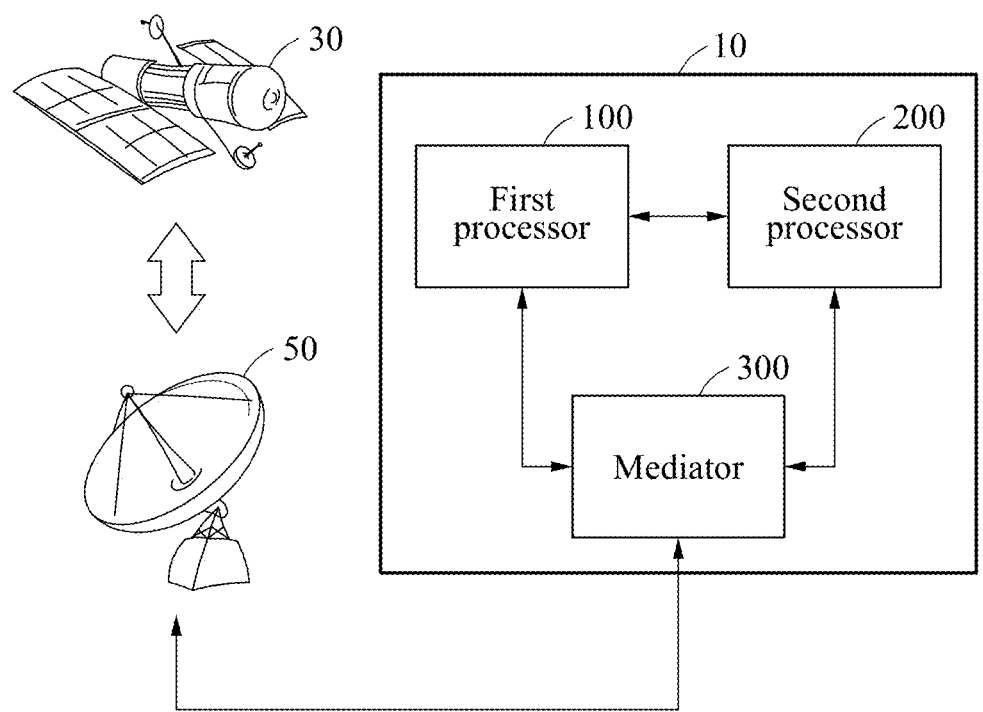
FIG. 1 is a block diagram schematically illustrating a satellite communication device according to an embodiment.

Hereinafter, embodiments are described in detail with reference to the accompanying drawings. With respect to the descriptions of the drawings, like reference numerals refer to like elements. Various modifications are possible in various embodiments described below. Embodiments described below are not intended to be limited to the implementation forms, and it is understood that it should include all modifications, equivalents, and/or alternatives according to various embodiments.

The terminology used herein is used to describe specified embodiments and is not intended to limit the embodiments. The expression of singular number includes the expression of plural number unless clearly intending otherwise in a context. In the specification, it should be understood that terms of 'comprise', 'have', and the like are to designate the existence of a feature disclosed in the specification, a numeral, a step, an input, a constituent element, a part, or a combination thereof, and do not previously exclude a possibility of existence or supplement of one or more other features, numerals, steps, inputs, constituent elements, parts, or combinations thereof.

Terms such as "first" and "second" may be used in describing various elements, but the above elements shall not be restricted to the above terms. The above terms are used only to distinguish one element from the other. For instance, the first element may be named the second element, and vice versa, without departing from the scope of claims of the inventive concept.

Unless otherwise defined herein, all the terms used herein, which include technical or scientific terms, may have the same meaning that is generally understood by a person skilled in the art. It will be further understood that terms, which are defined in a dictionary and commonly used, should also be interpreted as is customary in the relevant related art and not in an idealized or overly formal detect unless expressly so defined herein in various embodiments of the inventive concept.

Furthermore, in describing embodiments with reference to the accompanying drawings, the same reference denotations are assigned to the same elements without regard to the drawing denotations, a duplicated description thereof will be omitted. When it is determined that a detailed description of the related well-known technology unnecessarily blurs the gist of embodiments in describing embodiments, a detailed description thereof will be omitted.

The module in the specification may refer to hardware capable of performing a function and operation according to each name described in the specification, and may refer to a computer program code capable of performing a specific function and operation or may refer to an electronic storage medium, into which the computer program code capable of performing the specific function and operation is loaded, for example, a processor or a microprocessor.

In other words, the module may refer to a functional and/or structural combination of hardware for performing the technical scope of the inventive concept and/or software for running the hardware.

FIG. 1 is a block diagram schematically illustrating a satellite communication device according to an embodiment.

Referring to FIG. 1, a satellite communication device 10 may perform satellite communication using a satellite 30 and an antenna 50.

The satellite 30 may be an artificial device launched using a rocket to revolve around a planet such as the earth and may include an artificial satellite. The antenna 50 may include a satellite antenna. For example, the satellite antenna may include a parabolic antenna in the form of a dish to be designed to receive information from a communication satellite or transmit information to the communication satellite.

The satellite communication device 10 may control a connection with the antenna 50 to perform satellite communication without downtime which occurs as it is disconnected from the satellite 30.

In an example of FIG. 1, an embodiment is exemplified as the antenna 50 is located outside the satellite communication device 10. However, embodiments are not limited thereto. For example, if necessary, the satellite communication device 10 may contain the antenna 50 or may be embedded in the antenna 50. Furthermore, the antenna 50 may include one or more antennas.

The satellite communication device 10 may perform satellite communication using a plurality of satellites moving on a plurality of orbits and a plurality of frequency bands to seamlessly perform the satellite communication.

The satellite communication device 10 may include a first processor 100, a second processor 200, and a mediator 300. The first processor 100 and the second processor 200 may be implemented as separate processors or may be implemented as one processor. Furthermore, each of the first processor 100 and the second processor 200 is expressed as one, but may include a plurality of processors if necessary.

Each of the first processor 100 and the second processor 200 may include its memory (not shown). Each of the first processor 100 and the second processor 200 may process data stored in the memory. Each of the first processor 100 and the second processor 200 may execute a computer-readable code (e.g., software) stored in the memory and instructions caused by each of the first processor 100 and the second processor 200.

Each of the first processor 100 and the second processor 200 may be a data processing device implemented with hardware having a circuit which has a physical structure for executing desired operations. For example, the desired operations may include a code included in a program or instructions.

For example, the data processing device implemented with hardware may include a microprocessor, a central processing unit, a processor core, a multi-core processor, a multiprocessor, an application-specific integrated circuit, or a field programmable gate array (FPGA).

The first processor 100 and the second processor 200 may control the mediator 300 based on a state of a satellite communication asset and a satellite communication state to provide smooth satellite communication.

The satellite communication asset may include a hardware device constituting a satellite communication system. For example, the satellite communication asset may include the satellite 30, the antenna 50, a modem, the first processor 100, the second processor 200, and the mediator 300. The satellite communication asset may further include a mobile vehicle. For example, the mobile vehicle may include a ship, an airplane, a land mobile vehicle, or the like. The mobile vehicle may refer to various types of movement platforms capable of performing satellite communication with a satellite.

For example, the satellite communication asset may include the mobile vehicle and one or more mediators 300, the one or more antennas 50, and one or more modems, which are installed on each mobile vehicle. Properties of the satellite communication asset may be registered and managed as a hierarchical structure with the second processor 200, and the first processor 100 may share the same information. The properties of the satellite communication asset may include a model, a type, an antenna size, a supported band, and a service supported by the modem.

The first processor 100 may generate schedule data about the satellite communication asset.

The schedule data may include a parameter necessary to control the satellite communication asset. For example, the schedule data may include a policy for a control signal generated by the second processor 200, a condition for the control signal, and at least one instruction according to the policy and the condition. The instruction may include an instruction to connect an RF link between the antenna 50 and the modem.

The policy may include at least one of a priority for the orbit of the satellite 30, a priority for a communication band of the satellite 30, a priority for the at least one antenna 50, a priority for at least one modem, and a service provider priority. Furthermore, the policy may further include fixed link designation and priorities for respective policies.

The priority for the communication band of the satellite 30 may include a priority for a communication band for each orbit of the satellite 30. For example, the priority for the communication band may vary with an orbit of the satellite 30.

The condition may include at least one of a location of the second processor 200, a time, an environmental condition of the location of the second processor 200, and a state of the satellite communication asset. The environmental condition may include a weather state. For example, the weather state may include temperature, humidity, precipitation, a rainfall probability, a wind direction, a wind speed, atmospheric pressure, a wave height, and the like.

The state of the satellite communication asset may include a normal state and an abnormal state. The abnormal state may include a blockage, a fault, and the like.

For example, the orbit of the satellite 30 may include a geo-stationary earth orbit (GEO), a medium earth orbit (MEO), a low earth orbit (LEO). The communication band of the satellite 30 may include Ka band, Ku band, and C band.

The service provider may include an operator who provides a satellite communication service.

The at least one instruction may include a configuration parameter for the satellite communication asset. For example, the configuration parameter may include an environment configuration parameter for the satellite communication asset.

The second processor 200 may generate a control signal based on the schedule data. The second processor 200 may generate a control signal based on at least one of an orbit of the satellite 30, a communication band of the satellite 30, or a priority for the at least one antenna 50.

The second processor 200 may be located on the same location as the first processor 100 or on a mobile vehicle spaced apart from the first processor 100. The mobile vehicle may include an object moving in physical space. For example, the mobile vehicle may include an airplane, a ship, or a vehicle.

The second processor 200 may determine whether to switch a link between the at least one antenna 50 and the at least one modem, based on a state of a first antenna (not shown) included in the at least one antenna 50. The state of the antenna 50 may include a blockage of the antenna 50 or a fault state of the antenna 50.

When it is determined to switch the link between the at least one antenna 50 and the at least one modem, the second processor 200 may select a second antenna (not shown) among the at least one antenna 50 based on a policy and a condition included in the schedule data.

The second processor 200 may select the second antenna based on properties and a state of the at least one antenna 50. In detail, the second processor 200 may select an antenna, which supports the same band as the first antenna and has the largest size, among the at least one antenna 50, as the second antenna.

The second processor 200 may generate a control signal to connect a link between the second antenna and the at least one modem.

The second processor 200 may determine whether to switch a link based on a state of a first modem included in the at least one modem.

When it is determined to switch the link, the second processor 200 may select a second modem among the at least one modem based on a policy and a condition included in the schedule data.

The second processor 200 may select the second modem based on properties and a state of the at least one modem. In detail, the second processor 200 may select a modem, which supports the same service provider and the same band as the first modem, among the at least one modem, as the second modem.

The second processor 200 may generate a control signal to connect a link between the second modem and the at least one antenna 50.

The second processor 200 may generate a control signal to change a role of the at least one antenna 50 based on a time schedule of the satellite 30. The role of the antenna 50 may include primary, secondary, and backup roles.

The second processor 200 may receive weather information. The second processor 200 may generate a control signal to change a link between the at least one antenna 50 and the at least one modem based on the weather information.

The second processor 200 may receive weather information from a weather observation device. The weather information may include temperature, humidity, precipitation, a rainfall probability, a wind direction, a wind speed, atmospheric pressure, a wave height, and the like.

The second processor 200 may receive location information of the second processor 200. The second processor 200 may generate a control signal to change a link between at least one antenna 50 and the at least one modem based on the received location information.

For example, the second processor 200 may receive location information from a global positioning system (GPS). The second processor 200 may determine whether mobile vehicles communicating with the satellite 30 passes through a service coverage change area, based on the received location information, and, at this time, may generate a control signal to change a link between the at least one antenna 50 and the at least one modem.

The second processor 200 may receive location information of the second processor 200 and may obtain a communication speed, service cost information, and a bandwidth of each of a plurality of service providers which provide satellite communication based on the location information. For example, the service cost information may include a service charge for each of the plurality of service providers.

The second processor 200 may generate a control signal to change a service provider based on the communication speed, the service cost information, and the bandwidth of each of the plurality of service providers.

The second processor 200 may be implemented as a plurality of processors. The second processor 200 may be implemented as a single processor or the plurality of processors to control the plurality of mediators 300.

For example, the second processor 200 may include an active processor (not shown) and a standby processor (not shown).

The active processor may generate a control signal to control one of a first mediator (not shown) and a second mediator (not shown) included in the plurality of mediators 300.

The second processor 200 may generate a control signal such that the first mediator and the second mediator switch a link between different antennas.

The second processor 200 may manage an option file including a communication band of the at least one modem, configuration information of the at least one antenna and the at least one modem, a list including an available satellite 30, locations of the satellite 30, and beam information used for satellite communication. The option file may include a configuration file for the modem and a satellite database file.

In other words, the option file may include information about the satellite 30 and configuration information of the antenna 50 and the modem. The information about the satellite 30 may include a list including the satellite 30, a location of the satellite 30, and beam information used for satellite communication. The configuration information of the antenna 50 and the modem may include a block up converter (BUC) and low-noise block converter (LNB) configuration value.

The option file may be distributed by the service provider. The second processor 200 may download and manage the option file in advance from the service provider.

The mediator 300 may dynamically switch a link between the at least one antenna 50 and the at least one modem based on the control signal. The mediator 300 may switch a link between the modem and the antenna 50 based on a priority according to the schedule data and the control signal. The link between the modem and the antenna 50 may include a radio frequency (RF) link.

The switching of the link may include an operation for releasing a link (connection) between the antenna 50 and the modem, an operation for generating a connection, and an operation for changing a connection relationship.

The dynamic switching of the link between the at least one antenna 50 and the at least one modem may be performed through an instruction based on a policy and a condition. The policy, the condition, and the instruction may be corrected, added, or deleted according to a type, an operation environment, and an operation policy of a satellite communication asset.

The mediator 300 may monitor a state of the satellite communication asset to generate monitoring data. The mediator 300 may transmit the generated monitoring data to the second processor 200. The second processor 200 may transmit the received monitoring data to the first processor 100.

The mediator 300 may be implemented as a plurality of mediators. For example, the mediator 300 may include a first mediator and a second mediator.

The monitoring data may include at least one of a matrix corresponding to a link between the at least one antenna 50 and the at least one modem, a heartbeat signal for the satellite communication asset, and information about the satellite communication asset.

The heartbeat signal may refer to a signal indicating whether the satellite communication asset is normally operated.

The second processor 200 may update a control signal based on the monitoring data. The second processor 200 may generate a control signal based on the monitoring data without the schedule data received from the first processor 100.

For example, the second processor 200 may compare a policy with a condition based on the monitoring data and may transmit the generated control signal to the mediator 300.

When the monitoring data exceeds a threshold, the second processor 200 may generate an alarm. The second processor 200 may transmit the alarm to the first processor 100.

For example, the second processor 200 may analyze the monitoring data to generate an alarm indicating seriousness when there is no heartbeat signal or when the satellite communication asset breaks down.

The second processor 200 may generate an alarm indicating a warning when the monitoring data exceeds the threshold and may generate an alarm indicating seriousness when the warning alarm continues.

The second processor 200 may display the generated alarm on a display (not shown) and may automatically transmit the generate alarm to the first processor 100 and a person in charge.

The memory (not shown) may store instructions (or a program) executable by the first processor 100 and the second processor 200. For example, the instructions may include instructions for executing operations of the first processor 100 and the second processor 200 and/or an operation of each component of the first processor 100 and the second processor 200.

The memory may be implemented as a volatile memory or a non-volatile memory.

The volatile memory may be implemented as a dynamic random access memory (DRAM), a static RAM (SRAM), a thyristor RAM (T-RAM), a zero capacitor RAM (Z-RAM), or a twin transistor RAM (TTRAM).

The non-volatile memory may be implemented as an electrically erasable programmable read-only memory (EE-PROM), a flash memory, a magnetic RAM (MRAM), a spin-transfer torque-MRAM (STT-MARM), a conductive bridging RAM (CBRAM), a ferroelectric RAM (FeRAM), a phase change RAM (PRAM), a resistive RAM (RRAM), a nanotube RRAM, a polymer RAM (PoRAM), a nano floating gate memory (NFGM), a holographic memory, a molecular electronic memory device, or an insulator resistance change memory.

Figure 2:
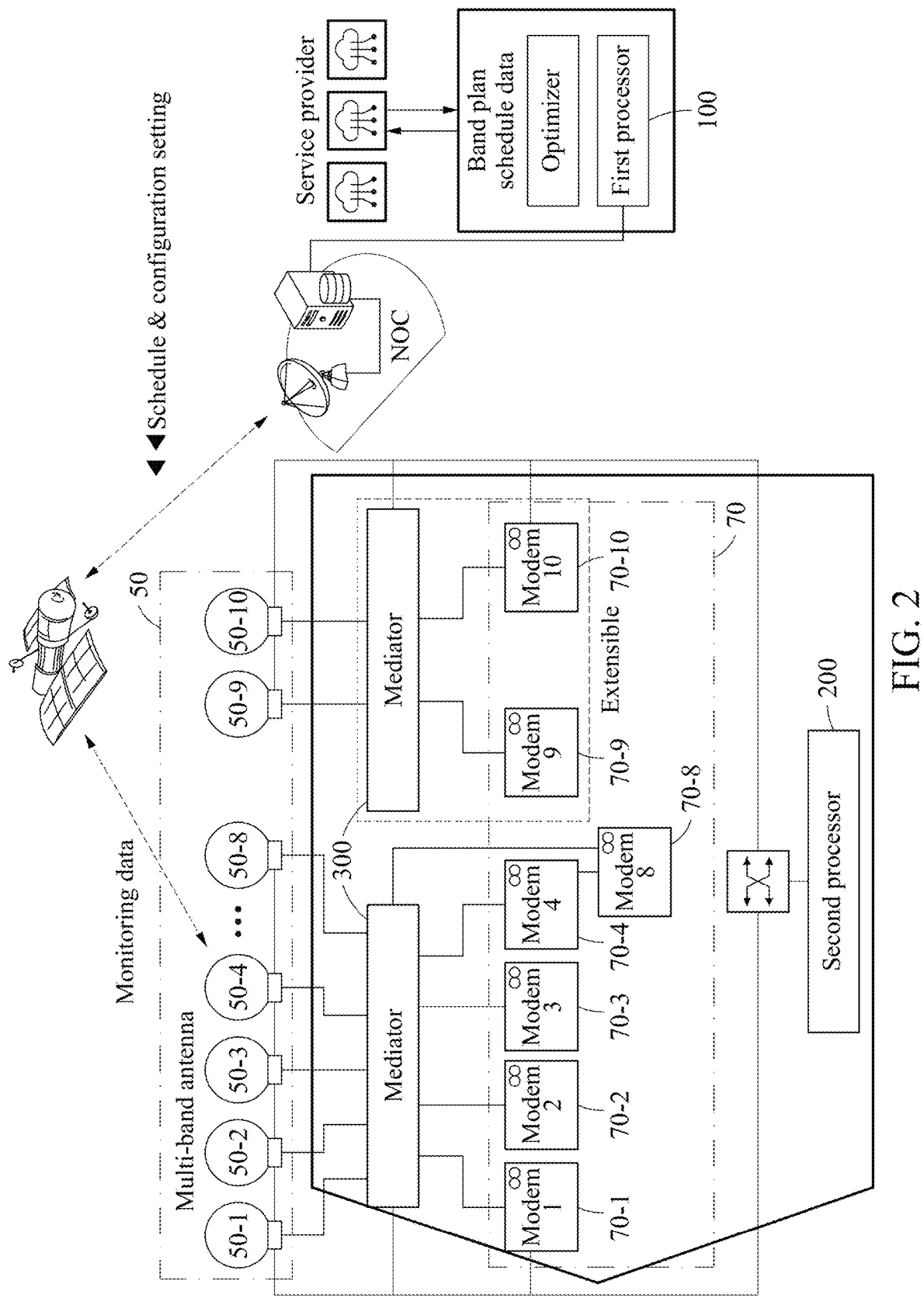
FIG. 2 illustrates in detail a satellite communication device shown in FIG. 1.

FIG. 2 is a detailed drawing of a satellite communication device shown in FIG. 1.

Referring to FIG. 2, a satellite communication device 10 shown in FIG. 1 may include a first processor 100, a second processor 200, and a mediator 300. Furthermore, the satellite communication device 10 may further include an antenna 50 and a modem 70.

The mediator 300 may be plural in number. The antenna 50 may include a plurality of antennas 50-1 to 50-10. The plurality of antennas 50-1 to 50-10 may be implemented as a multi-band antenna. Furthermore, the modem 70 may include a plurality of modems 70-1 to 70-10.

The first processor 100 may generate schedule data and may transmit the generated schedule data to the second processor 200. The first processor 100 may transmit and receive information with a satellite 30 through a network operations center (NOC).

The schedule data may include an instruction according to a condition and a policy. The condition may include a detailed response method when a specific situation occurs while satellite communication is performed. For example, the condition may include a condition about whether to switch satellite communication to any band when a communication signal of a specific band is disconnected.

As described below, the instruction may include a command to connect the antenna 50 and the modem 70, a command to change a role of an antenna, and a command to transmit an option file to the modem 70 if necessary. The role of the antenna 50 may include primary, secondary, and backup roles.

The modem 70 may include a separate modem which supports a service provider or a band. When the band is changed and when there is no modem which supports a band to be changed, the second processor 200 may change a configuration setting of the modem 70 through the option file such that the one modem 70 supports a plurality of bands.

When the schedule data is changed, the first processor 100 may transmit the changed schedule data to the second processor 200.

The first processor 100 may include a connectivity management system (CMS). The CMS may be implemented as a server.

The first processor 100 may be located in the center (e.g., an Internet data center (IDC) or a cloud). The first processor 100 may manage operating mobile vehicles and satellite communication assets of the mobile vehicles and may generate and distribute schedule data to efficiently use a satellite network through an optimizer. Furthermore, the first processor 100 may monitor a satellite communication asset of each mobile vehicle and a network operation state.

The first processor 100 may integrally manage a plurality of mobile vehicles or may separately manage the plurality of mobile vehicles for each fleet.

The first processor 100 may monitor the second processor 200 and the mediator 300 and may generate and distribute a condition for maintaining optimal satellite communication. The first processor 100 may generate a policy for controlling the antenna 50, the modem 70, the second processor 200, and the mediator 300 and an option file.

For example, when the second processor 200 is installed on a mobile vehicle, the first processor 100 may monitor situations of mobile vehicles in the center (e.g., on-board or shore-side) and may generate a command for each condition for maintaining optimal satellite communication using assets, such as the antenna 50 and the modem 70, depending on a path of the mobile vehicle, a time, and an environmental condition in which the mobile vehicle is.

The first processor 100 may distribute the generated command for each condition to each mobile vehicle and may manage the generated command for each condition. The first processor 100 may monitor a satellite communication state of each mobile vehicle and the satellite communication device 10.

The first processor 100 may define a response method, according to an asset of each mobile vehicle and an environmental condition for each movement path, as schedule data. The first processor 100 may distribute the schedule data to each mobile vehicle and may manage a plurality of mobile vehicles to follow a schedule defined in the schedule data. The first processor 100 may generate schedule data for the plurality of mobile vehicles based on a condition. The first processor 100 may perform policy management based on a multi-level priority.

The first processor 100 may generate schedule data based on an optimizer. The optimizer may optimize a policy. The optimizer may transmit and receive information about a product purchased by a service provider, the amount of used data, or the like with the service provider. The information about the purchased product may include a purchase price, the amount of purchased data, a bandwidth, and a speed.

The optimizer may define costs, a speed, a quota, or the like based on a contract between service providers, and the first processor may generate schedule data based on the costs, the speed, the quota, or the like defined by the optimizer.

The first processor 100 may provide a dashboard monitoring system based on a graphic user interface (GUI) using a map. The first processor 100 may provide an alarm based on a fault and a threshold.

The first processor 100 may manage a satellite communication asset (e.g., a mobile vehicle, the antenna 50, the modem 70, the mediator 300, and a dual data center). The dual data center may refer to a server implemented to have the same hardware configuration in two or more sets. A service may be maintained through the dual data center, although a mobile vehicle is flooded. The dual data center may include high availability (HA) or server duplexing.

The first processor 100 may manage a firmware and software update.

The first processor 100 may manage a configuration setting and an option file and may optimize a data consumption planner to generate the optimized policy.

The option file may include configuration setting information according to a service provider or a satellite communication band. The second processor 200 may receive schedule data and may generate a control signal for controlling the mediator 300. The second processor 200 may include a mediation edge server (MES). The MES may include a server.

The second processor 200 may be located on each mobile vehicle to receive schedule data from the first processor 100. The second processor 200 may generate schedule data itself. In other words, the second processor 200 may generate the schedule data and may generate a control signal based on the generated schedule data.

The second processor 200 may receive schedule data from another processor (e.g., the first processor 100) spaced apart from the second processor 200, or the second processor 200 may directly generate schedule data.

The second processor 200 may generate an instruction to dynamically switch an RF link between the antenna 50 and the modem 70 depending on a policy and a condition based on the schedule data. The second processor 200 may transmit a control signal according to the instruction together with a configuration parameter to the mediator 300.

The second processor 200 may manage a configuration parameter including a list of the antenna 50, the modem 70, the mediator 300, and available satellites, locations of the satellites, and satellite beam information.

The second processor 200 may download a policy and an option file from the first processor 100. The second processor 200 may apply a local policy to override a side policy on a server.

The second processor 200 may be installed on a mobile vehicle to communicate with the first processor 100. For example, the second processor 200 may be installed on a ship.

When the second processor 200 is installed on the mobile vehicle, it may register and manage a satellite communication asset installed on the mobile vehicle. The second processor 200 may receive schedule data and a command for each condition from the first processor 100. The second processor 200 may generate a control signal for the mediator 300 based on the received schedule data and a condition.

The second processor 200 may generate a control signal for controlling a satellite communication asset based on the instruction included in the schedule data.

The second processor 200 may edit a schedule for the satellite communication asset, a condition, and a response method to a situation in which the satellite communication asset is. As a result, the second processor 200 may automatically control an RF link of the mediator 300 depending on the schedule data and the condition to maintain optimal satellite communication connectivity. The second processor 200 may provide a manual RF switching function to the mediator 300.

The second processor 200 may perform control and monitoring to control to connect an asset for satellite communication by controlling an RF switching operation through control of the mediator 300 and to maintain a seamless optimal network state.

The second processor 200 may control on-board assets through a user interface (UI). The second processor 200 may provide a function of manually controlling assets. For example, the on-board assets may include assets on a mobile vehicle.

The second processor 200 may periodically transmit the result of monitoring a satellite communication asset, including a log, to the first processor 100. The second processor 200 may set a period where the monitored result is transmitted. The second processor 200 may request a satellite communication asset including the mediator 300 to collect monitoring data.

The second processor 200 may provide a GUI-based monitoring system and may provide a monitoring system based on a dashboard. A description will be given in detail of a user interface with reference to FIGS. 19 and 27.

The mediator 300 may switch a connection between the antenna 50 and the modem 70 based on the control signal. The mediator 300 may support the connection between the antenna 50 and the modem 70 depending on the condition included in the schedule data.

The mediator 300 may include an RF switch. The mediator 300 may dynamically connect an RF signal between the antenna 50 and the modem 70 dependently or independently of the control signal generated by the second processor 200.

The mediator 300 may support a connection between the plurality of antennas 50 and the plurality of modems 70. For example, the mediator 300 may control a connection between the eight antennas 50 and the eight modems 70. The number of the antennas 50 and the modems 70 controlled by the mediator 300 may be less than eight or may be greater than or equal to eight if necessary.

When operating in a passive mode, the mediator 300 may perform a passive mediation function depending on a command received from the second processor 200. When operating in an active mode, the mediator 300 may perform an active mediation function according to its own algorithm without control of the second processor 200.

The mediator 300 and the antenna 50 or the mediator 300 and the modem 70 may be connected by a cable. The mediator 300 may switch a link between the antenna 50 and the modem 70 depending on the control signal received from the second processor 200 or its own internal rule.

The mediator 300 may monitor state information of a satellite communication asset connected with the mediator 300 and may transmit the monitored result to the second processor 200.

Figure 3:
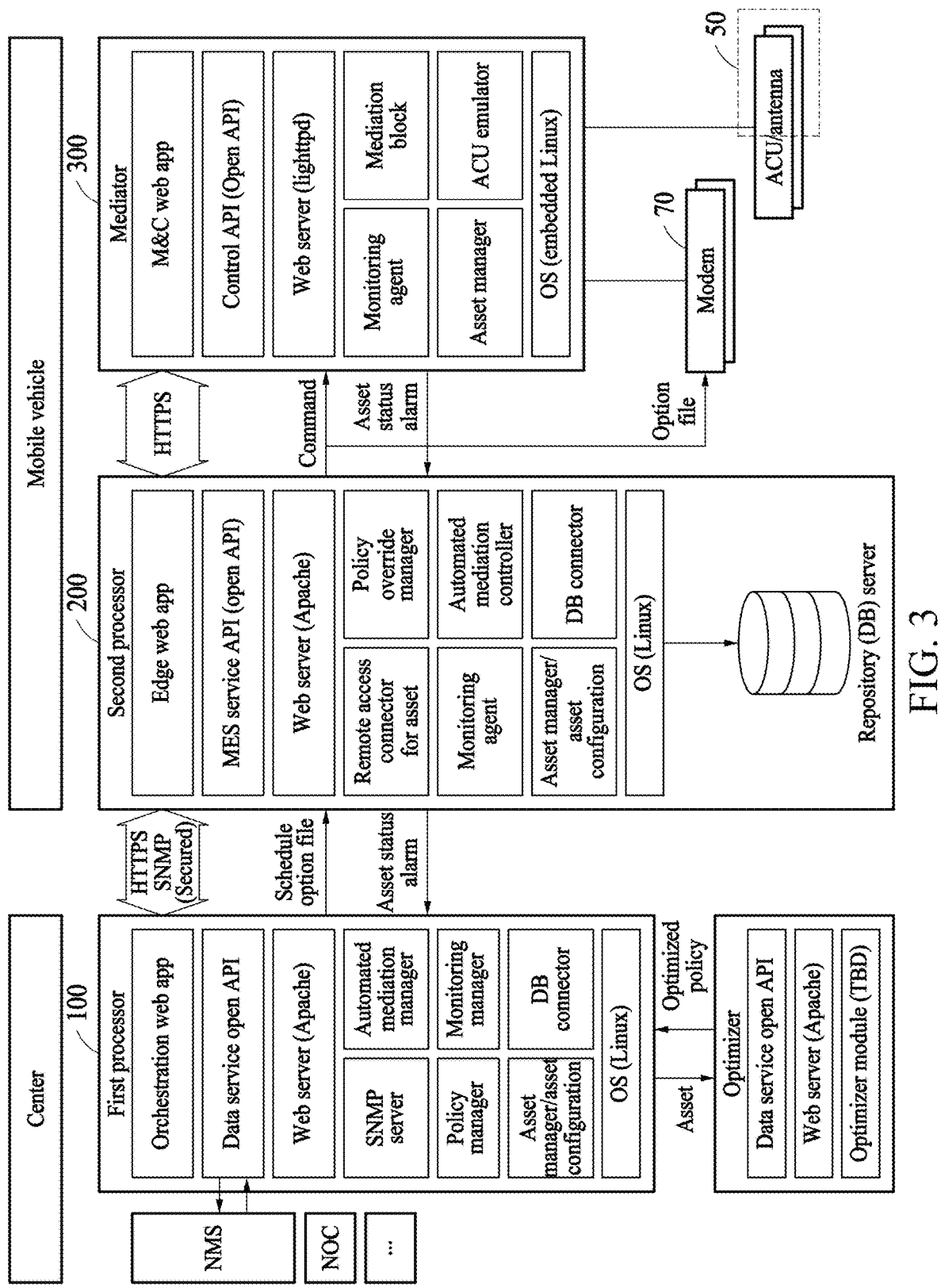
FIG. 3 illustrates a structure of a satellite communication device shown in FIG. 1.

FIG. 3 is a drawing illustrating a structure of a satellite communication device shown in FIG. 1.

Referring to FIG. 3, a first processor 100 and a second processor 200 may be located on different places. For example, the first processor 100 may be located on-board the vehicle or at the shore side, and the second processor 100 may be located on a mobile vehicle.

The first processor 100 may include a plurality of modules. For example, the first processor 100 may include an orchestration web app, a data service open application programming interface (API), a web server (e.g., apache), a simple network management protocol (SNMP) server, an automated mediation manager, a policy manager, a monitoring manager, an asset manager/asset configuration, a database (DB) connector, and an operational system (OS) (e.g., Linux).

The first processor 100 may transmit and receive information with a network management system (NMS) or an NOC. The first processor 100 may transmit and receive information with the second processor 200 through a hypertext transfer protocol over secure socket layer (HTTPS) or an SNMP.

For example, the first processor 100 may transmit schedule data and an option file to the second processor 200. The first processor 100 may receive an asset status alarm from the second processor 200.

The first processor 100 may transmit information about an asset to an optimizer. The first processor 100 may receive an optimized policy from the optimizer.

The optimizer may include a data service open API, a web server (e.g., apache), and an optimizer module.

The second processor 200 may include a plurality of modules. The second processor 200 may include an edge web app, an MES service API (open API), a web server (apache), a remote access connector for an asset, a policy override manager, a monitoring agent, an automated mediation controller, an asset manager/asset configuration, a DB connector, an OS (e.g., Linux), and a repository (DB) server.

The second processor 200 may transmit and receive information with the first processor 100 and a mediator 300. The second processor 200 may receive schedule data and an option file from the first processor 100 and may transmit an asset status alarm to the first processor 100.

The second processor 200 may transmit a command to the mediator 300 through an HTTPS. The second processor 200 may transmit an option file to a modem 70. The second processor 200 may receive an asset status alarm from the mediator 300. The command may include a command to connect an antenna 50 and the modem 70.

The mediator 300 may include a plurality of modules. The mediator 300 may include a monitoring & control (M&C) web app, a control API (open API), a web server (e.g., lighttpd), a monitoring agent, a mediation block, an asset manager, an antenna control unit (ACU) emulator, and an OS (e.g., an embedded Linux).

Figure 4:
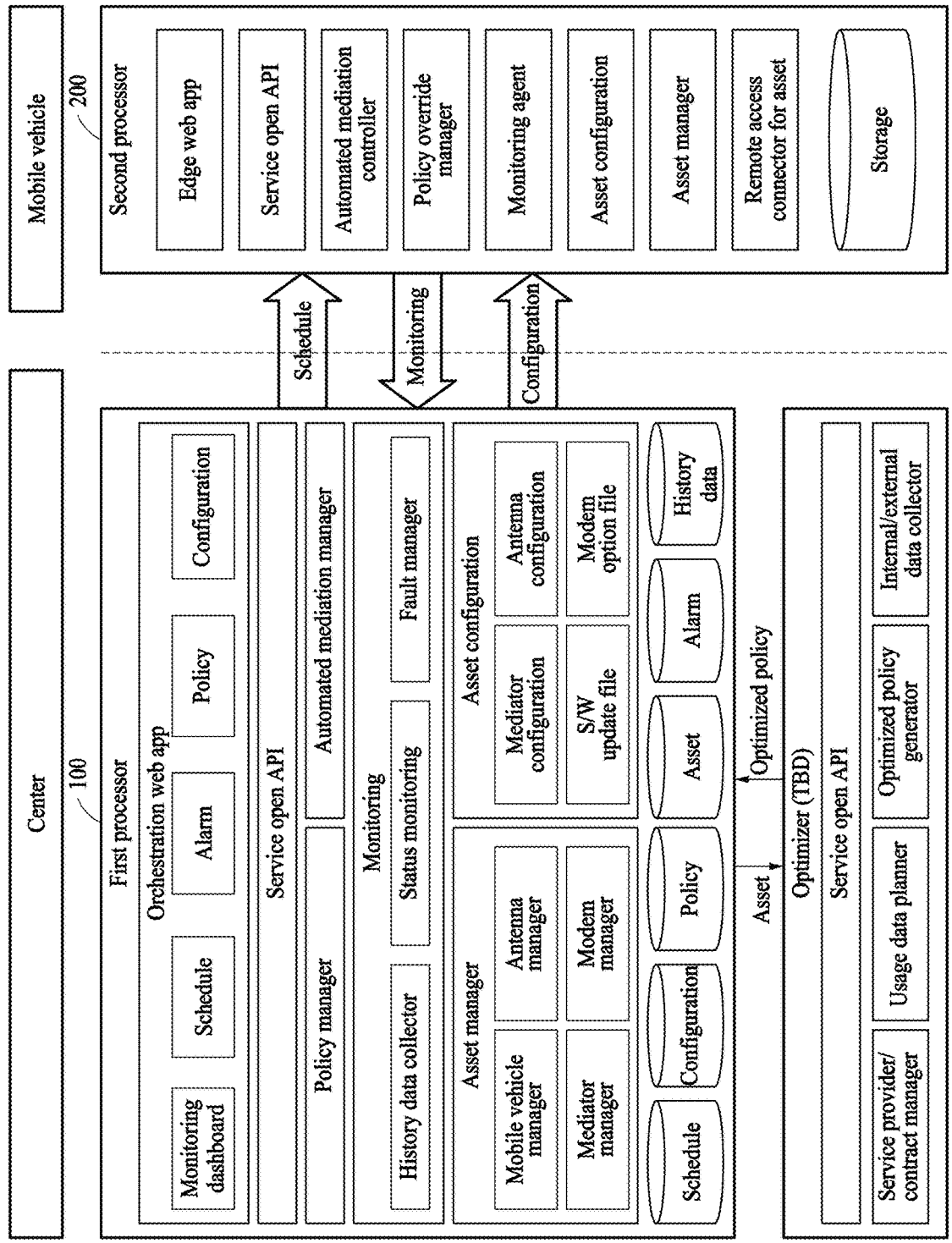
FIG. 4 illustrates a functional structure of a first processor shown in FIG. 1.

FIG. 4 is a drawing illustrating a functional structure of a first processor shown in FIG. 1.

Referring to FIG. 4, a first processor 100 may include an orchestration web app, a service open API, a policy manager, an automated mediation manager, a monitoring module, an asset manager, and an asset configuration module.

The first processor 100 may provide monitoring dashboard, schedule, alarm, policy, and configuration functions through the orchestration web app. The monitoring module may include a history data collector, status monitoring, and a fault manager.

The asset manager may include a mobile vehicle manager, an antenna manager, a mediator manager, and a modem manger. The asset configuration module may include mediator configuration, antenna configuration, a software (S/W) update file, and a modem option file.

Furthermore, the first processor 100 may store a schedule, configuration, a policy, an asset, an alarm, and history data in a memory (not shown).

The first processor 100 may provide information about an asset to an optimizer and may receive an optimized policy from the optimizer. The optimizer may include a service open API, a service provider/contract manager, a usage data planner, an optimizer policy generator, and an internal/external data collector.

The first processor 100 may transmit a schedule and configuration to a second processor 200 and may receive monitoring data from the second processor 200. A description will be given in detail of a structure of the second processor 200 with reference to FIG. 5.

Figure 5:
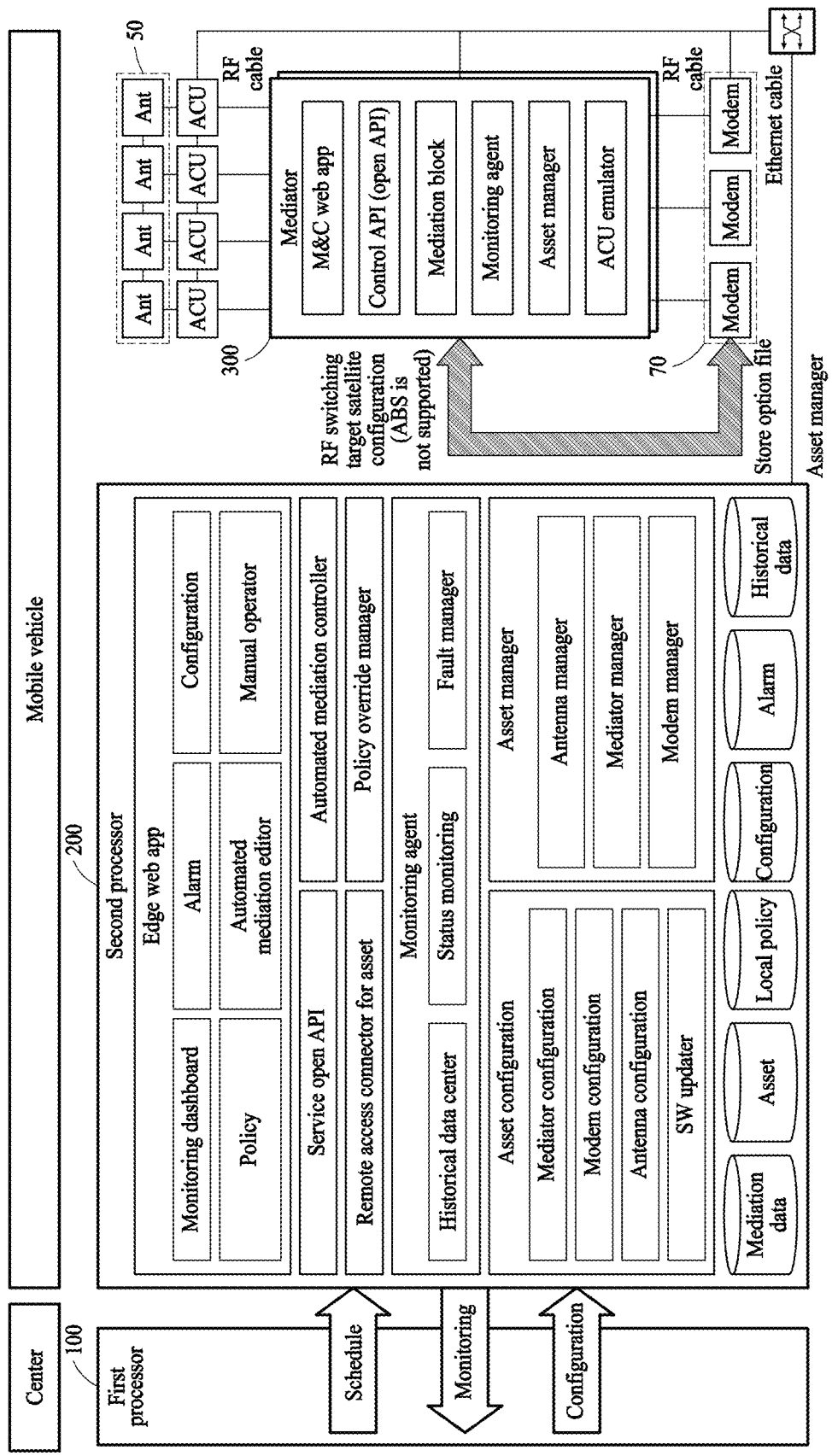
FIG. 5 illustrates a functional structure of a second processor shown in FIG. 1.

FIG. 5 is a drawing illustrating a functional structure of a second processor shown in FIG. 1.

Referring to FIG. 5, a second processor 200 may include an edge web app, a service open API, an automated mediation controller, a remote access connector for an asset, a policy override manager, a monitoring agent, an asset configuration module, and an asset manager.

The edge web app may provide monitoring dashboard, alarm, configuration, policy, automated mediator editor, and manual operator functions.

The monitoring agent may include a historical data sender, a status monitoring module, a fault monitoring module.

The asset configuration module may include mediator configuration, modem configuration, antenna configuration, and SW updater modules. The asset manager may include an antenna manager, a mediator manager, and a modem manager.

The second processor 200 may store mediation data, an asset, a local policy, configuration, an alarm, and historical data in a memory (not shown).

The second processor 200 may generate a control signal based on schedule data to control a mediator 300. The second processor 200 may control RF switching of the mediator 300 using the control signal.

The second processor 200 may transmit RF switching and target satellite configuration information to the mediator 300. The second processor 200 may transmit an option file which is being managed to a modem 70.

The mediator 300 may include an M&C web app, a control API (open API) mediation block, a monitoring agent, an asset manager, and an ACU emulator.

The mediator 300 may switch a link between an antenna 50 and the modem 70 based on the control signal received from the second processor 200. For example, the mediator 300 may perform RF switching.

Figure 6:
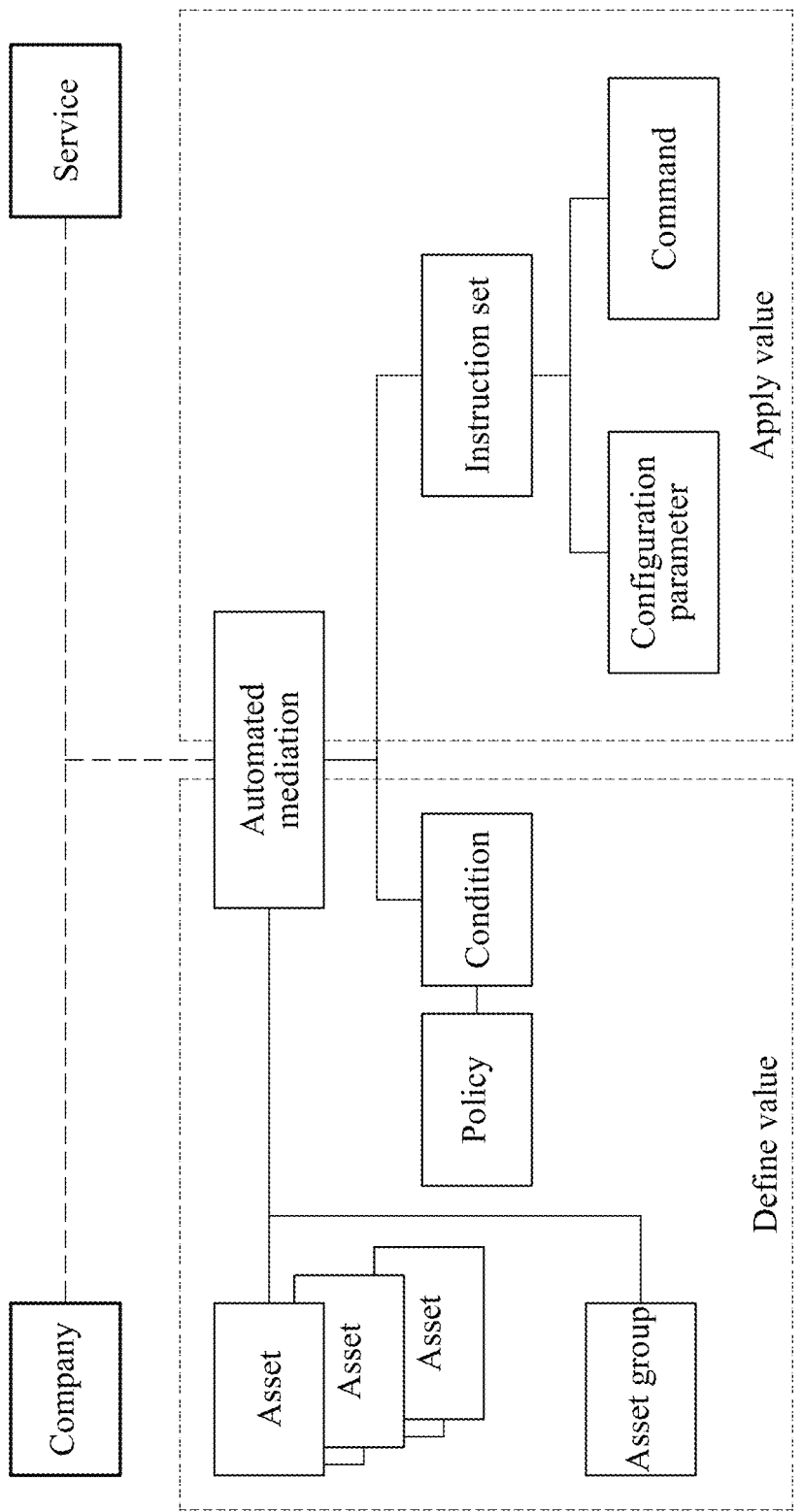
FIG. 6 illustrates a control data model of a satellite communication device shown in FIG. 1.

FIG. 6 is a drawing illustrating a control data model of a satellite communication device shown in FIG. 1.

Referring to FIG. 6, a data model used by a satellite communication device 10 of FIG. 1 may include data about automated mediation control, data about an asset, and data about an antenna group.

The satellite communication device 10 may define data and may apply the defined data to a satellite communication asset.

The satellite communication asset may include physical and logical elements managed and/or controlled for an optimal satellite network connection. As described above, the satellite communication asset may include a satellite 30, an antenna 50, a modem 70, a first processor 100, a second processor 200, and a mediator 300 of FIG. 2. The satellite communication asset may further include a mobile vehicle. For example, the mobile vehicle may include a ship, an airplane, a land mobile vehicle, or the like. The mobile vehicle may refer to various types of movement platforms capable of performing satellite communication with a satellite.

A group of the satellite communication assets may refer to a set of the satellite communication assets. The group of the satellite communication assets may include an antenna group. The antenna group may be used to support a failover and a handover under the same band or the same service provider.

The data about the automated mediation control may include a condition and an instruction set. The instruction set may include a plurality of instructions.

The policy may refer to a condition where an automatic control instruction set is executed. The policy may include a priority for a satellite communication parameter. Furthermore, the policy may include an instruction in a blockage, asset failure, weather, or weak signal intensity (signal to noise ratio (SNR)) situation and may include a user define policy.

The policy may include a priority for an orbit of the satellite 30, a priority for a satellite communication band, a priority for the antenna 50, a priority for a service provider, or a fixed link.

The policy may be used to manage satellite communication assets while continuously maintained during a specific time period. For example, the policy may be maintained until a mobile vehicle starts and arrives (or anchors). The priority may include a priority when a service coverage is overlapped or when the service coverage should be changed. For example, the priority may include a band priority, an orbit priority, and a service provider priority.

The condition may include various conditions which vary with an environment of the mobile vehicle. For example, the condition may include a location, a time, an environmental condition (e.g., weather or blockage) according to the location, or a state of each satellite communication asset (e.g., fault, a weak signal, or over a specific threshold).

The configuration parameter may include a file or data for changing settings of the satellite communication asset. For example, the configuration parameter may include an option file, an SDB file, and configuration data.

The option file may include settings for the modem 70, and the SBD file may include a satellite DB file for the modem 70.

The instruction set may include an option file and a command. The option file may include a file for changing configuration of the modem 70. The option file may include a configuration file for the modem 70 and an SDB file for the modem 70.

The command may include an instruction to access a specific service using the mediator 300 and the modem 70. For example, the command may include RF path connectivity (e.g., disconnect or connect) configuration, role change configuration, target satellite configuration, and a command to transmit an option/SDB file to the modem 70.

Figure 7:
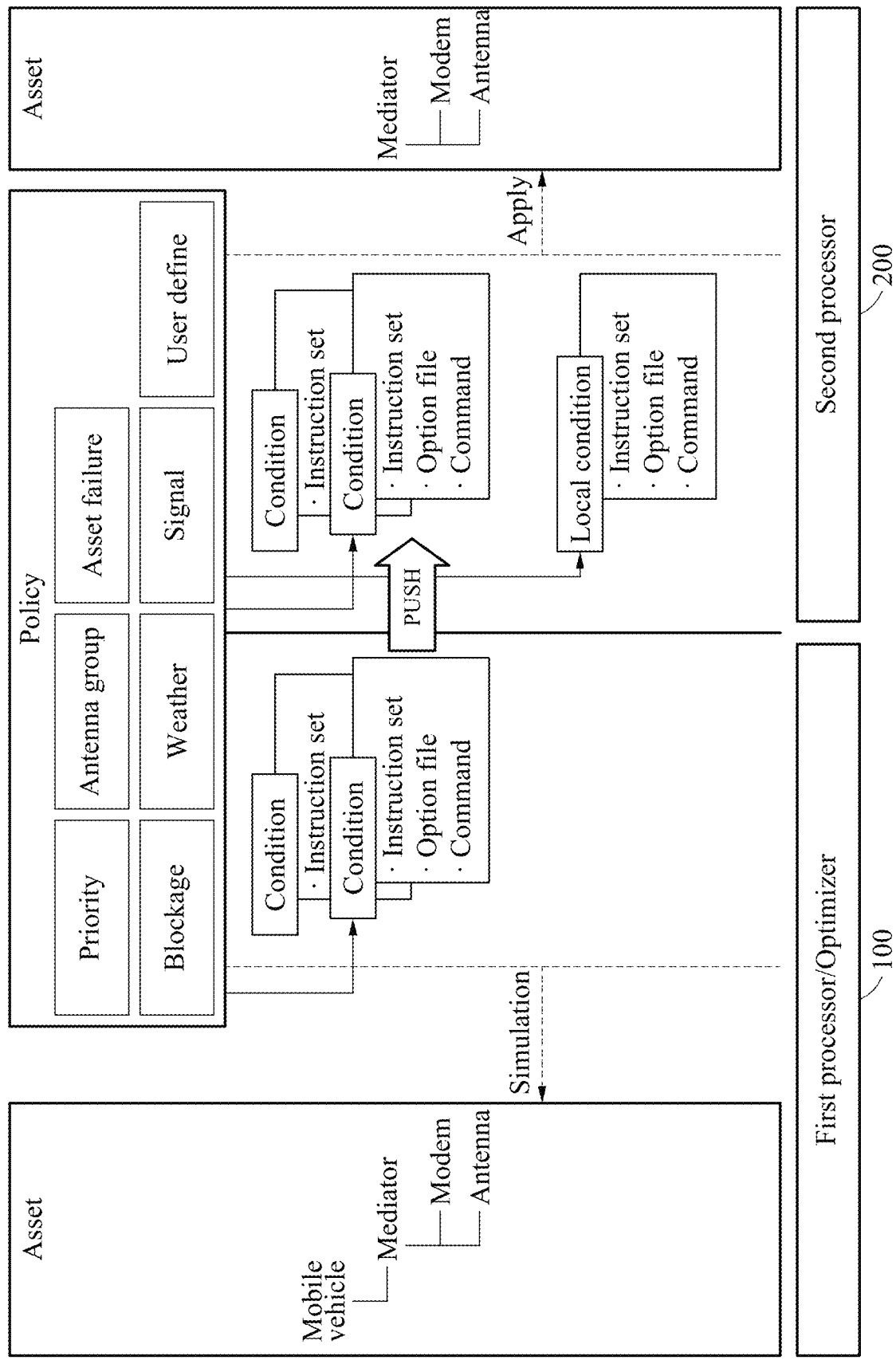
FIG. 7 illustrates flow of control data shown in FIG. 6.

FIG. 7 is a drawing illustrating flow of control data shown in FIG. 6.

Referring to FIG. 7, when a condition enshrined in the policy is satisfied, the instruction included in the above-mentioned instruction set may be executed in a mediator 300 of FIG. 2 through control of a second processor 200.

A first processor 100 and an optimizer may simulate and optimize a policy. The first processor 100 may transmit information about an asset to the optimizer and may generate an optimized policy through policy simulation for a ship, the mediator 300, an antenna 50, and a modem 70.

The first processor 100 may transmit schedule data including the policy to the second processor 200, and the second processor 200 may control satellite communication assets based on a condition including the policy.

The second processor 200 may control a satellite communication asset including the mediator 300 based on the optimized policy. The policy generated by the first processor 100 may be changed by the second processor 200.

The second processor 200 may change the received condition (or policy) based on an environment in which each mobile vehicle is to generate a local condition.

The second processor 200 may generate a control signal based on at least one of the local condition and the received schedule data to control a satellite communication asset.

Figure 8A:
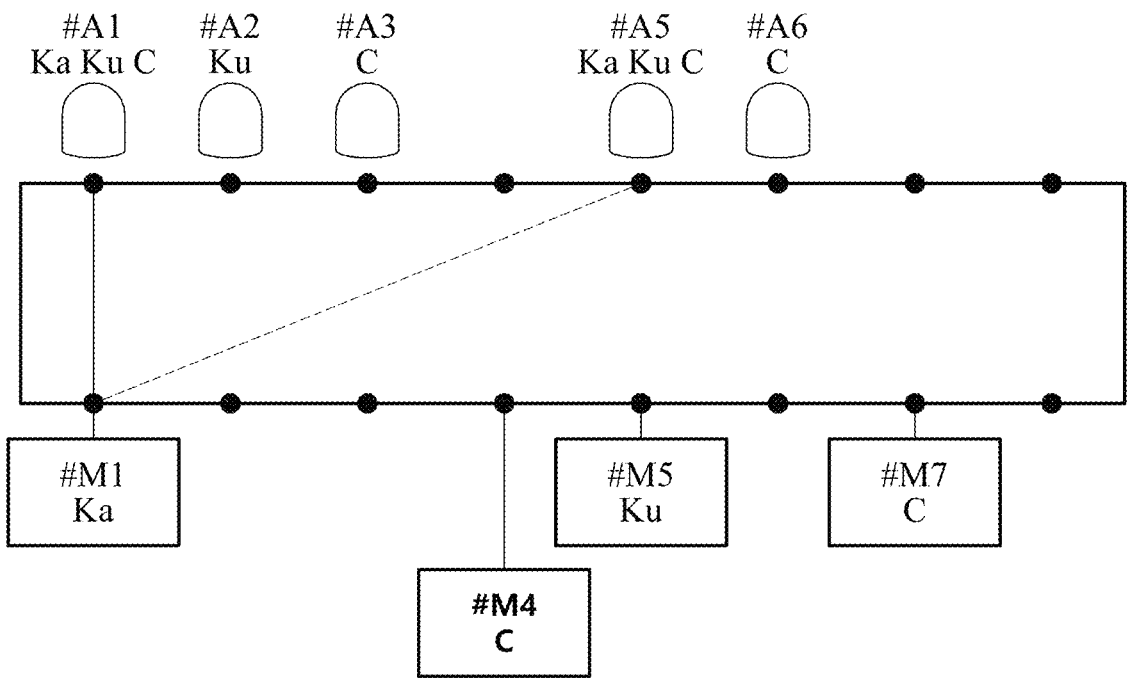
FIG. 8A illustrates an example of a mediation operation according to a policy.
Figure 8B:
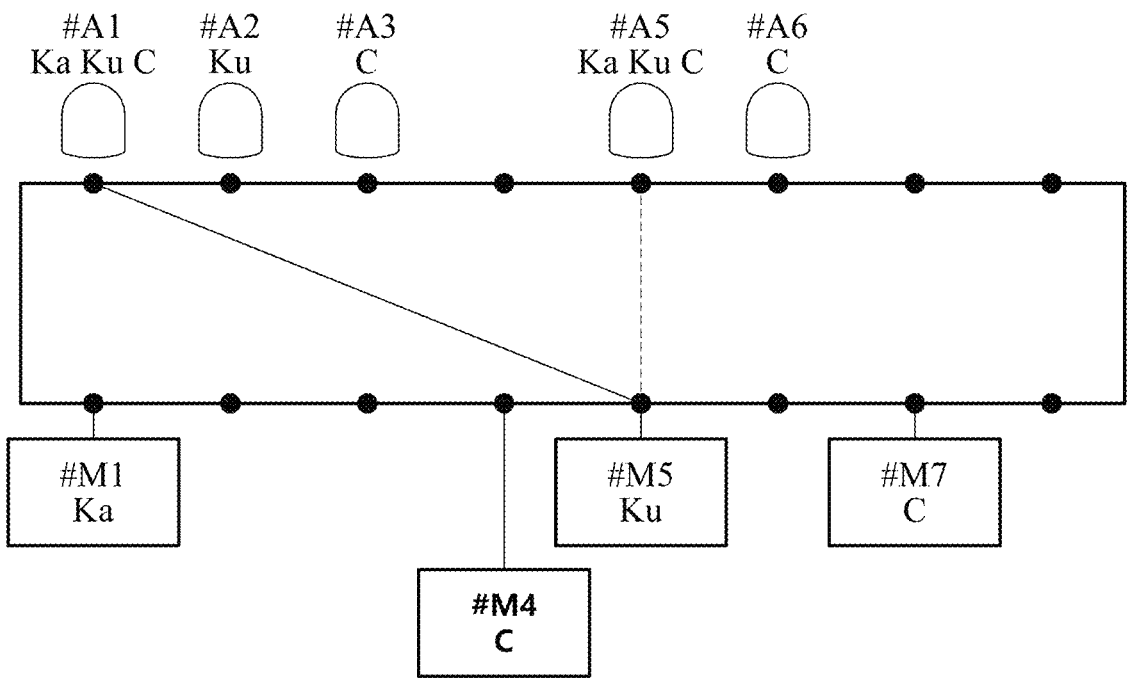
FIG. 8B illustrates another example of a mediation operation according to a policy.
Figure 8C:
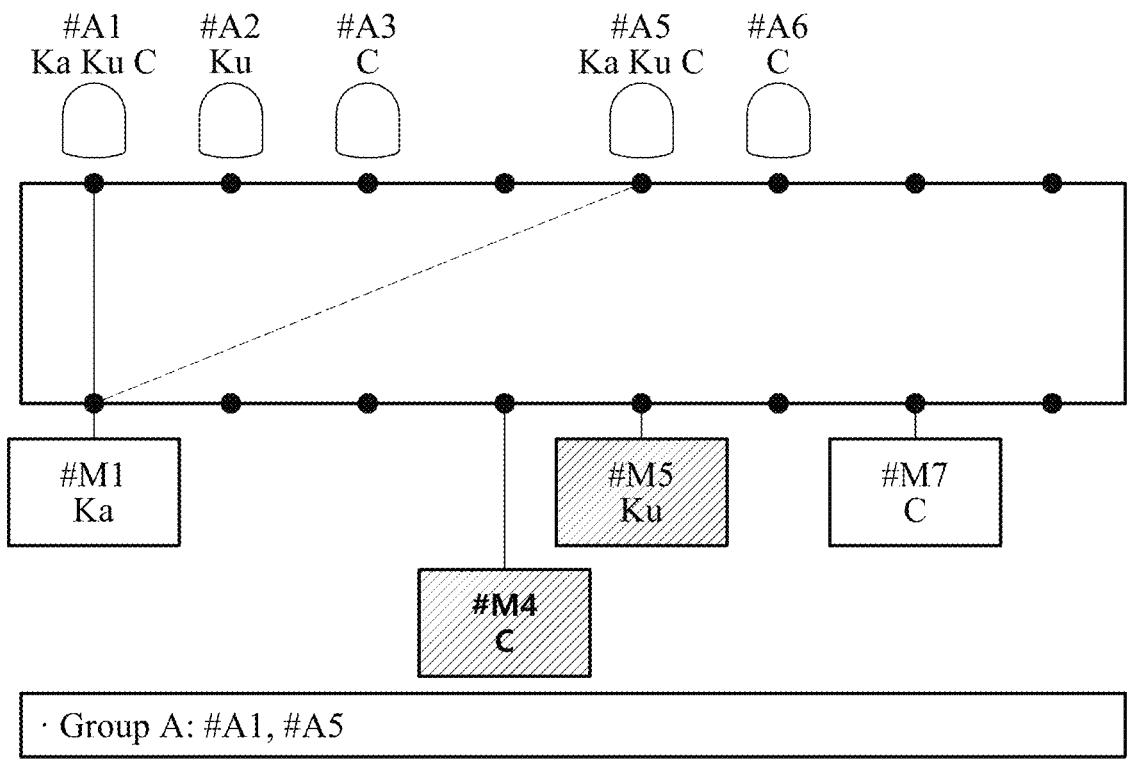
FIG. 8C illustrates another example of a mediation operation according to a policy.

FIG. 8A is a drawing illustrating an example of a mediation operation according to a policy. FIG. 8B is a drawing illustrating another example of a mediation operation according to a policy. FIG. 8C is a drawing illustrating another example of a mediation operation according to a policy.

Referring to FIGS. 8A to 8C, a policy generated by a first processor 100 of FIG. 2 may include configuration of a scanner (or dummy antenna), an orbit priority, a band priority, an antenna priority, a modem priority, and a service provider priority.

Because a blockage occurs in an antenna corresponding to a specific band, when the antenna switches to another band, the scanner may include a parameter for setting an antenna which detects a recovery situation of the band at which communication is previously performed.

The first processor 100 may sequentially apply a plurality of priorities through the policy. For example, the first processor 100 may sequentially apply an orbit priority, a band priority, and an antenna priority. An order where the priorities are applied may be changed if necessary.

The first processor 100 may generate a policy which prepares for when some of satellite communication assets are not operated. For example, the first processor 100 may set a policy when some of modems 70 of FIG. 2 are not operated.

In a policy used in an example of FIG. 8A, an orbit priority may first be applied. In this case, when the orbit priority is determined as an MEO, a band priority of the MEO may be determined in an order of Ka, Ku, and C bands. Thus, mediation may be performed such that the modem 70 which supports Ka band uses an antenna 50 designated as group A.

In an example of FIG. 8B, the orbit priority may first be applied. In this case, when a GEO satellite has a high priority, the band priority may be applied in an order of Ku, Ka, and C bands. In this case, a mediator 300 of FIG. 2 may connect the modem 70 which supports Ku band and the antenna 50 designated as group A to perform satellite communication.

In an example of FIG. 8C, when the GEO satellite has the highest orbit priority and when it is unable to use modem #M5 due to a breakdown, a Ka-band modem corresponding a second band priority of the GEO satellite may be used by the policy.

The mediator 300 may switch a connection between the at least one antenna 50 and the at least one modem 70. As a result, the mediator 300 may change a band used for satellite communication and a service provider and may change an RF link between the antenna 50 and the modem 70 depending on an orbit of a satellite.

The mediator 30 may change the modem 70 to switch a communication band. The mediator 300 may switch a connection between the two or more antennas 50 and modems corresponding to a plurality of bands.

The mediator 300 may switch an RF link between the multi-antenna 50 and the multi-modem 70.

Communication with the MEO satellite may need at least two antennas 50. Thus, a group of the one modem 70 and the two or more antennas 50 may be designated, and a handover may occur freely in the group. When the group is formed with the one modem 70 and the two or more antennas 50, the antenna 50 in the group may fail to be used by another modem. The first processor 100 may generate a policy for the antenna 50. The antenna 50 may include a plurality of multi-band antennas.

ANT #4 and ANT #5 may be arranged as antenna group A, and ANT #7 and ANT #8 may be arranged as antenna group B. In this case, the first processor 100 may designate ANT #2 as a scanner and may set a band priority in an order of Ku, Ka, and C bands.

The antenna priority may be set in an order of a group, stand alone, and a scanner. The stand alone may include an antenna which performs satellite communication alone rather than in a group. In this case, when a scanner signal is greater than or equal to 50 dB, the condition may include that the scanner signal is enabled using Ku band.

An example of the policy may be represented as Table 1 below.

TABLE 1

| Number | Case | Active antenna | Active band | Applied policy |
|---|---|---|---|---|
| 1 | Normal | Antenna group A | Ku | Band priority |
| 2 | ANT #4 -> Blockage | Antenna group A | Ku | Band priority |
| 3 | ANT #5 -> Blockage | Antenna group A | Ku | Band priority |
| 4 | No Ku signal | Antenna group B | Ka | Band priority & Antenna priority |
| 5 | Condition satisfaction (e.g., scanner signal of 50 dB or more) | Antenna group A | Ku | Command of condition |

Figure 9A:
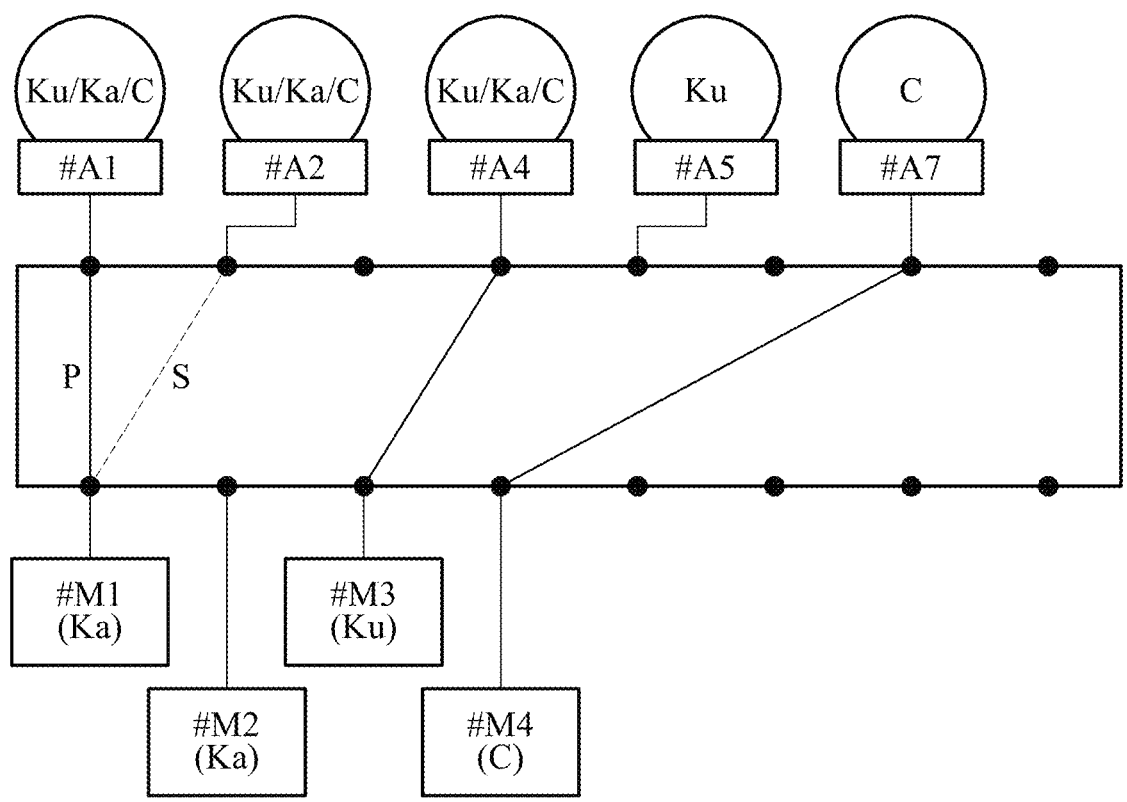
FIG. 9A illustrates a situation before switching of a mediator, when a blockage occurs.
Figure 9B:
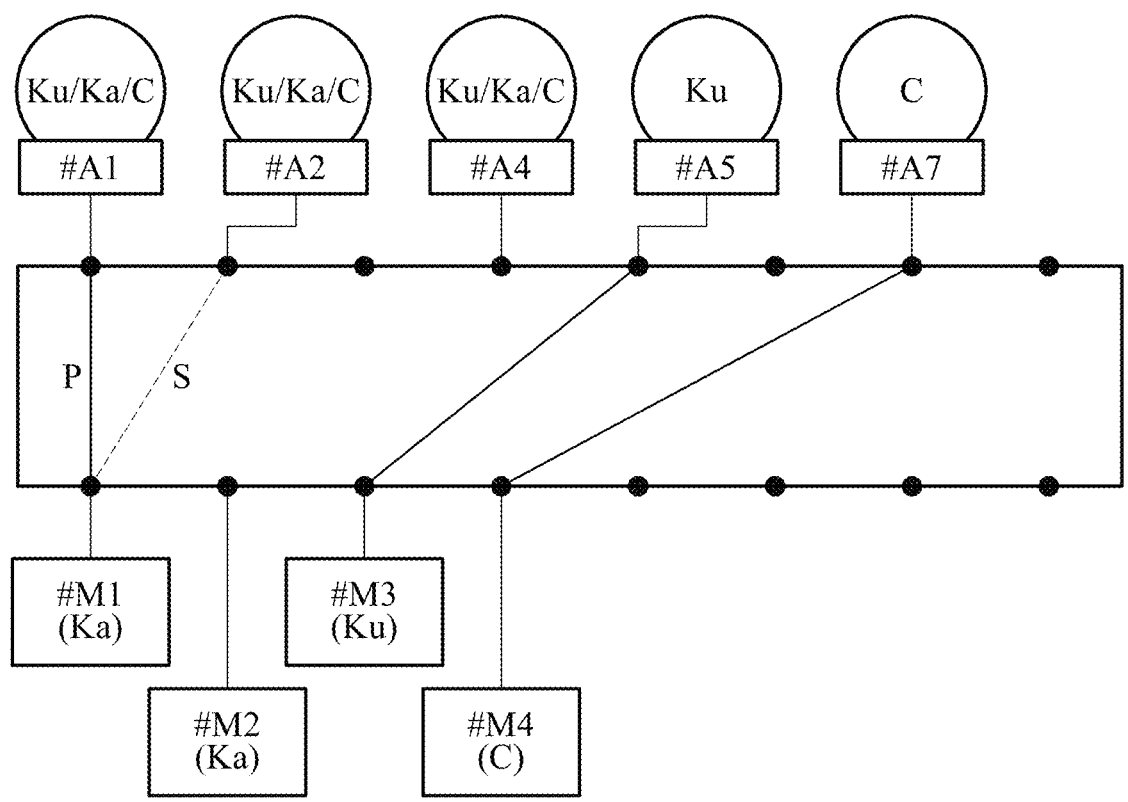
FIG. 9B illustrates a situation after switching of a mediator, when a blockage occurs.
Figure 9C:
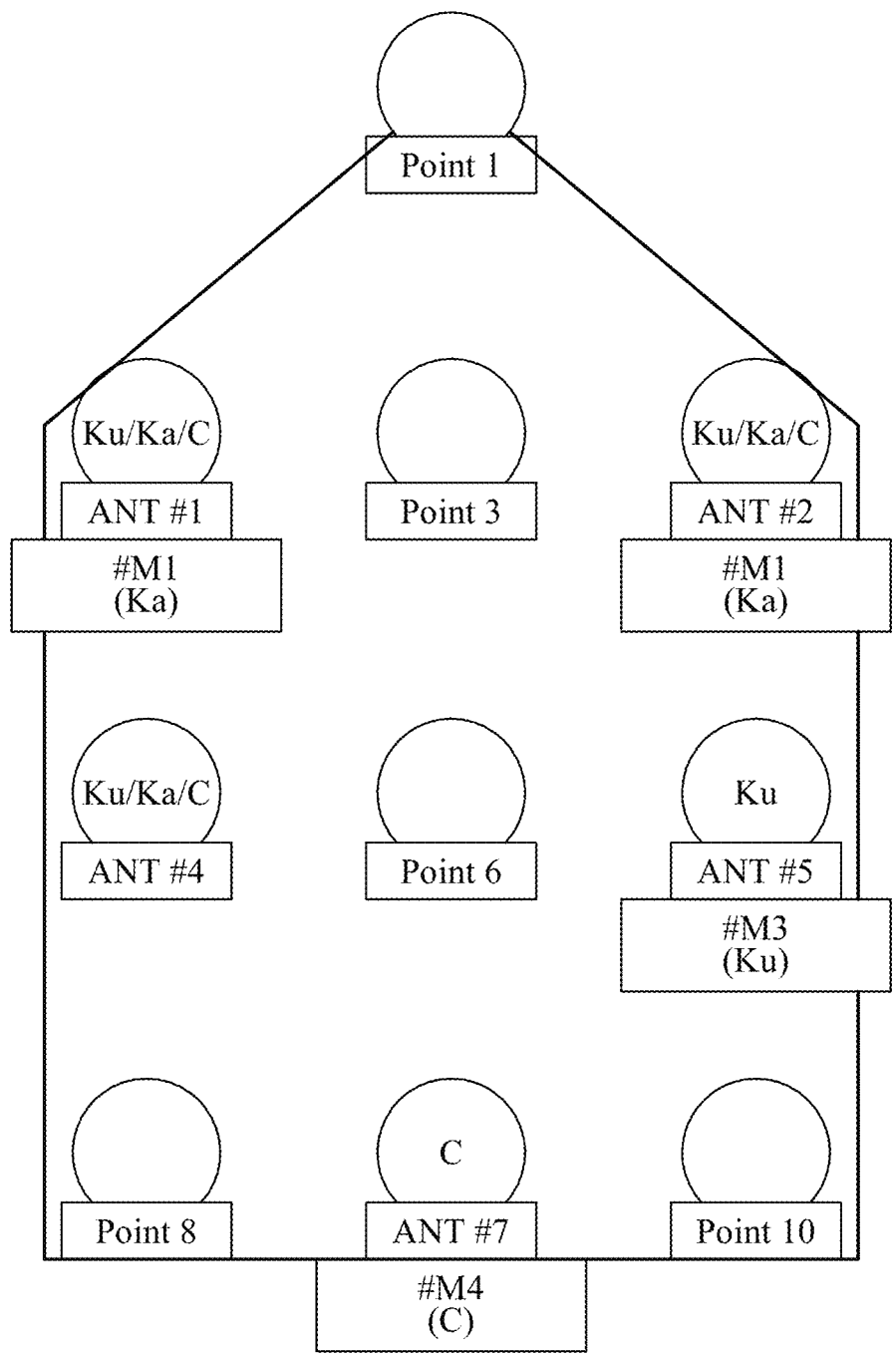
FIG. 9C illustrates locations of antennas in FIGS. 9A and 9B.
Figure 10A:
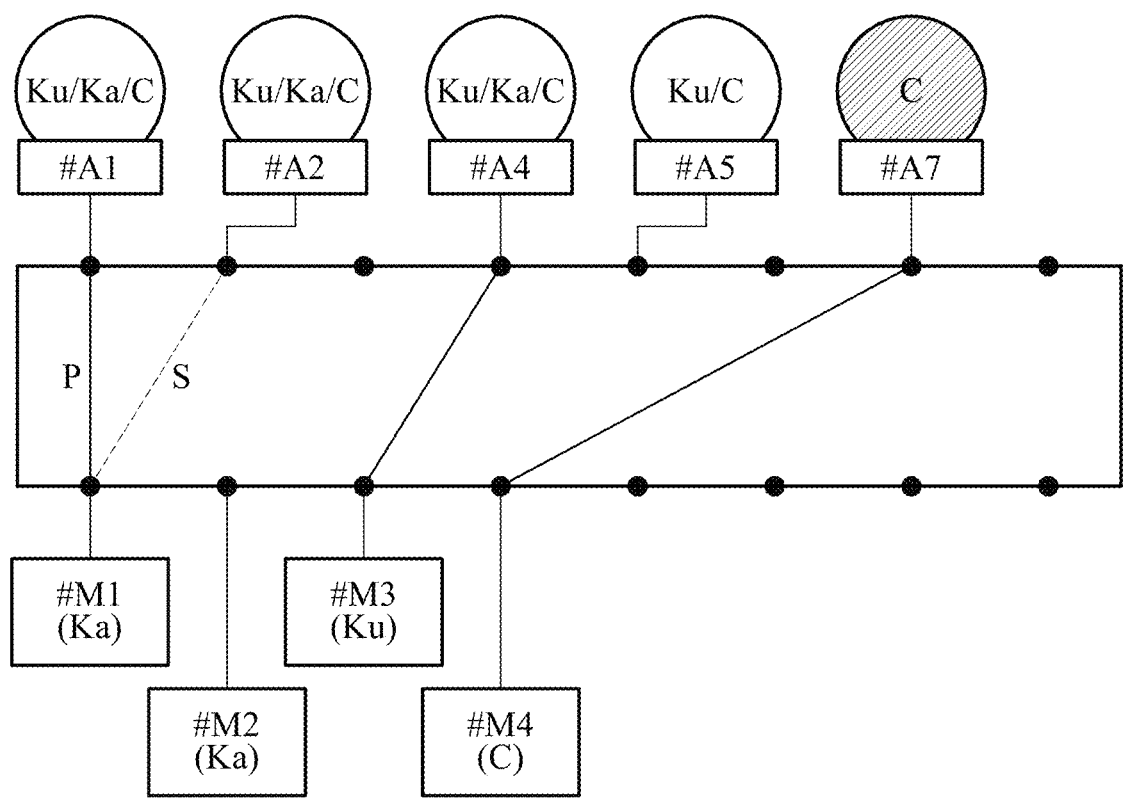
FIG. 10A illustrates a situation before switching of a mediator, when an antenna fault occurs.
Figure 10B:
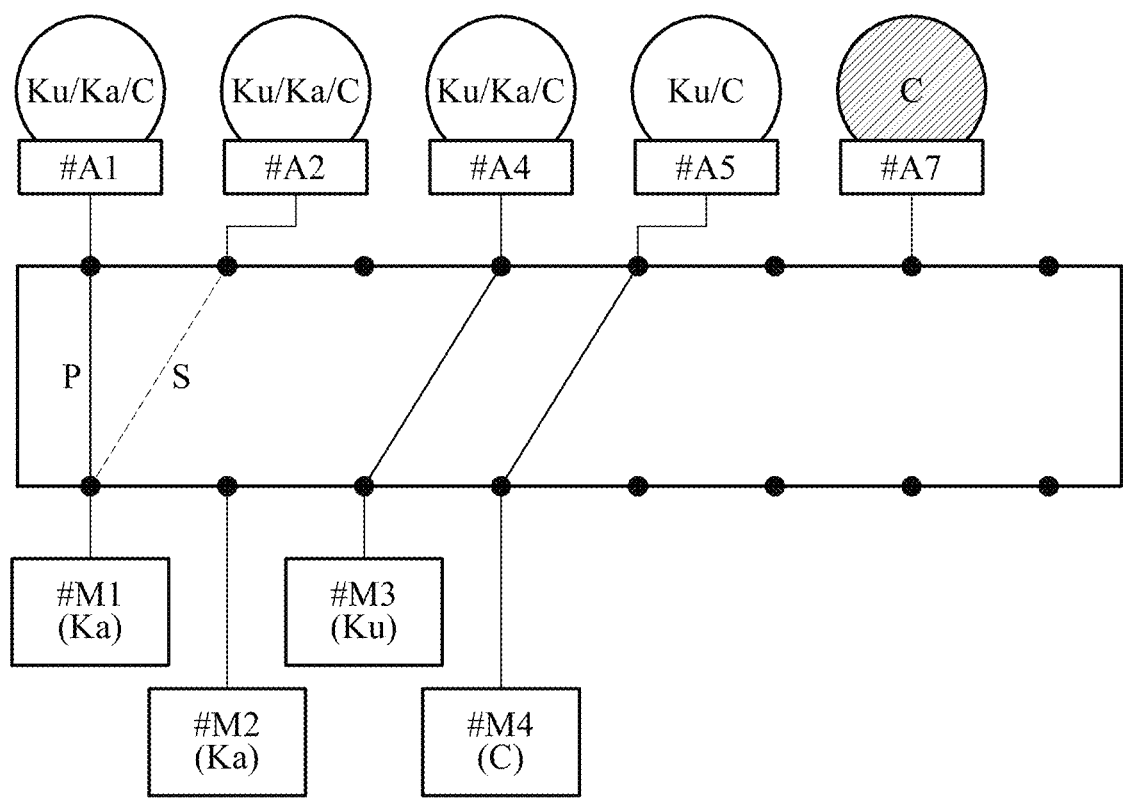
FIG. 10B illustrates a situation after switching of a mediator, when an antenna fault occurs.
Figure 10C:
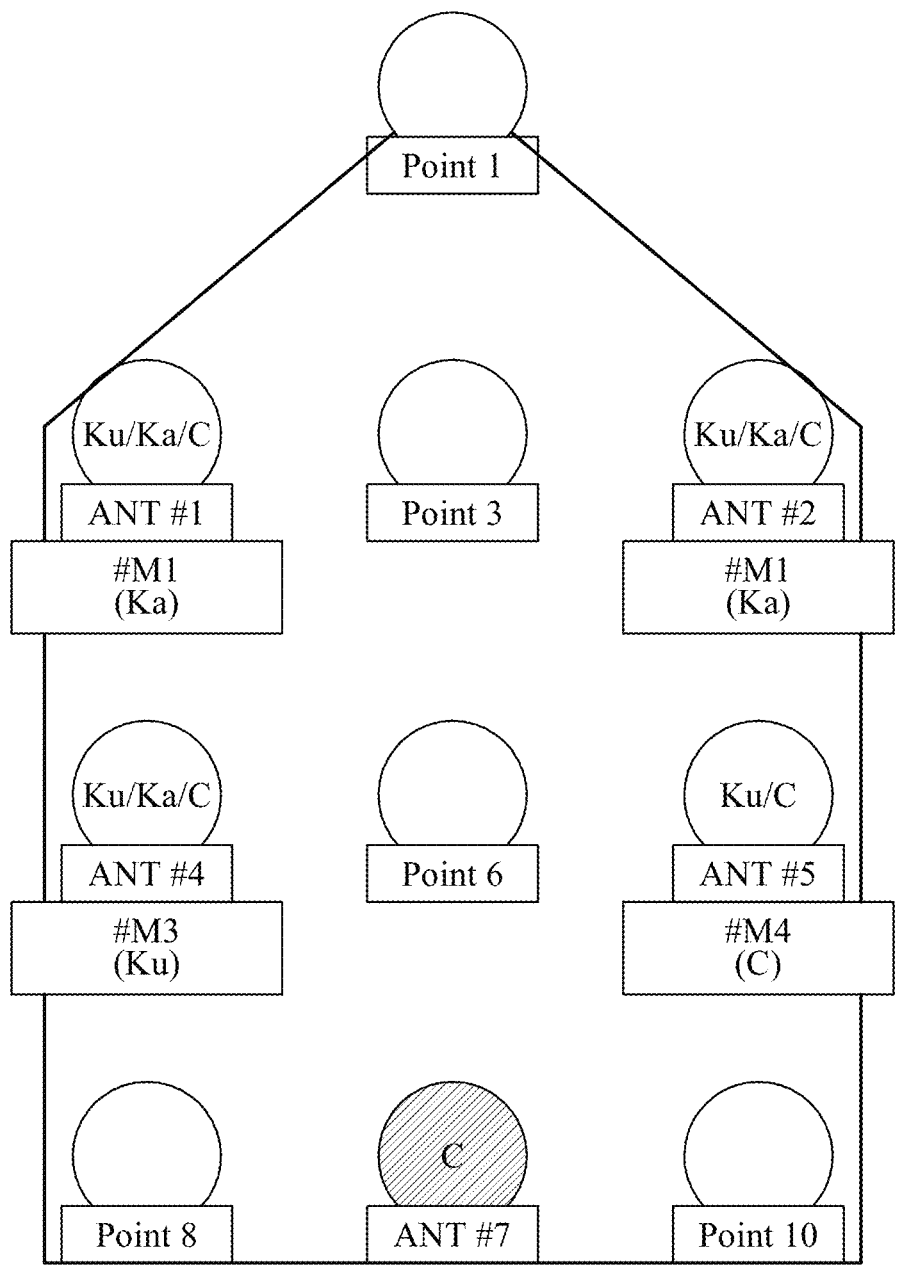
FIG. 10C illustrates locations of antennas in FIGS. 10A and 10B.

FIGS. 9A to 9C illustrate a switching operation of a mediator and locations of antennas, when a blockage occurs. FIGS. 10A to 10C illustrate a switching operation of a mediator and locations of antennas, when an antenna fault occurs.

Referring to FIG. 9A to 10C, a second processor 200 of FIG. 2 may determine whether to switch a link between at least one antenna 50 and at least one modem 70 of FIG. 2 based on a state of a first antenna included in the at least one antenna 50.

The state of the antenna 50 may include a blockage of the antenna 50 or a fault state of the antenna 50.

When it is determined to switch the link between the at least one antenna 50 and the at least one modem 70, the second processor 200 may select a second antenna among the at least one antenna 50 based on a policy and a condition included in schedule data.

In an example of FIGS. 9A to 10C, the second processor 200 may generate a control signal based on the policy. The second processor 200 may generate a control signal based on an orbit priority, a band priority, and a service provider priority.

In a policy applied to an example of FIGS. 9A to 9C, an orbit priority of a satellite 30 of FIG. 1 may be an order of an MEO and a GEO and a band priority of the MEO may be an order of Ka and Ku bands. A band priority of the GEO may be an order of Ku, Ka, and C bands, and a priority for a service provider may be set if necessary. Furthermore, modem #M1 and antennas #A1 and #A2 may be included in a group corresponding to the MEO.

In an example of FIG. 9A, when a blockage occurs in antenna #A4, the second processor 200 may generate a control signal to connect antenna #A5 and modem #M3 and connect antenna #A7 and modem #M4 based on the policy. A link after the connection may be represented as FIG. 9B.

FIG. 9C illustrates locations of the plurality of antennas 50 on a ship and modems 70 connected with the plurality of antennas 50, when the second processor 200 and a mediator 300 are located on the ship.

The second processor 200 may select the second antenna based on properties and a state of the at least one antenna 50. In detail, the second processor 200 may select an antenna, which supports the same band as the first antenna and has the largest size, among the at least one antenna 50 as the second antenna.

The second processor 200 may generate a control signal to connect a link between the second antenna and at least one modem.

For example, when antenna #A4 is in the blockage state in FIG. 9A, the second processor 200 may identify properties and a state of an antenna included in a list of antennas connectable to the mediator 300 from modem #M3 connected with antenna #A4.

The second processor 200 may generate a control signal to find and connect an optimal antenna among antennas connectable with modem #M3. The second processor 200 may find an optimal antenna based on the policy and the condition.

For example, the second processor 200 may generate a control signal to connect the largest antenna, which supports the same band as the previously connected antenna #A4 among antennas which are not connected with the modem without a fault, with modem #M3.

In a policy applied to an example of FIGS. 10A to 10C, an orbit priority of the satellite 30 may be an order of the MEO and the GEO, and a band priority of the MEO may be an order of Ka and Ku bands. A band priority of the GEO may be an order of Ku, Ka, and C bands, and a priority for a service provider may be set if necessary. Furthermore, modem #M1 and antennas #A1 and #A2 may be included in a group corresponding to the MEO.

When a fault occurs in antenna #A7 in FIG. 10A, the second processor 200 may generate a control signal to connect a link between modem #M4 and antenna #A5 based on the policy.

For example, the second processor 200 may generate a control signal to connect the largest antenna, which supports the same band as the previously connected antenna #A4 among antennas which are not connected with the modem without a fault rather than the fault, with modem #M3.

FIG. 10C illustrates locations of the plurality of antennas 50 on a mobile vehicle and modems 70 connected with the plurality of antennas 50, when the second processor 200 and the mediator 300 are located on the mobile vehicle.

Figure 11A:
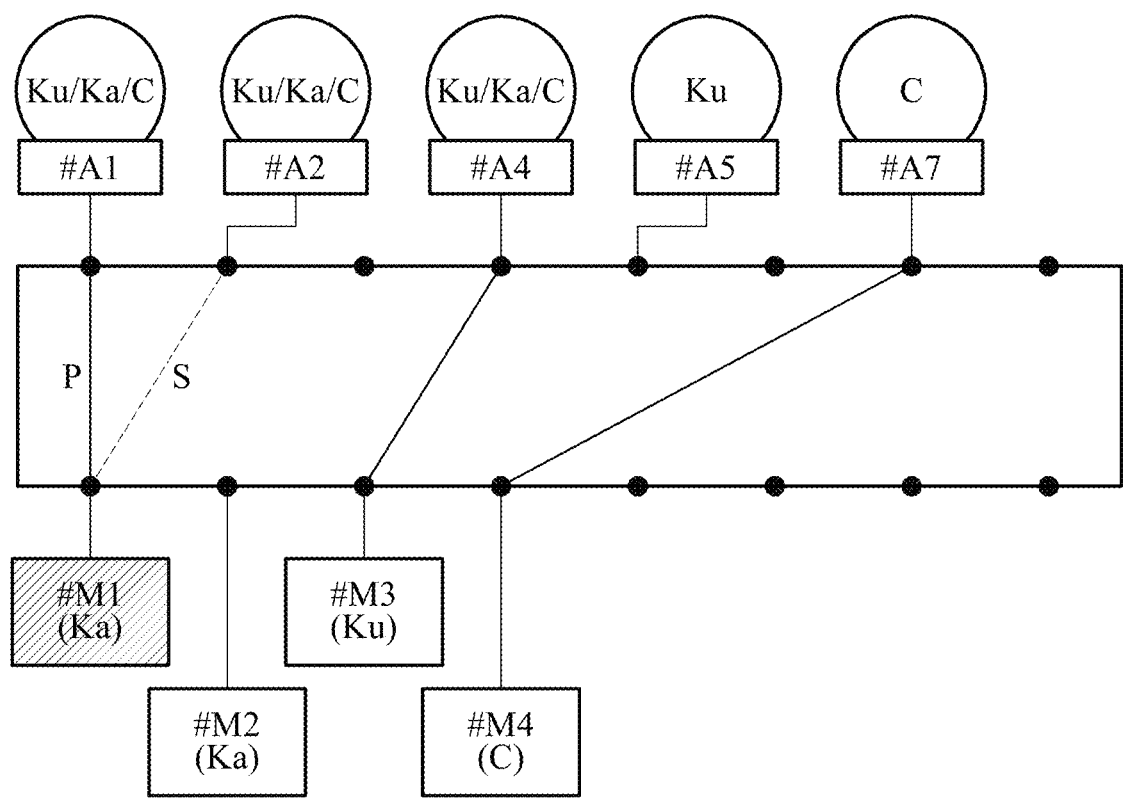
FIG. 11A illustrates a situation before switching of a mediator, when a modem fault occurs.
Figure 11B:
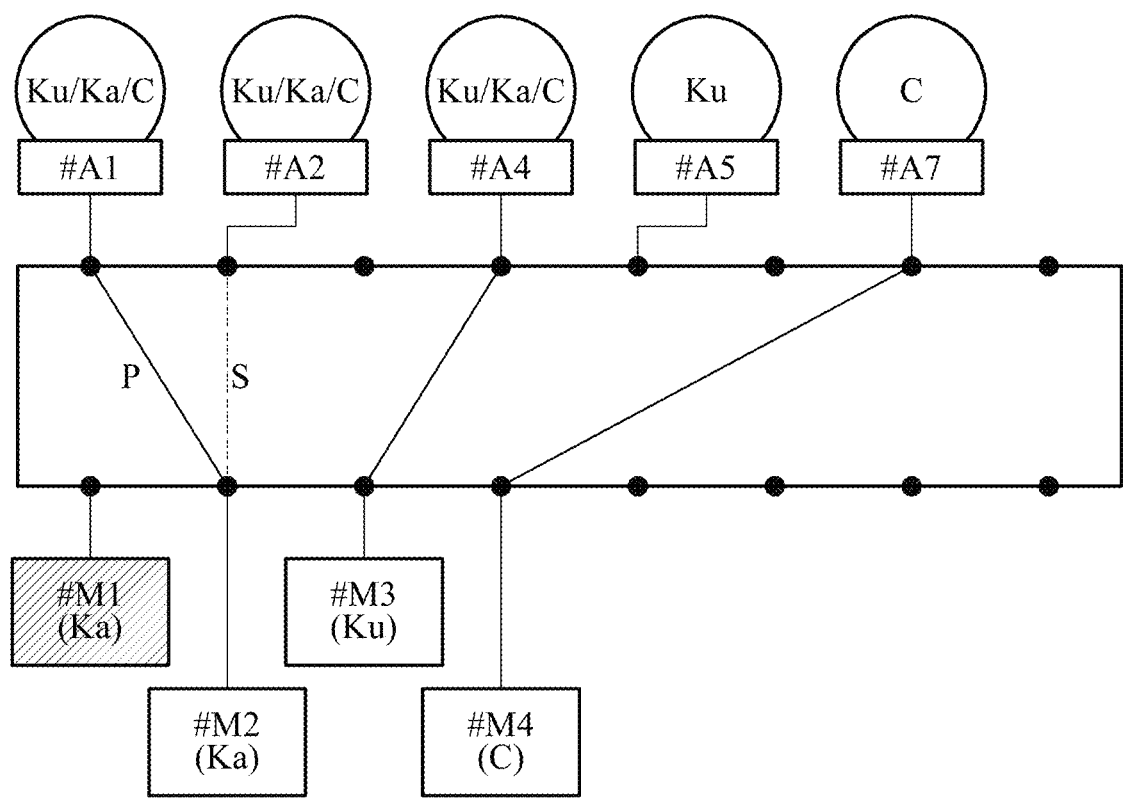
FIG. 11B illustrates a situation after switching of a mediator, when a modem fault occurs.
Figure 11C:
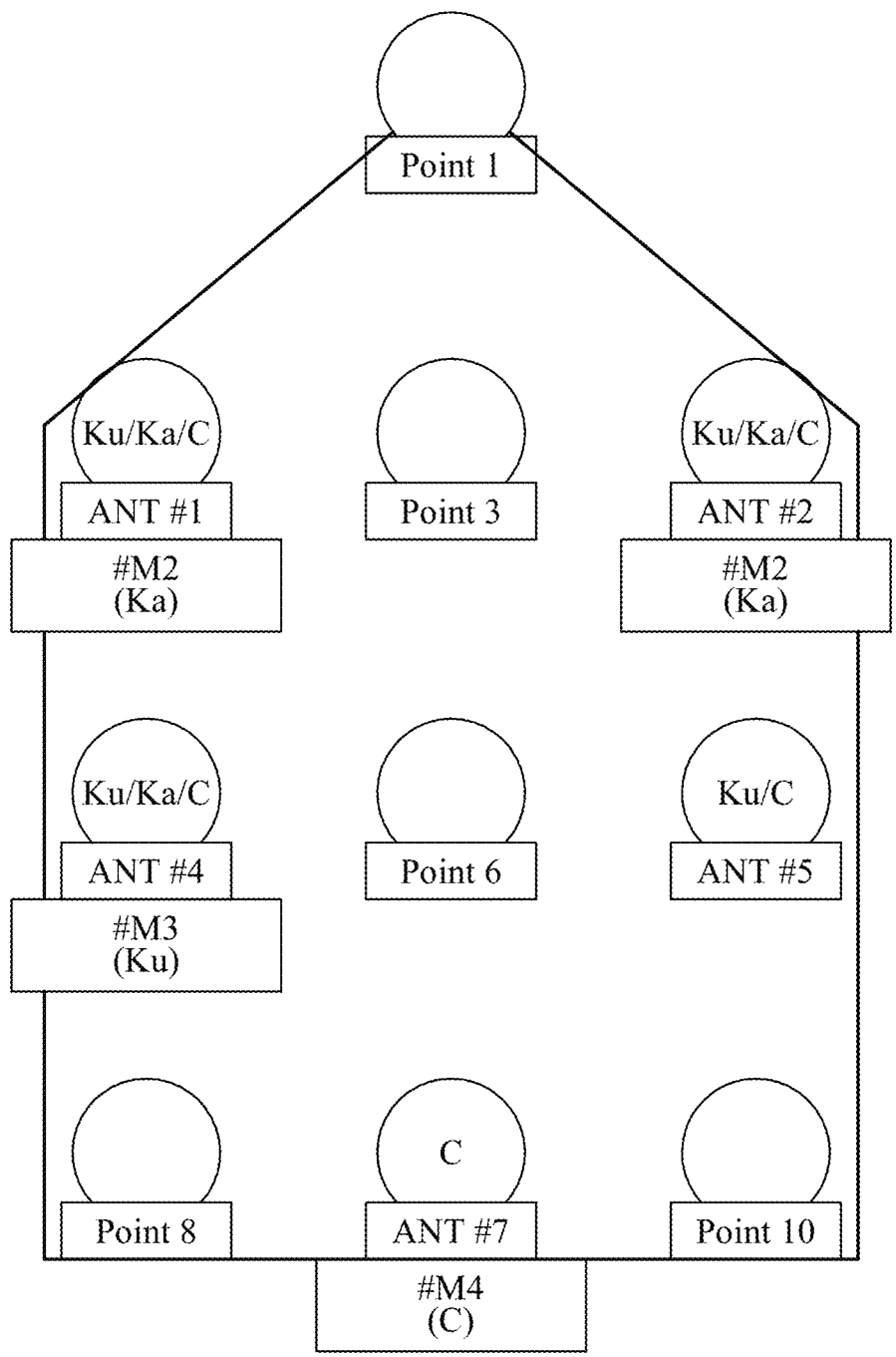
FIG. 11C illustrates locations of antennas in FIGS. 11A and 11B.

FIGS. 11A to 11C illustrate a switching operation of a mediator and locations of antennas, when a modem fault occurs.

Referring to FIGS. 11A to 11C, a second processor 200 of FIG. 2 may determine whether to switch a link based on a state of a first modem included in at least one modem 70 of FIG. 2. The state of the modem may include a fault state.

When it is determined to switch the link, the second processor 200 may select a second modem among the at least one modem 70 based on a policy and a condition included in schedule data.

The second processor 200 may select the second modem based on properties and a state of the at least one modem 70. In detail, the second processor 200 may select a modem, which supports the same service provider and the same band as the first modem, among the at least one modem 70 as the second modem.

The second processor 200 may generate a control signal to connect a link between the second modem and at least one antenna 50 of FIG. 2.

In a policy applied to an example of FIGS. 11A to 11C, an orbit priority of a satellite 30 of FIG. 1 may be an order of an MEO and a GEO and a band priority of the MEO may be an order of Ka and Ku bands. A band priority of the GEO may be an order of Ku, Ka, and C bands, and a priority for a service provider may be set if necessary. Furthermore, modem #M1 and antennas #A1 and #A2 may be included in a group corresponding to the MEO.

When a fault occurs in modem #M1 like an example of FIG. 11A, the second processor 200 may generate a control signal to connect a link between antenna #A1 and modem #M2.

FIG. 11C illustrates locations of the plurality of antennas 50 on a mobile vehicle and modems 70 connected with the plurality of antennas 50, when the second processor 200 and a mediator 300 are located on the mobile vehicle.

Figure 12A:
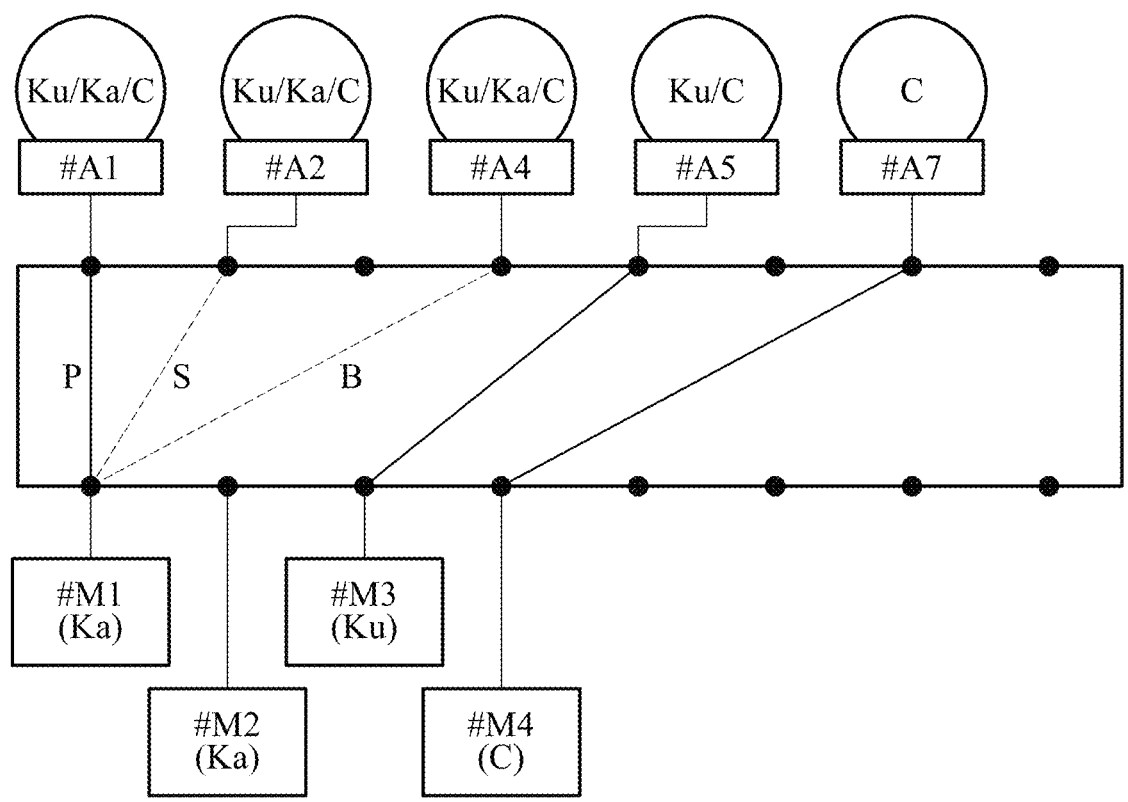
FIG. 12A illustrates a situation before switching of a mediator, when performing a handover.
Figure 12B:
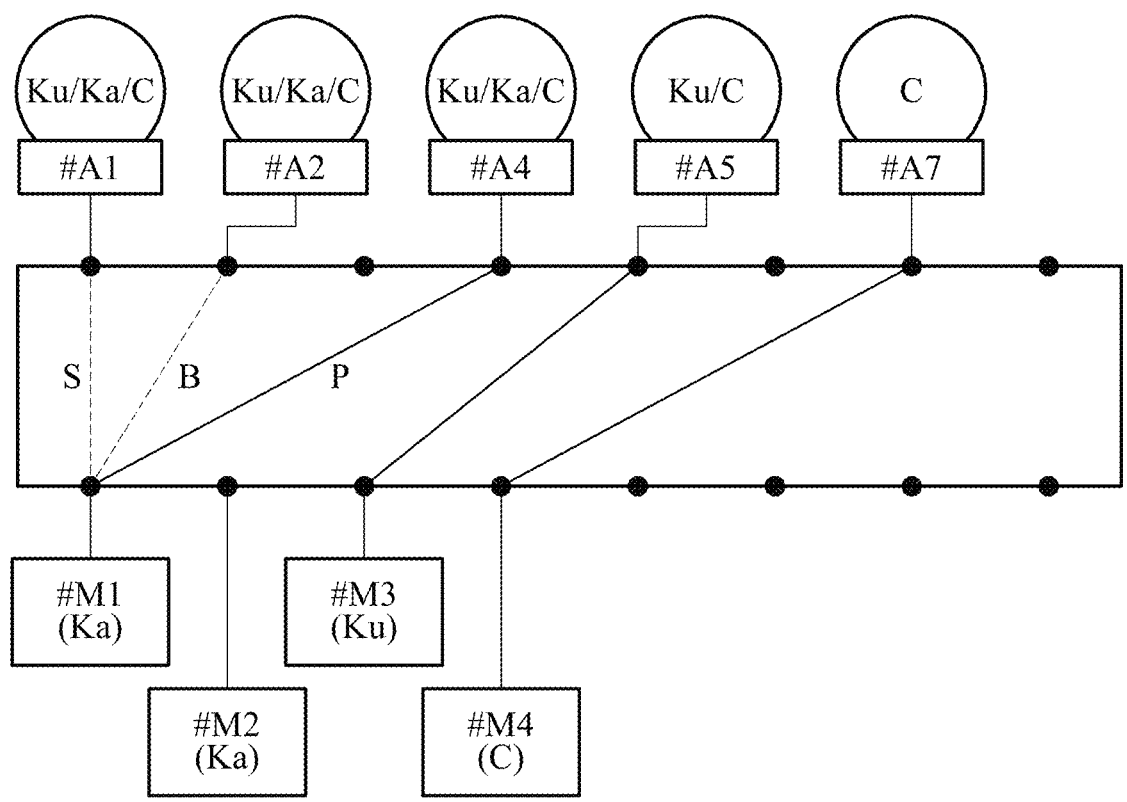
FIG. 12B illustrates a situation after switching of a mediator, when performing a handover.
Figure 12C:
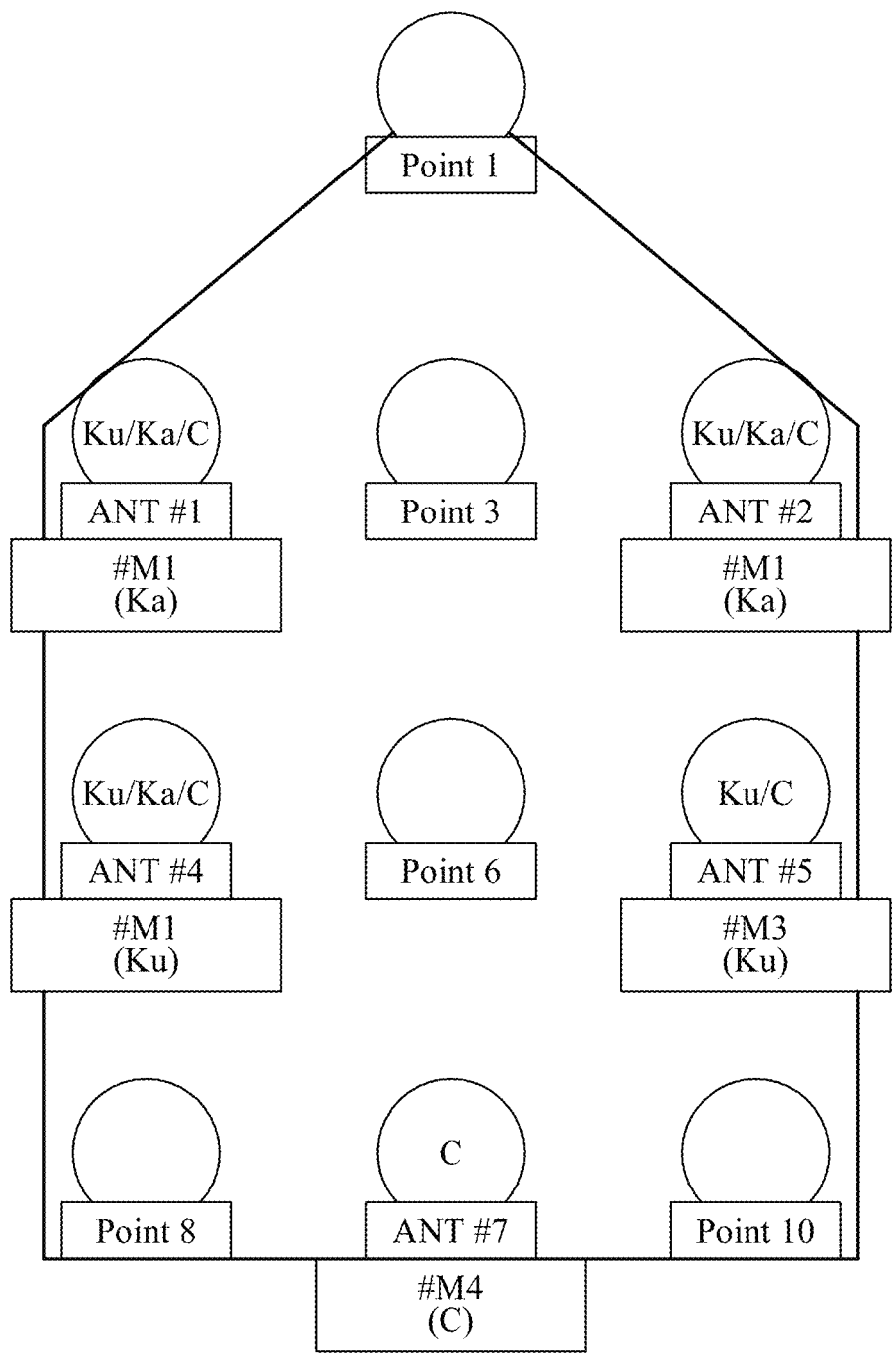
FIG. 12C illustrates locations of antennas in FIGS. 12A and 12B.

FIGS. 12A to 12C illustrate a switching operation of a mediator and locations of antennas, when performing a handover.

Referring to FIGS. 12A to 12C, a second processor 200 of FIG. 2 may generate a control signal to change a role of at least one antenna 50 of FIG. 2 based on a time schedule of a satellite 30 of FIG. 1. The role of the antenna 50 may include primary, secondary, and backup roles.

In a policy applied to an example of FIGS. 12A to 12C, an orbit priority of the satellite 30 may be an order of an MEO and a GEO and a band priority of the MEO may be an order of Ka and Ku bands. A band priority of the GEO may be an order of Ku, Ka, and C bands, and a priority for a service provider may be set if necessary. Modem #M1 and antennas #A1, #A2, and #A4 may be included in a group corresponding to the MEO.

In an example of FIGS. 12A and 12B, P may denote a primary antenna, S may denote a secondary antenna, and B may denote a backup antenna. The second processor 200 may change roles of antennas #A1, #A2, and #A4 to secondary, backup, and primary roles, respectively, based on a time schedule of an MEO satellite.

FIG. 12C illustrates locations of the plurality of antennas 50 on a mobile vehicle and modems 70 connected with the plurality of antennas 50, when the second processor 200 and a mediator 300 are located on the mobile vehicle.

Figure 13A:
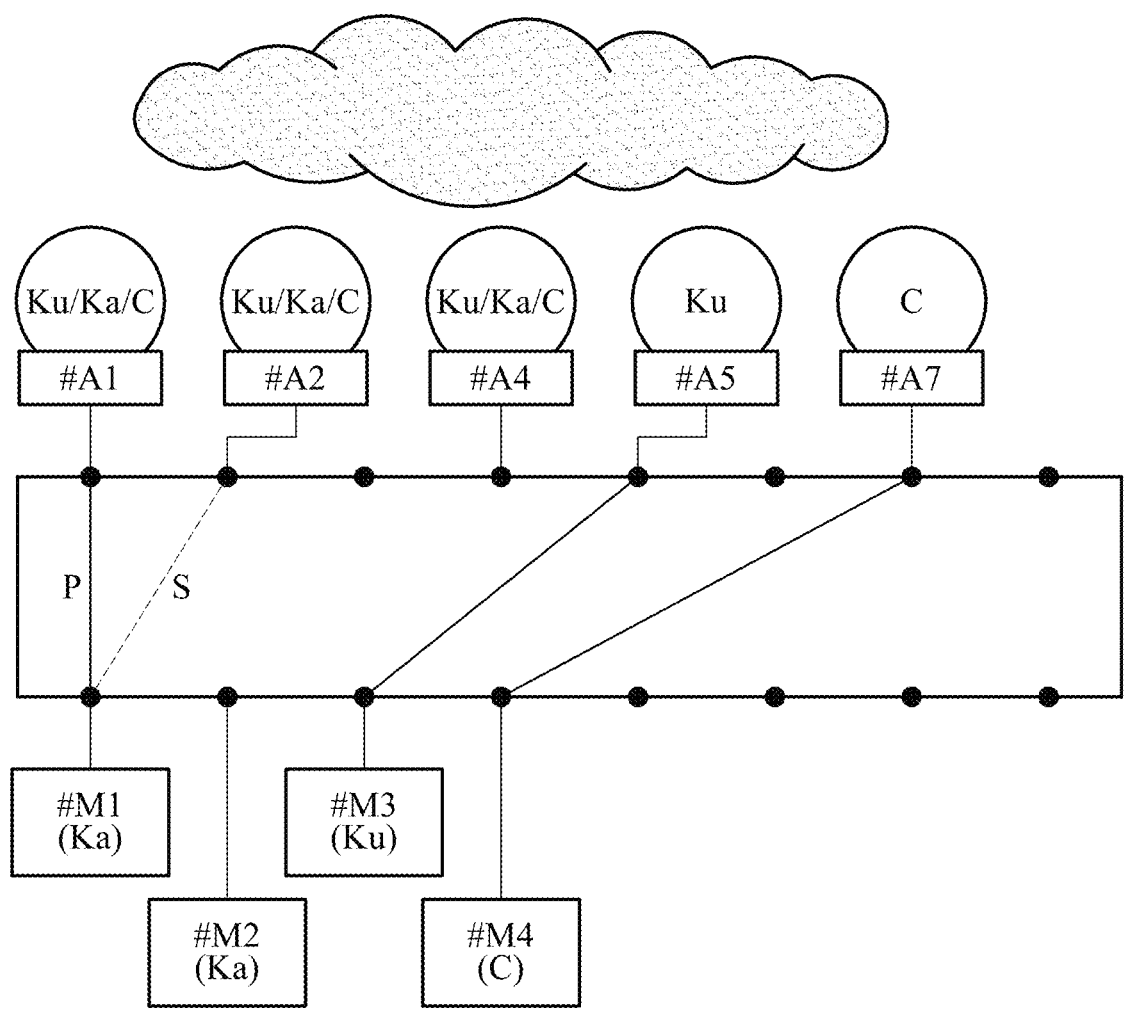
FIG. 13A illustrates a situation before switching of a mediator, when a satellite signal is weak due to weather.
Figure 13B:
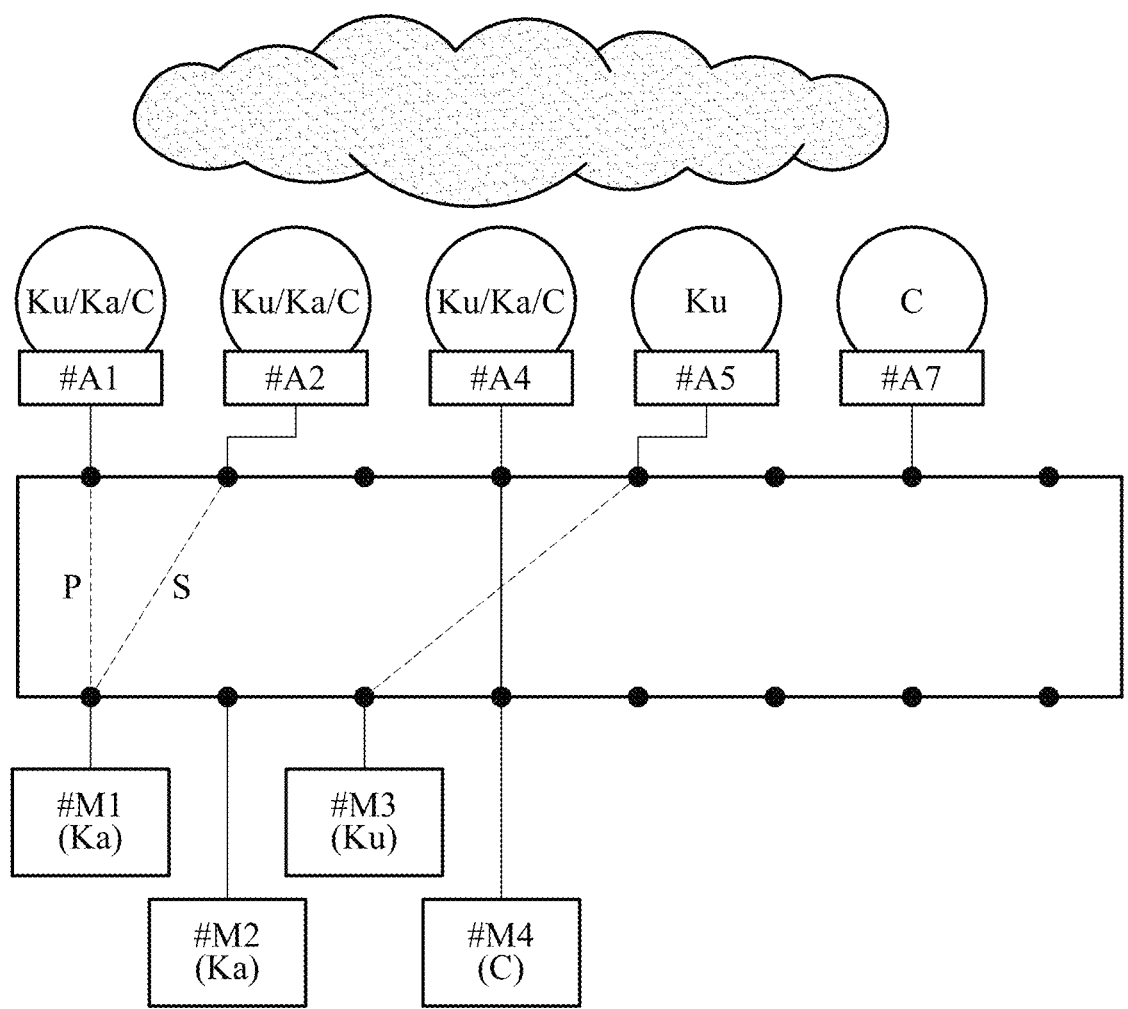
FIG. 13B illustrates a situation after switching of a mediator, when a satellite signal is weak due to weather.
Figure 13C:
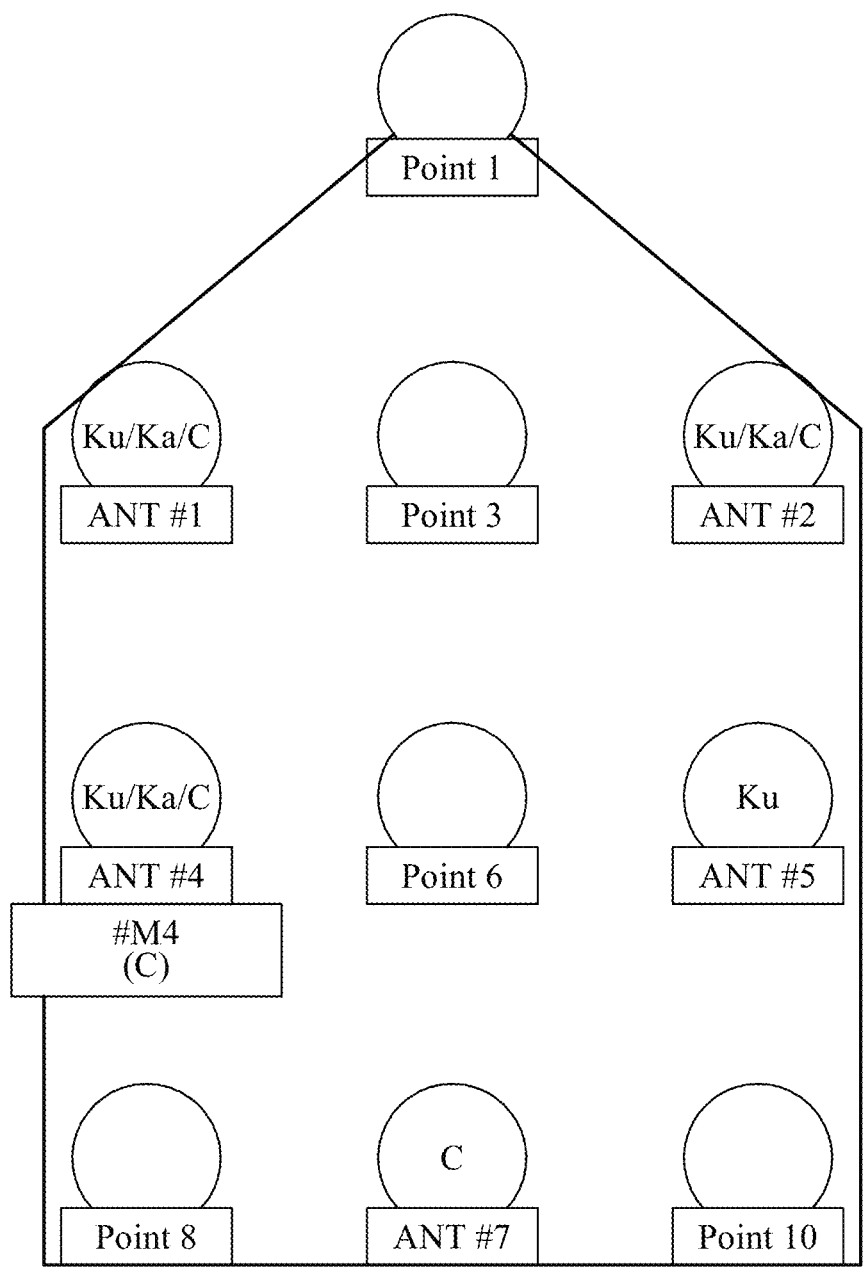
FIG. 13C illustrates locations of antennas in FIGS. 13A and 13B.

FIGS. 13A to 13C illustrate a switching operation of a mediator and locations of antennas, when a satellite signal is weak due to weather.

Referring to FIGS. 13A to 13C, a second processor 200 of FIG. 2 may receive weather information. The second processor 200 may generate a control signal to change a link between at least one antenna 50 and at least one modem 70 of FIG. 2 based on the weather information.

The second processor 200 may receive weather information from a weather observation device. The weather information may include temperature, humidity, precipitation, a rainfall probability, a wind direction, a wind speed, atmospheric pressure, a wave height, and the like.

In a policy applied to an example of FIGS. 13A to 13C, an orbit priority of a satellite 30 of FIG. 1 may be an order of an MEO and a GEO and a band priority of the MEO may be an order of Ka and Ku bands. A band priority of the GEO may be an order of Ku, Ka, and C bands, and a priority for a service provider may be set if necessary.

Furthermore, an antenna priority may be an order of size, MT, M, and normal. Modem #M1 and antennas #A1 and #A2 may be included in a group corresponding to the MEO.

The second processor 200 may switch a link between the antenna 50 and the modem 70 based on weather information and intensity of a satellite signal. For example, when a signal of Ku and Ka bands is less than or equal to a predetermined value and when a humidity value is greater than or equal to 90%, the second processor 200 may generate a control signal to connect a link between modem #M4 and antenna #A4.

FIG. 13C illustrates locations of the plurality of antennas 50 on a mobile vehicle and modems 70 connected with the plurality of antennas 50, when the second processor 200 and a mediator 300 are located on the mobile vehicle.

Figure 14A:
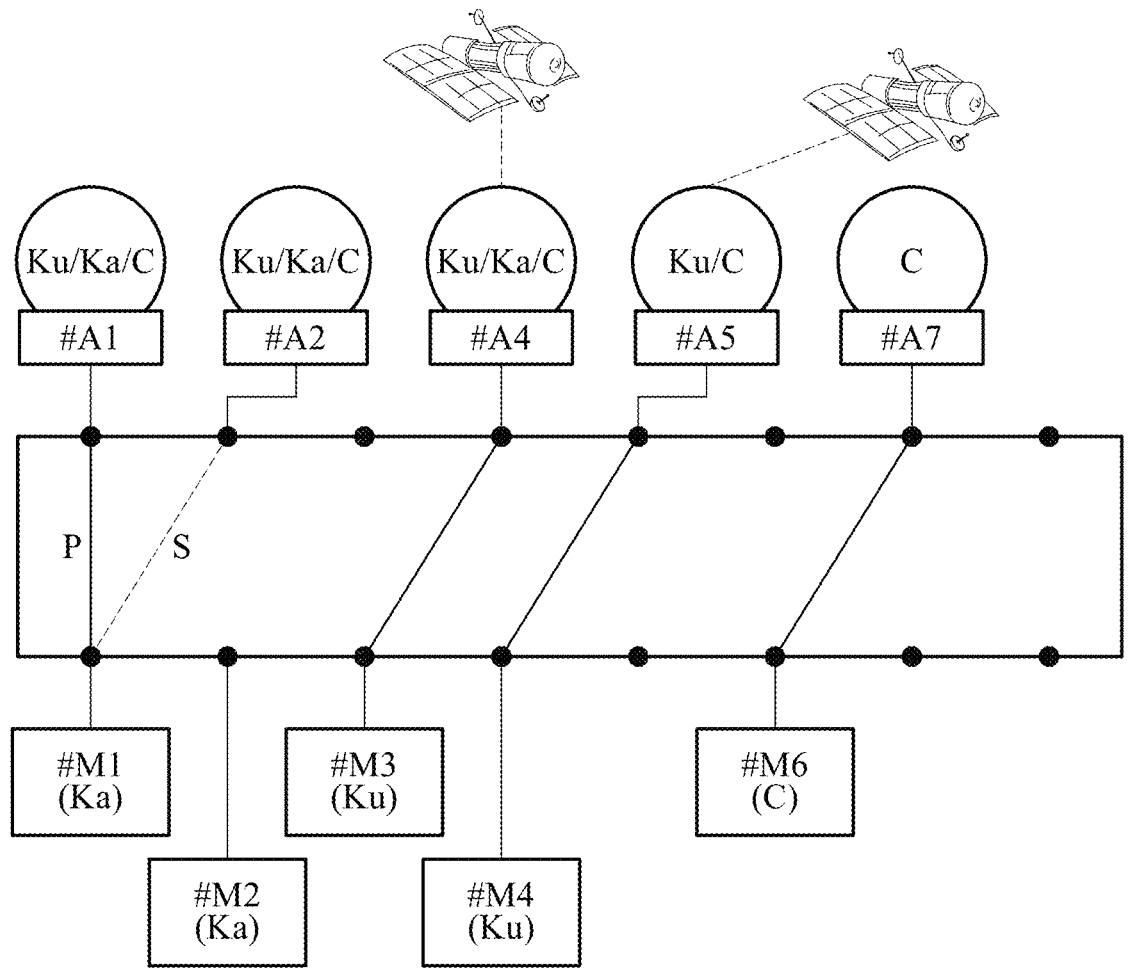
FIG. 14A illustrates a situation before switching of a mediator, when passing through a service coverage change area.
Figure 14B:
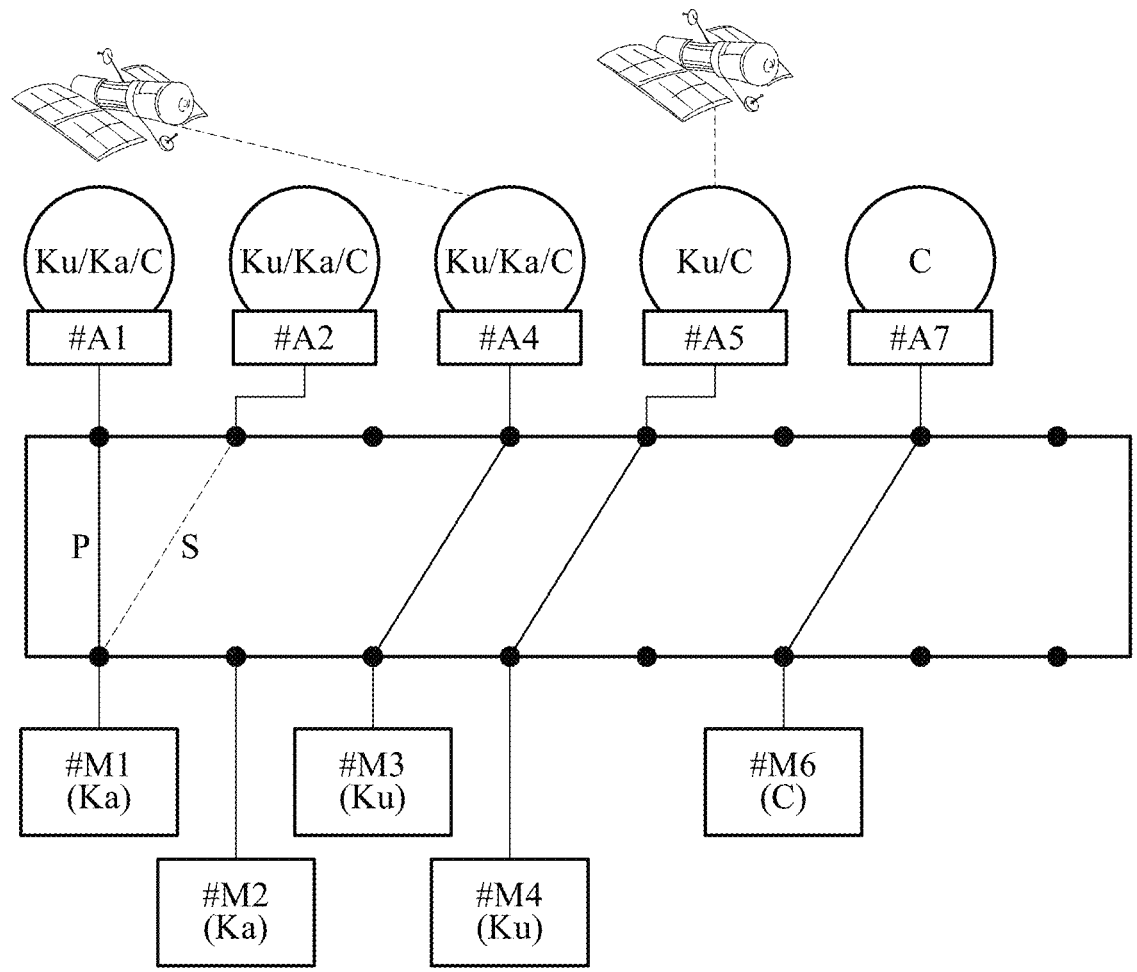
FIG. 14B illustrates a situation after switching of a mediator, when passing through a service coverage change area.
Figure 14C:
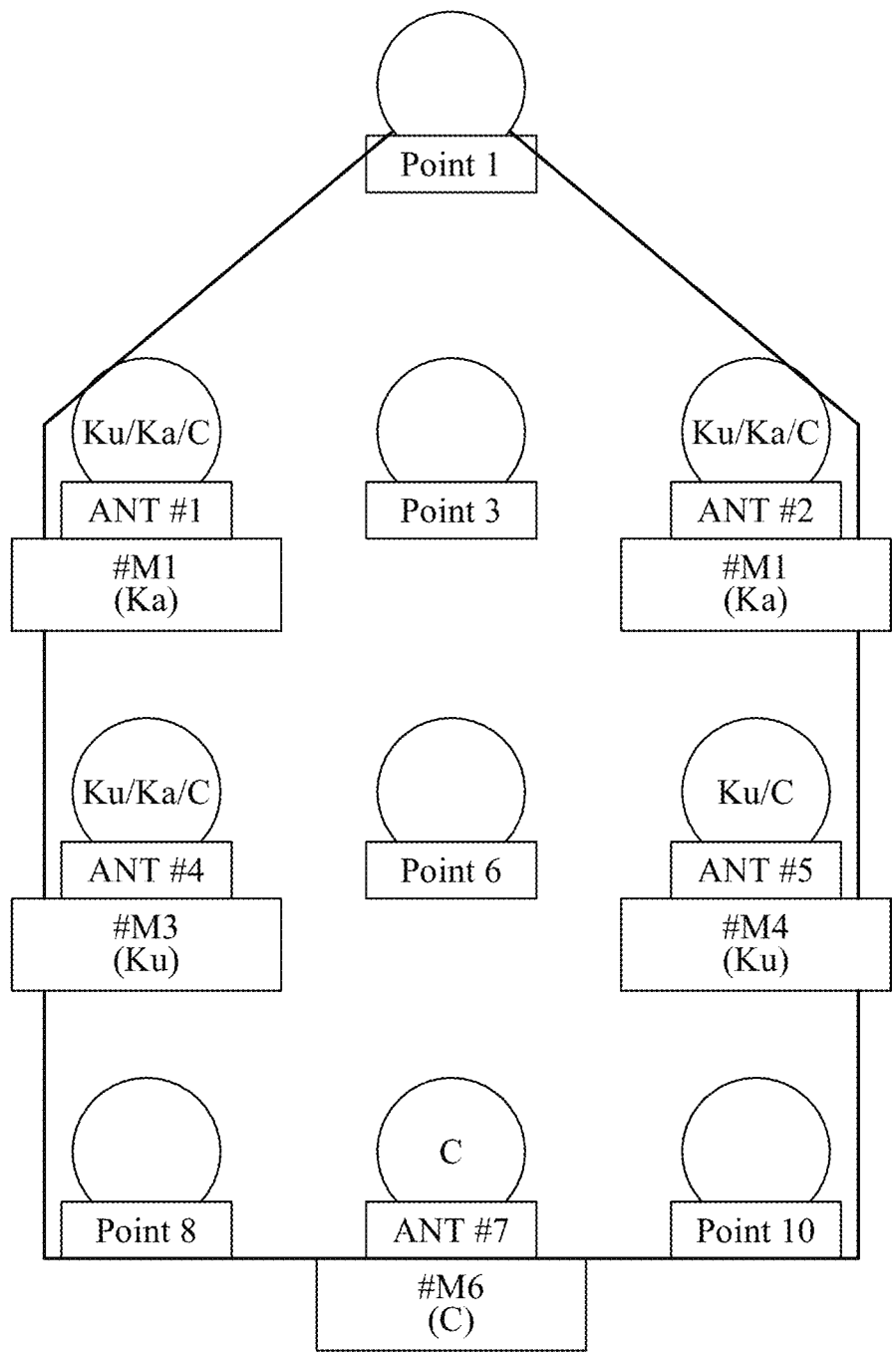
FIG. 14C illustrates locations of antennas in FIGS. 14A and 14B.

FIGS. 14A to 14C illustrate a switching operation of a mediator and locations of antennas, when passing through a service coverage change area.

Referring to FIGS. 14A to 14C, a second processor 200 of FIG. 2 may receive location information of the second processor 200. The second processor 200 may generate a control signal to change a link between at least one antenna 50 and at least one modem 70 of FIG. 2 based on the received location information.

For example, the second processor 200 may receive location information from a GPS. The second processor 200 may determine whether a mobile vehicle passes through a service coverage change area, based on the received location information, and, at this time, may generate a control signal to change a link between the at least one antenna 50 and the at least one modem 70.

In a policy applied to an example of FIGS. 14A to 14C, an orbit priority of a satellite 30 of FIG. 1 may be an order of an MEO and a GEO and a band priority of the MEO may be an order of Ka and Ku bands. A band priority of the GEO may be an order of Ku, Ka, and C bands, and a priority for a service provider may be set if necessary. Modem #M1 and antennas #A1 and #A2 may be included in a group corresponding to the MEO.

The second processor 200 may generate a control signal to connect a link between the antenna 50 and the modem 70 to communicate with a satellite with strong signal intensity among a plurality of satellites in the service coverage change area. For example, the second processor 200 may generate a control signal such that the same type of modem tracks different satellites and connects to the satellite with a stronger signal, in the service coverage change area based on the received condition.

The second processor 200 may switch a link between the antenna 50 and the modem 70 based on location information and intensity of a satellite signal. For example, when the second processor 200 is currently located in a predetermined area (e.g., a service coverage change area), it may generate a control signal to use a link between antenna #A5 and modem #M4 without using a link between antenna #A5 and modem #M3.

FIG. 14C illustrates locations of the plurality of antennas 50 on a ship and modems 70 connected with the plurality of antennas 50, when the second processor 200 and a mediator 300 are located on the motile vehicle.

Figure 15A:
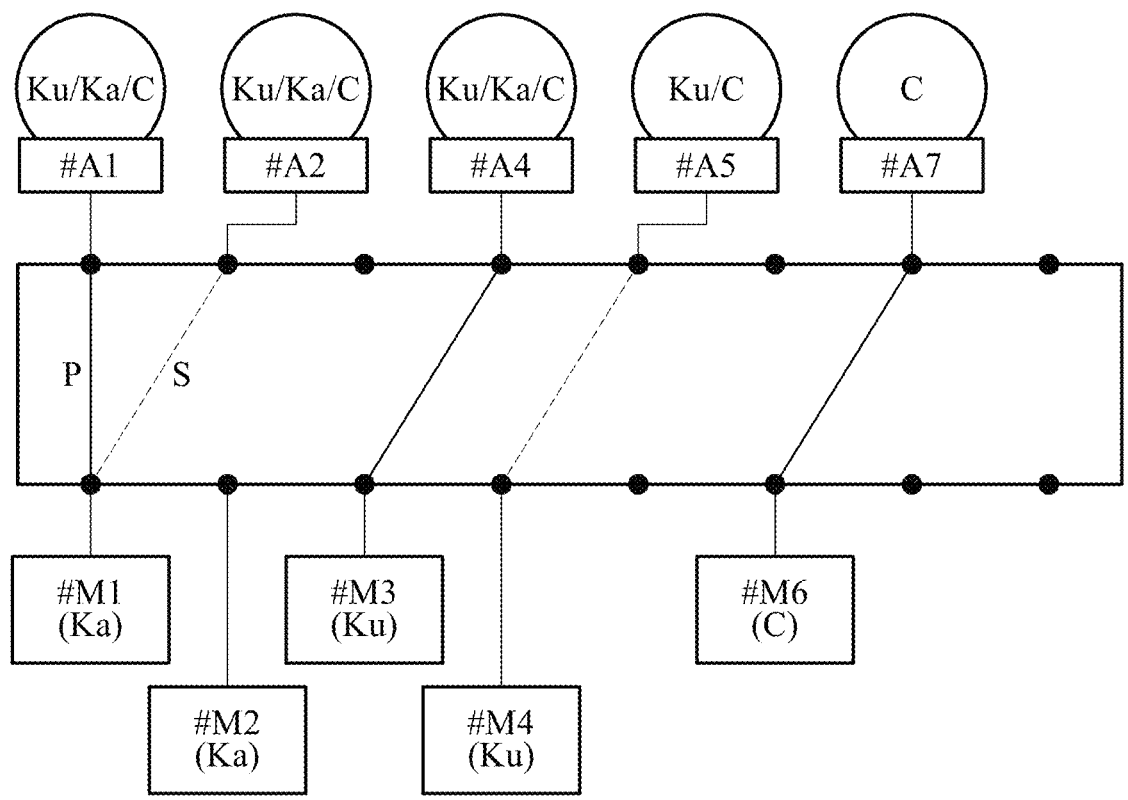
FIG. 15A illustrates a situation before switching of a mediator, when changing a service provider.
Figure 15B:
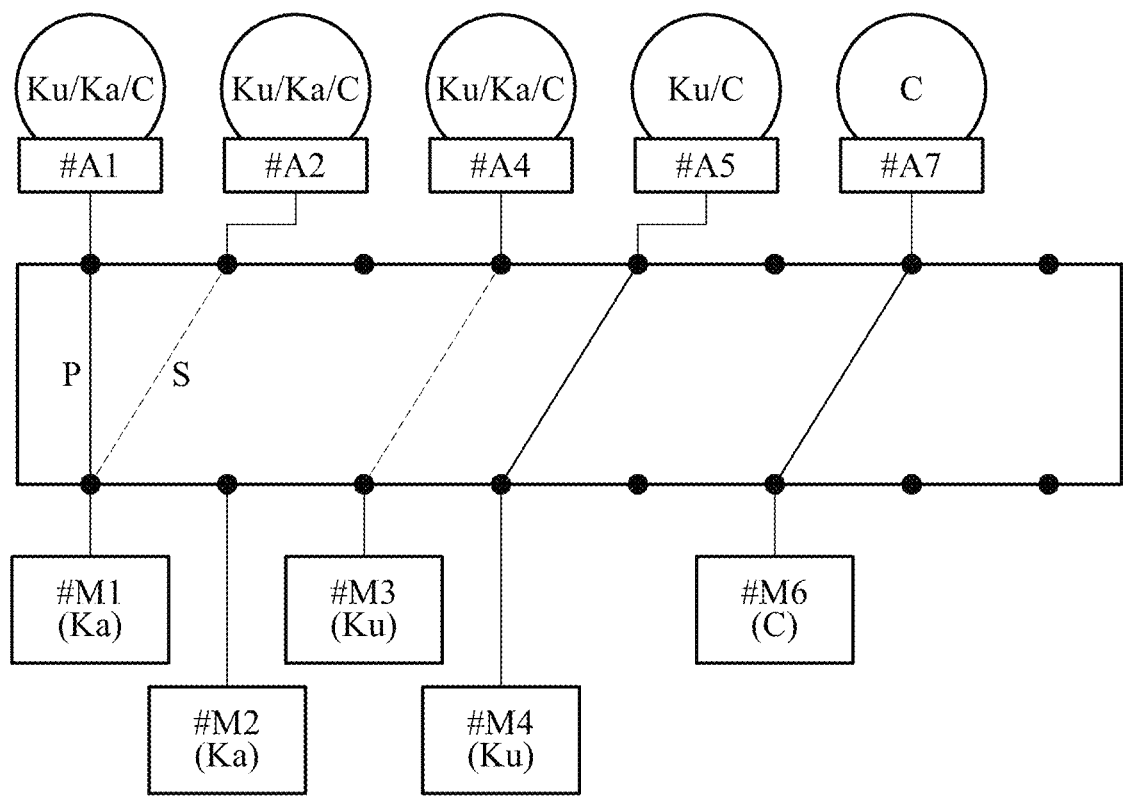
FIG. 15B illustrates a situation after switching of a mediator, when changing a service provider.
Figure 15C:
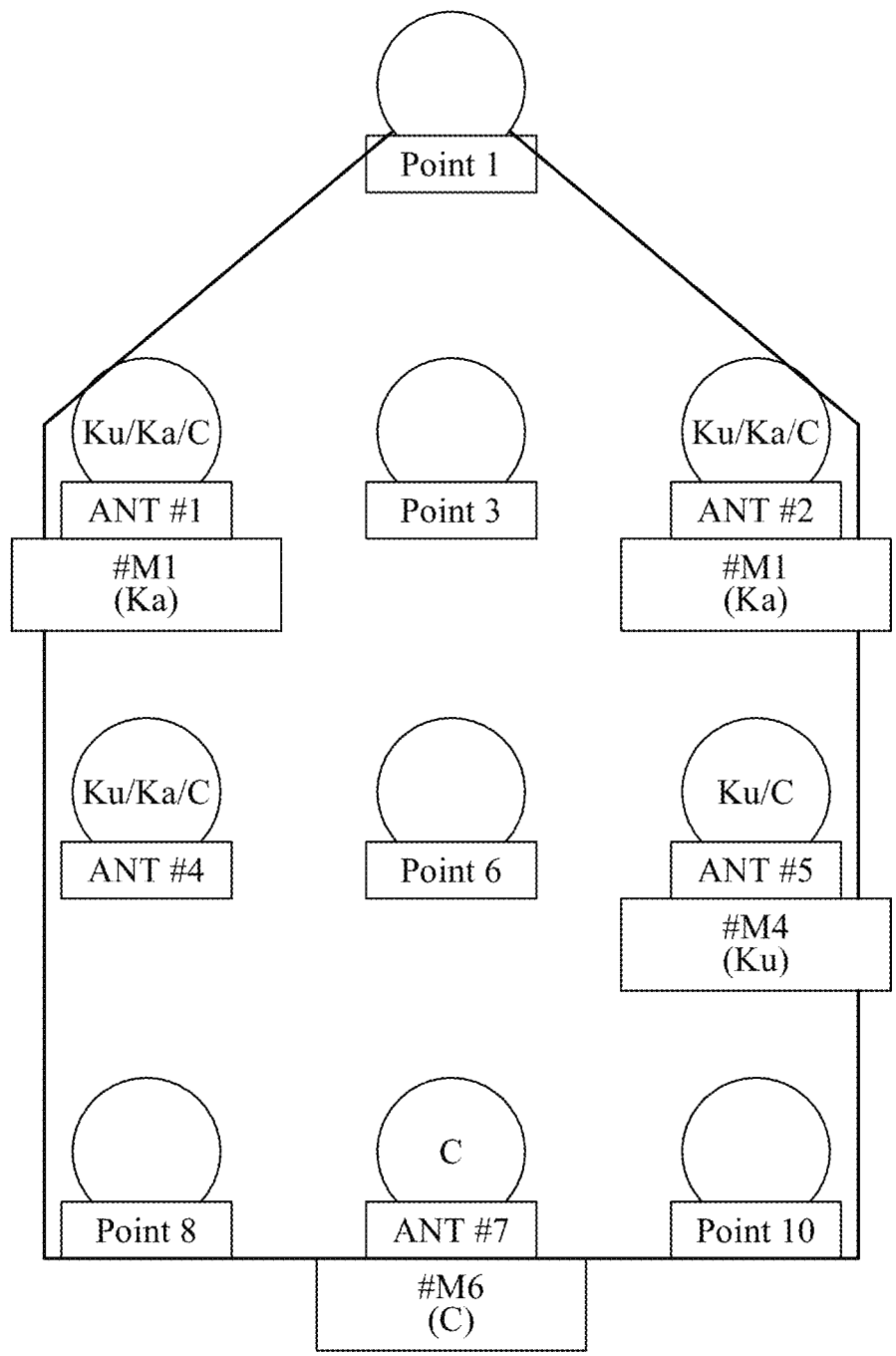
FIG. 15C illustrates locations of antennas in FIGS. 15A and 15B.

FIGS. 15A to 15C illustrate a switching operation of a mediator and locations of antennas, when changing a service provider.

Referring to FIGS. 15A to 15C, a second processor 200 of FIG. 2 may receive location information of the second processor 200 and may obtain a communication speed, service cost information, and a bandwidth of each of a plurality of service providers which provide satellite communication based on the location information.

The second processor 200 may generate a control signal to change a service provider based on the communication speed, the service cost information, and the bandwidth of each of the plurality of service providers.

In a policy applied to an example of FIGS. 15A to 15C, an orbit priority of a satellite 30 of FIG. 1 may be an order of an MEO and a GEO and a band priority of the MEO may be an order of Ka and Ku bands. A band priority of the GEO may be an order of Ku, Ka, and C bands, and a priority for a service provider may be set if necessary. Modem #M1 and antennas #A1 and #A2 may be included in a group corresponding to the MEO.

The second processor 200 may switch a link between the antenna 50 and the modem 70 to use an optimal service provider considering performance and costs by determining a priority for a service provider depending on a location of the second processor 200.

For example, when the current location is any predetermined point, the second processor 200 may select the service provider by comparing network speeds, bandwidths, and prices of the plurality of service providers at any point and may generate a control signal to connect a link between the antenna 50 and the modem 70 to use a service of the selected service provider.

In an example of FIG. 15A, when a link between antenna #A4 and modem #M3 corresponds to a first service provider and when a link between antenna #A5 and modem #M4 corresponds to a second service provider, the second processor 200 may generate a control signal to connect a link between antenna #A5 and modem #M4 to compare speeds, bandwidths, and prices of the first service provider and the second service provider and communicate with the second service provider.

FIG. 15C illustrates locations of the plurality of antennas 50 on a mobile vehicle and modems 70 connected with the plurality of antennas 50, when the second processor 200 and a mediator 300 are located on the mobile vehicle.

Figure 16A:
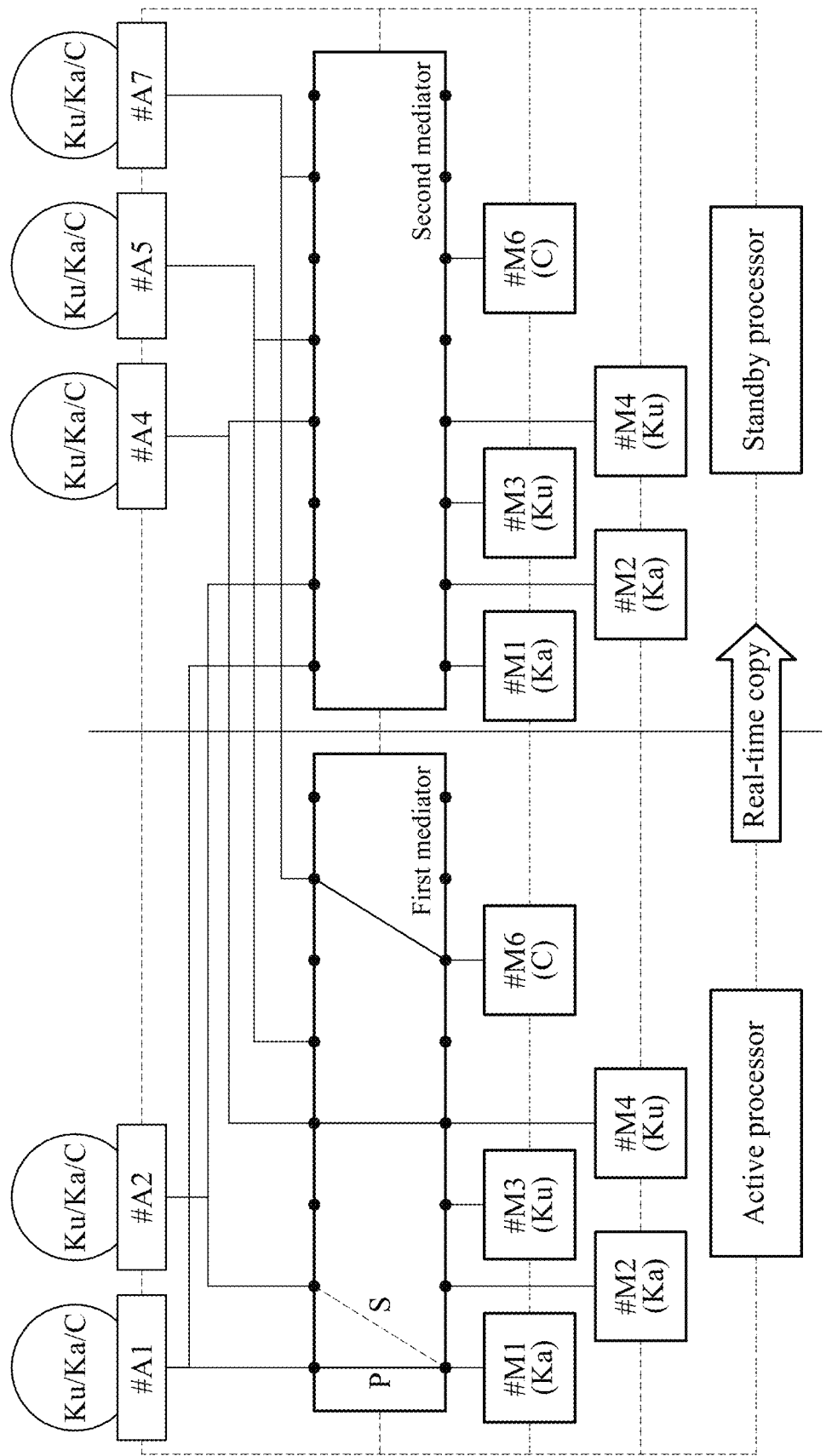
FIG. 16A illustrates an example of a configuration of a data center, when there are a plurality of mediators.
Figure 16B:
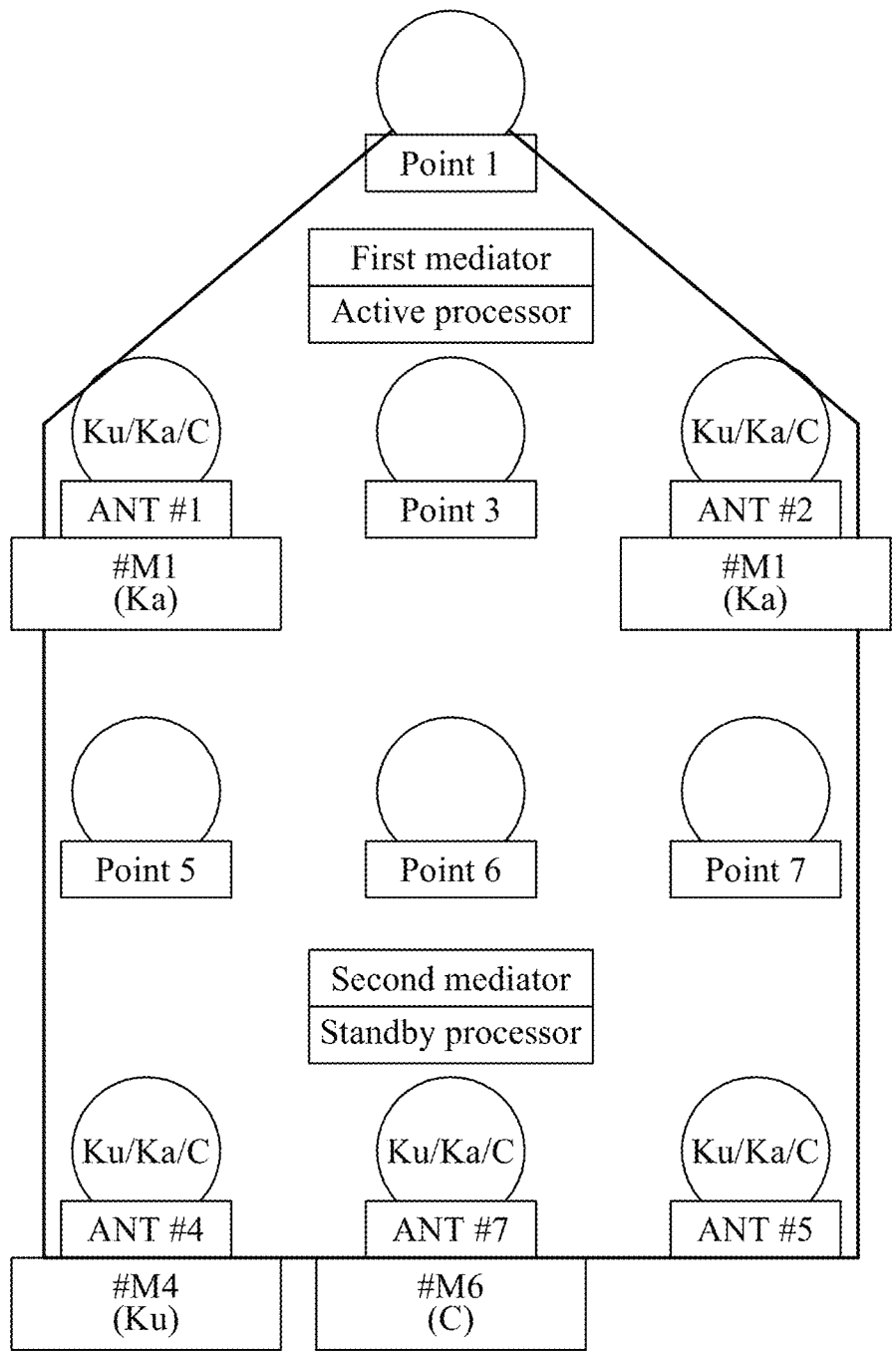
FIG. 16B illustrates locations of antennas in FIG. 16A.

FIG. 16A illustrates an example of a configuration of a data center, when there are a plurality of mediators. FIG. 16B is illustrates locations of antennas in FIG. 16A.

Referring to FIGS. 16A and 16B, a second processor 200 of FIG. 2 may be implemented as a plurality of processors.

The second processor 200 may be implemented as a single processor or the plurality of processors to control a plurality of mediators 300 of FIG. 2.

For example, the second processor 200 may include an active processor and a standby processor.

The active processor may generate a control signal to control one of a first mediator and a second mediator included in the mediator 300.

The second processor 200 may configure two independent data centers and may independently operate them. For example, the second processor 200 may copy configuration of the active processor and the first mediator to the standby processor and the second mediator.

In this case, only the data center by the active processor may perform an orchestration function.

FIG. 16B illustrates locations of the plurality of antennas 50 on a mobile vehicle and modems 70 connected with the plurality of antennas 50, when the second processor 200 and the mediator 300 are located on the mobile vehicle.

Figure 17A:
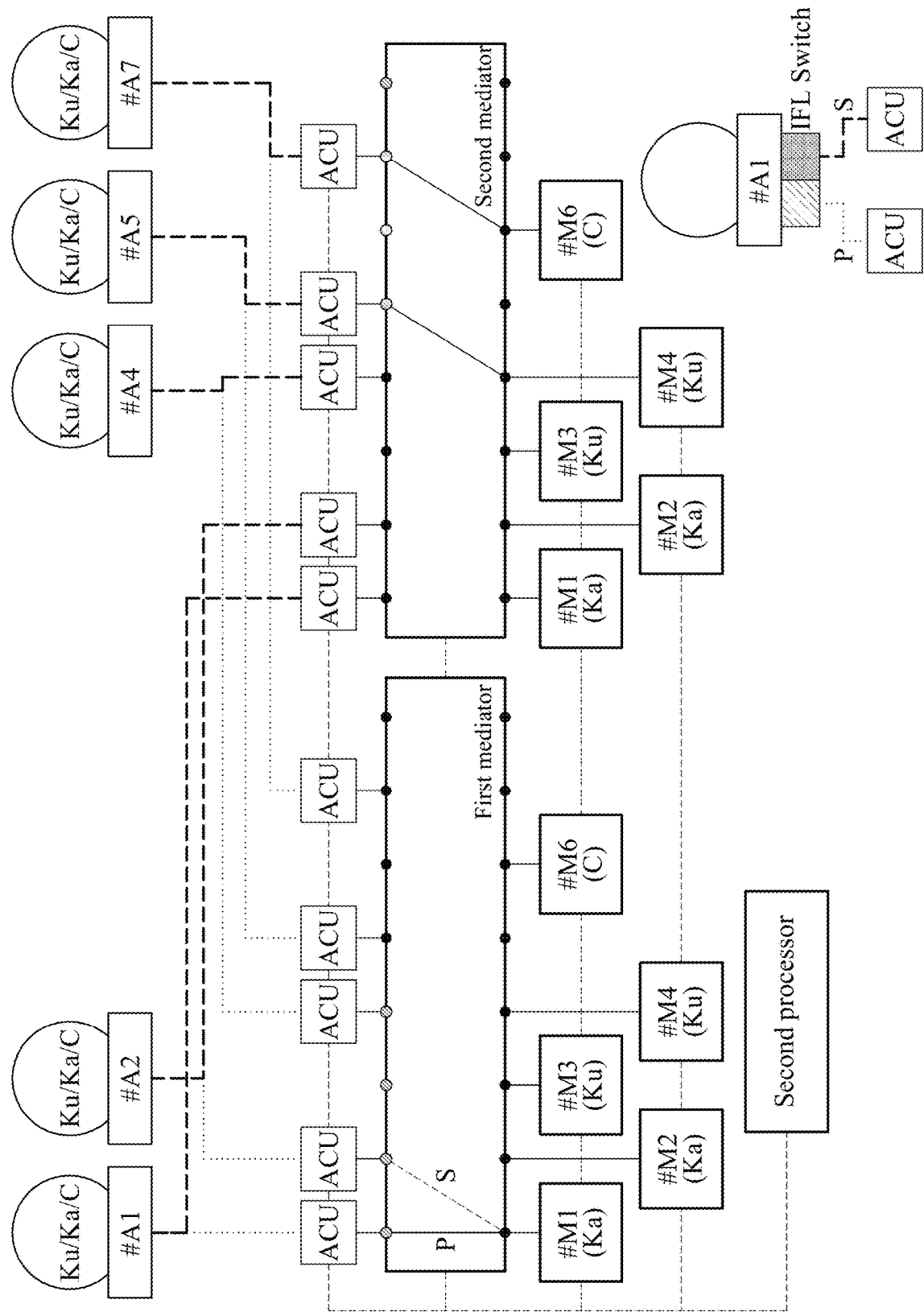
FIG. 17A illustrates another example of a configuration of a data center, when there are a plurality of mediators.
Figure 17B:
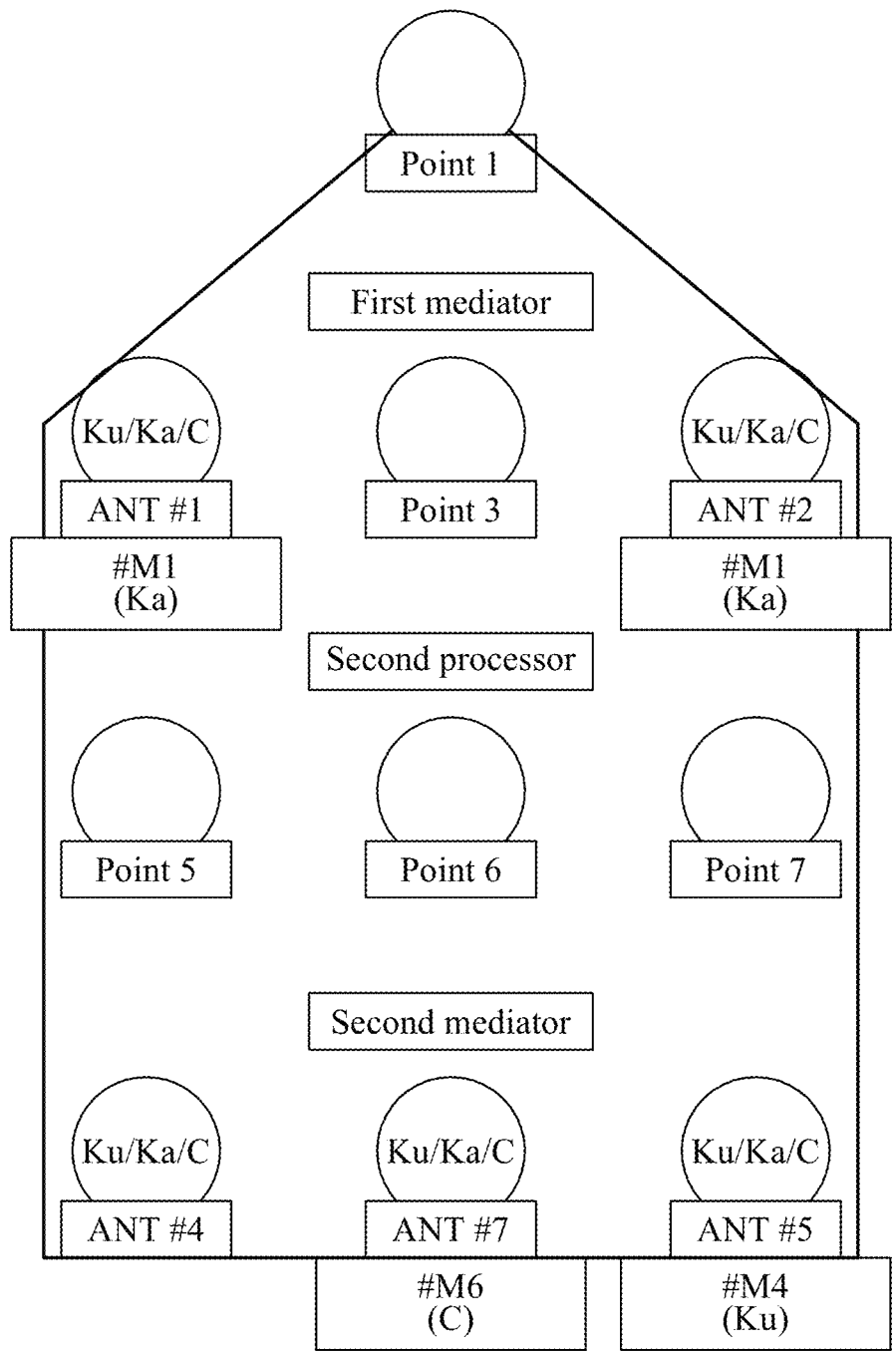
FIG. 17B illustrates locations of antennas in FIG. 17A.

FIG. 17A illustrates another example of a configuration of a data center, when there are a plurality of mediators. FIG. 17B illustrates locations of antennas in FIG. 17A.

Referring to FIGS. 17A and 17B, a second processor 200 of FIG. 2 may generate a control signal such that a first mediator and a second mediator switch a link between different antennas.

For example, the second processor 200 may implement HA by constructing a data center using the two mediators 300. In this case, the second processor 200 may integrally control a plurality of MESs.

The second processor 200 may designate a primary/secondary mediator for each antenna port of the mediator 300 and may implement HA for the antenna 50, such that the two mediators 300 does not use an antenna 50 of FIG. 2 redundantly.

Figure 18:
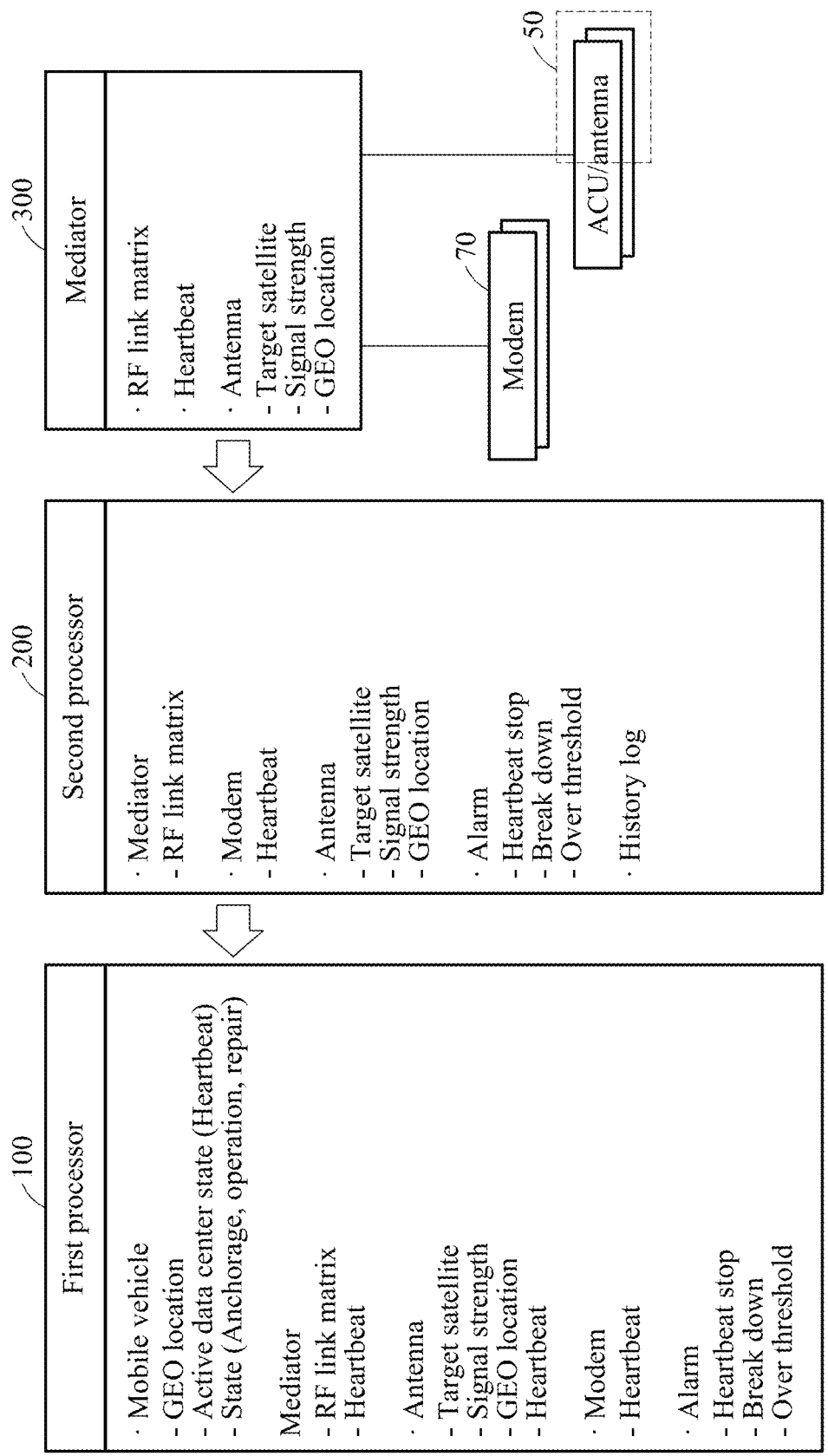
FIG. 18 illustrates flow of monitoring data.

FIG. 18 illustrates flow of monitoring data.

Referring to FIG. 18, a mediator 300 may monitor a satellite communication asset to generate monitoring data. For example, the mediator 300 may monitor an antenna 50, a modem 70, and an ACU to collect monitoring data. The mediator 300 may transmit the generated monitoring data to the second processor 200.

The monitoring data generated by the mediator 300 may include an RF link matrix, a heartbeat signal for the satellite communication asset, and monitoring data about the antenna 50. The monitoring data may further include operation information of the satellite communication asset.

The RF link matrix may refer to a matrix indicating a connection relationship between the plurality of antennas 50 and the plurality of modems 70. As described above, the heartbeat signal may refer to a signal indicating whether the satellite communication asset is normally operated. The second processor 200 and the mediator 300 may periodically monitor a heartbeat signal with respect to the satellite communication asset. It may be determined whether the satellite communication asset is normally operated, through the monitoring of the heartbeat signal.

The operation information of the satellite communication asset may include the connected satellite 30, a used orbit, a connected band, signal strength, a history log, whether the satellite communication asset breaks down, and a threshold.

The monitoring data about the antenna 50 may include a target satellite, signal strength, and a GEO location.

The second processor 200 may generate an alarm and a history log based on the monitoring information received from the mediator 300.

The alarm may include an alarm indicating that a heartbeat is stopped, an alarm indicating that the satellite communication asset breaks down, and an alarm indicating that it exceeds the threshold.

The second processor 200 may transmit the monitoring data to the first processor 100. For example, the second processor 200 may transmit an RF link matric, a heartbeat signal, monitoring data about the antenna 50, an alarm, and a history log.

The first processor 100 may manage the second processor 200 and the mediator 300 based on the received monitoring data. The first processor 100 may monitor states of a ship, the mediator 300, the antenna 50, and the modem 70 and may correct scheduling data based on the monitored states.

The first processor 100 may determine a GEO location about a mobile vehicle, an active data center state (e.g., a heartbeat signal), a state of the satellite communication asset, and a state of the mobile vehicle. The state of the mobile vehicle may include anchorage, operation, and repair.

FIGS. 19 to 21B illustrate examples of a UXI provided by a second processor.

Referring to FIGS. 19 to 21B, a second processor 200 of FIG. 2 may provide a UXI for asset configuration and RF switching configuration. The second processor 200 may provide an asset registration and edit function through an asset configuration menu of the UXI.

The second processor 200 may provide a UXI capable of hierarchically managing a satellite communication asset. For example, satellite communication assets may have a hierarchical structure on the basis of one mobile vehicle.

The satellite communication asset having the hierarchical structure may include one or more mediators 300 and one or more antennas 50 and modems 70 which are dependent on the mediator 300. Each antenna 50 may be managed together with location information of the second processor 200 installed on a mobile vehicle.

Figure 19:
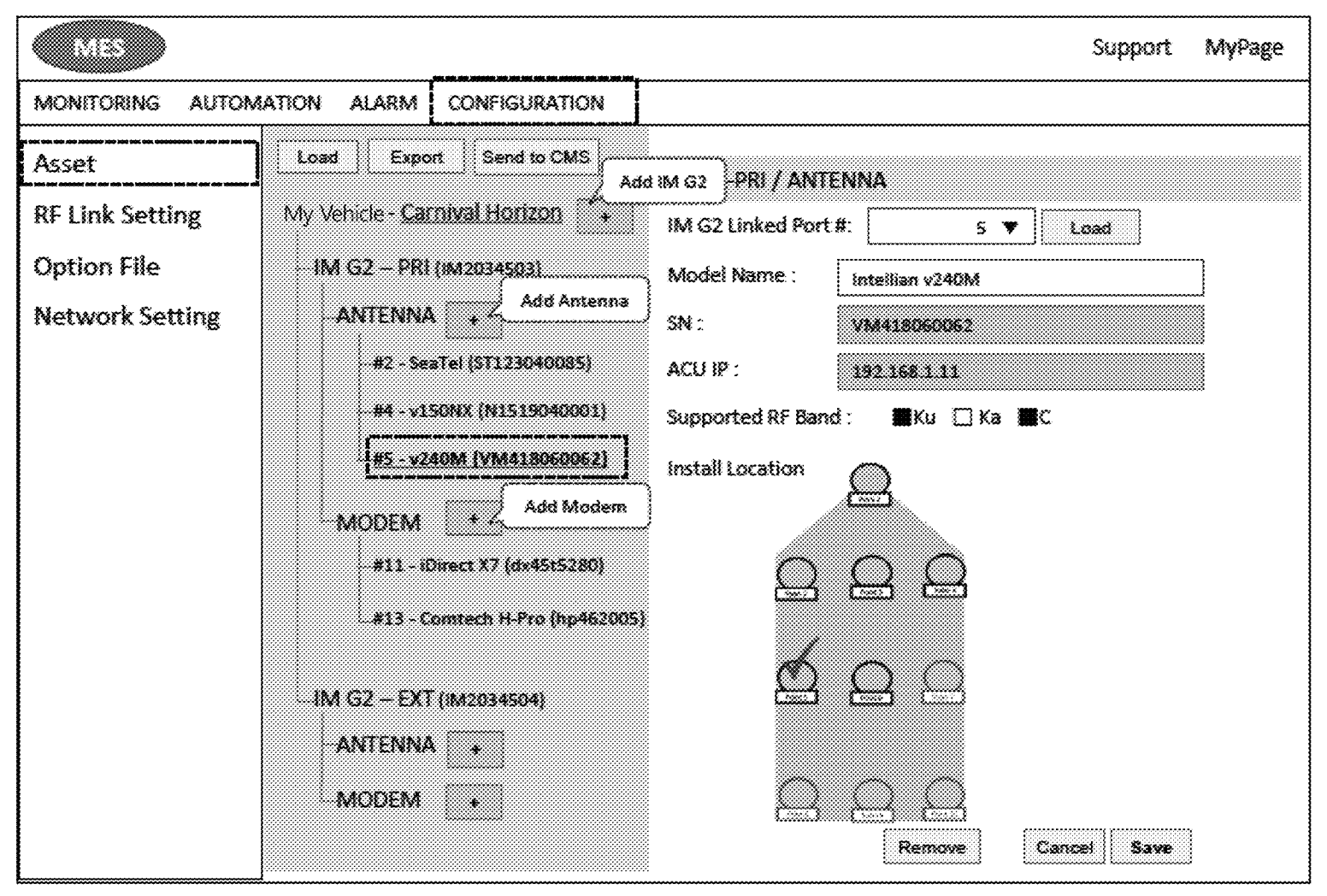

In an example of FIG. 19, the UXI may provide hierarchical asset structure and management. Auto detectable items may be filled through a load button of the UXI. The auto detectable item may include items about the mediator 300, the antenna 50, and the modem 70.

The item about the mediator 300 may include Internet protocol (IP), serial number (SN), port count items.

The asset configuration may be output as a file and may be loaded from the file.

Figure 20:
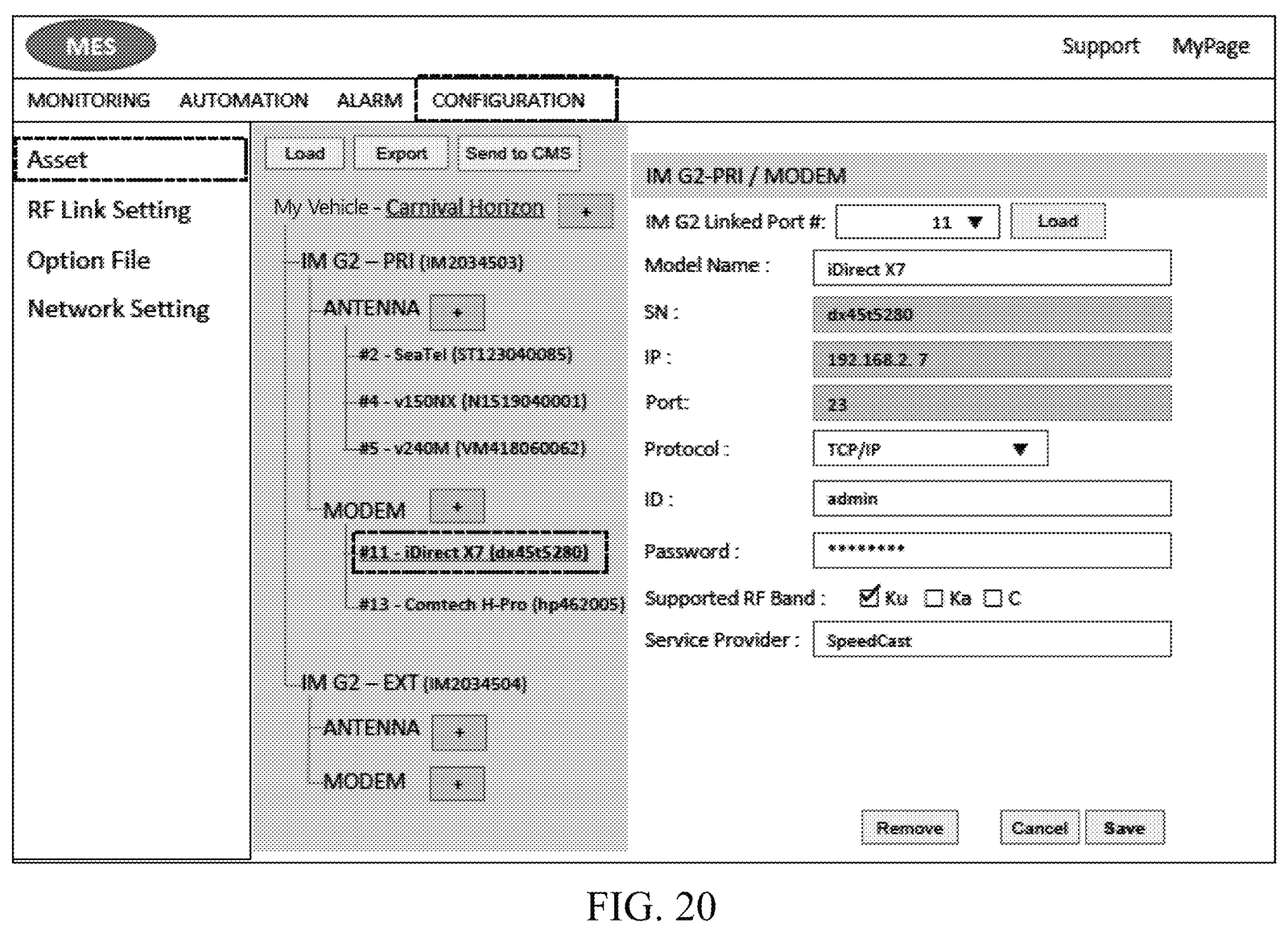

An example of FIG. 20 may indicate a configuration screen for the modem 70.

Figure 21A:
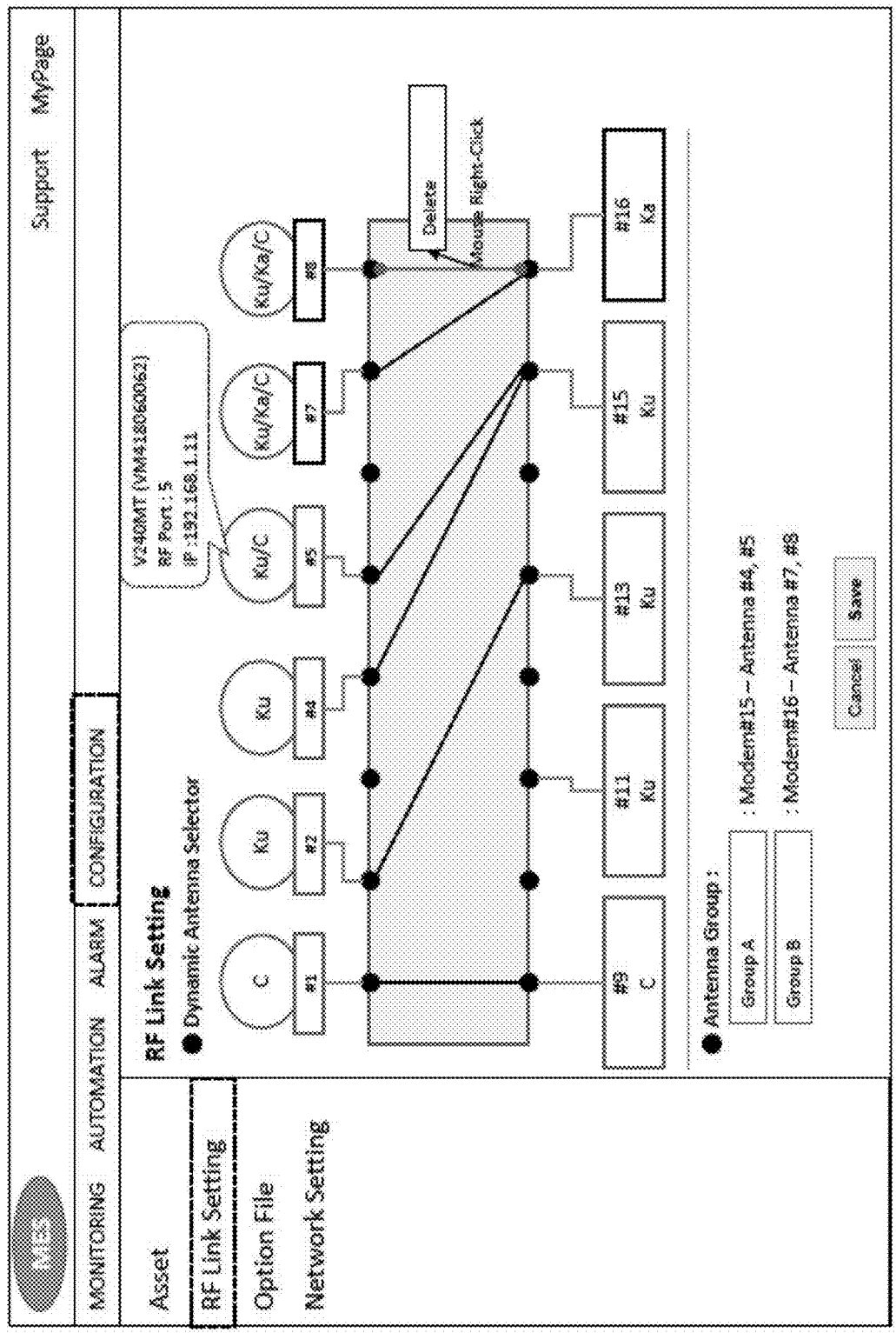
FIG. 21A illustrates an example of a UXI for setting an RF link at a second processor.

An example of FIG. 21A may indicate an RF link configuration interface. The RF link configuration may provide an RF linkable configuration for automated mediation. A user may drag a connection relationship between the antenna 50 and the modem 70 to set a connection.

In other words, a satellite communication device 10 of FIG. 1 may provide an interface, capable of switching an RF link between the antenna 50 and the modem 70, to the user intuitively through a UXI.

In an example of FIG. 21A, the one modem 70 may be connected with the plurality of antennas 50. Furthermore, the one antenna 50 may be connected with each of the plurality of modems 70.

A name of an antenna group may be set through a UXI, and it is set whether to grant or block a connection to an antenna group corresponding to a specific orbit.

Figure 21B:
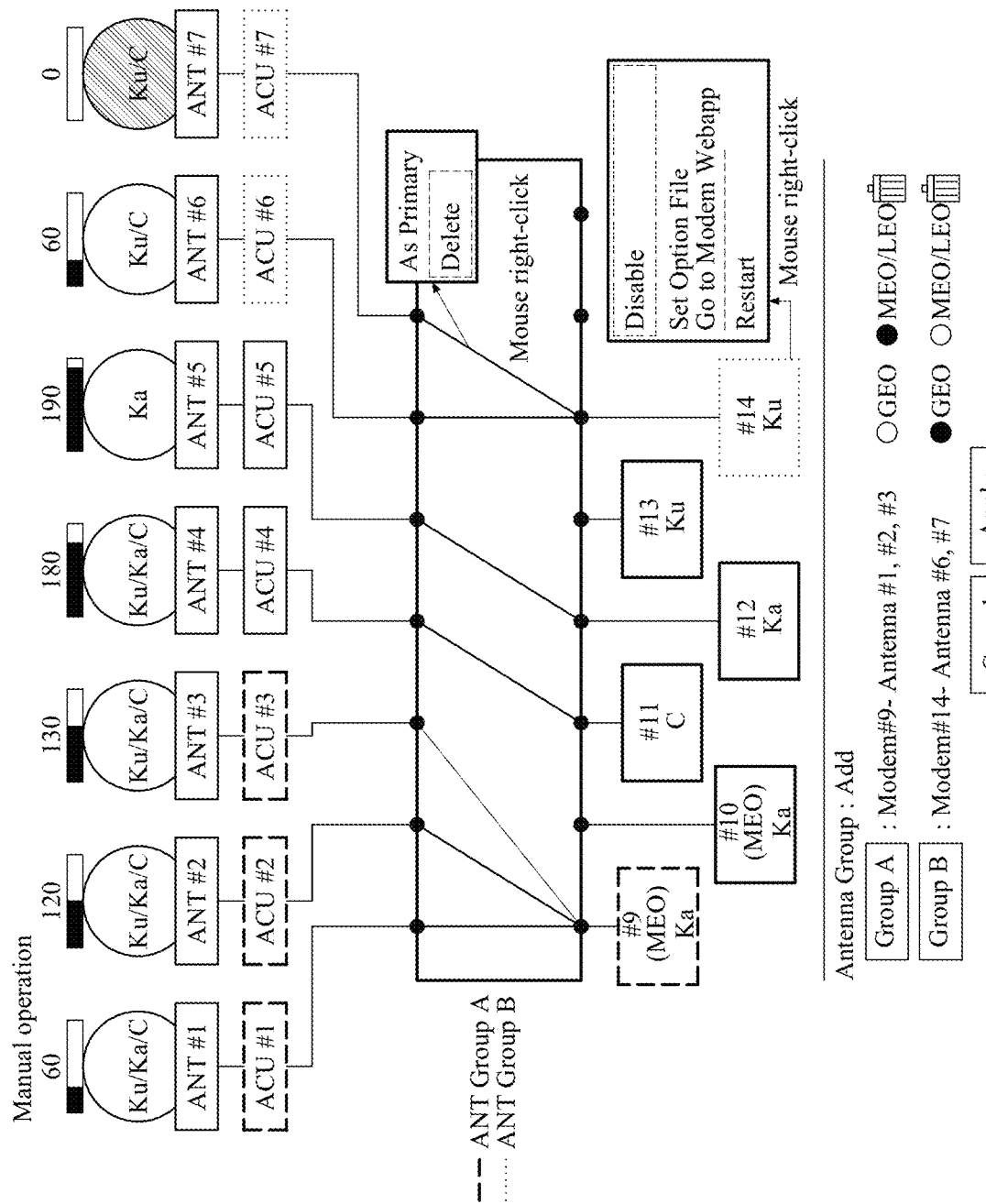
FIG. 21B illustrates another example of a UXI for setting an RF link at a second processor.

Like an example of FIG. 21B, the second processor 200 may provide a UI about an RF link method between the antenna 50 and the modem 70. The second processor 200 may simplify configuration between satellite communication assets through the UI. For example, the second processor 200 may provide a UI capable of easily connecting a link between the antenna 50 and the modem 70 through drag & drop.

In this case, when the icon is dragged, the second processor 200 may prevent an attempt to connect an impossible RF link by displaying a connectable satellite communication asset.

Furthermore, the second processor 200 may provide a UI capable of performing an operation about switching of the antenna 50 in one place.

FIGS. 22 to 27 illustrate examples of a UXI about mediation configuration and monitoring data of a first processor and a second processor.

Referring to FIGS. 22 to 27, a second processor 200 of FIG. 2 may provide a configuration function for automated mediation. In an example of FIG. 22, the second processor 200 may set a policy and a condition. The policy may include a scanner, an orbit priority, a band priority, an antenna priority, and a service provider priority.

The condition may include an asset fault, a blockage, signal strength, weather, a scanner, default (or normal), a GEO location, and a time.

Figure 23:
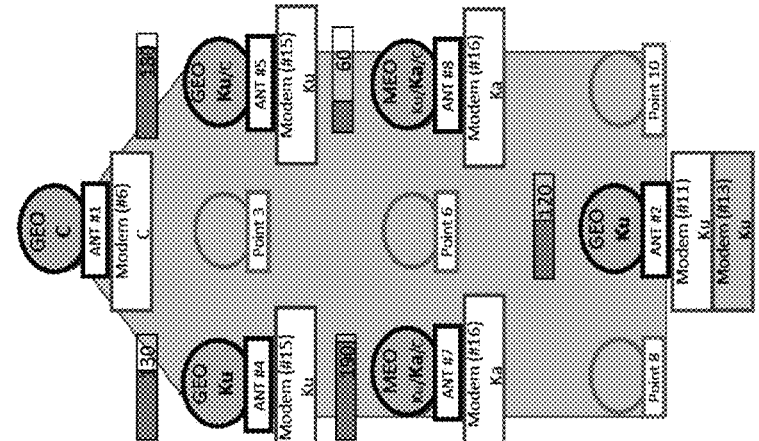
FIG. 23 illustrates another example of a UXI for a setting about mediation of a second processor.
Figure 24:
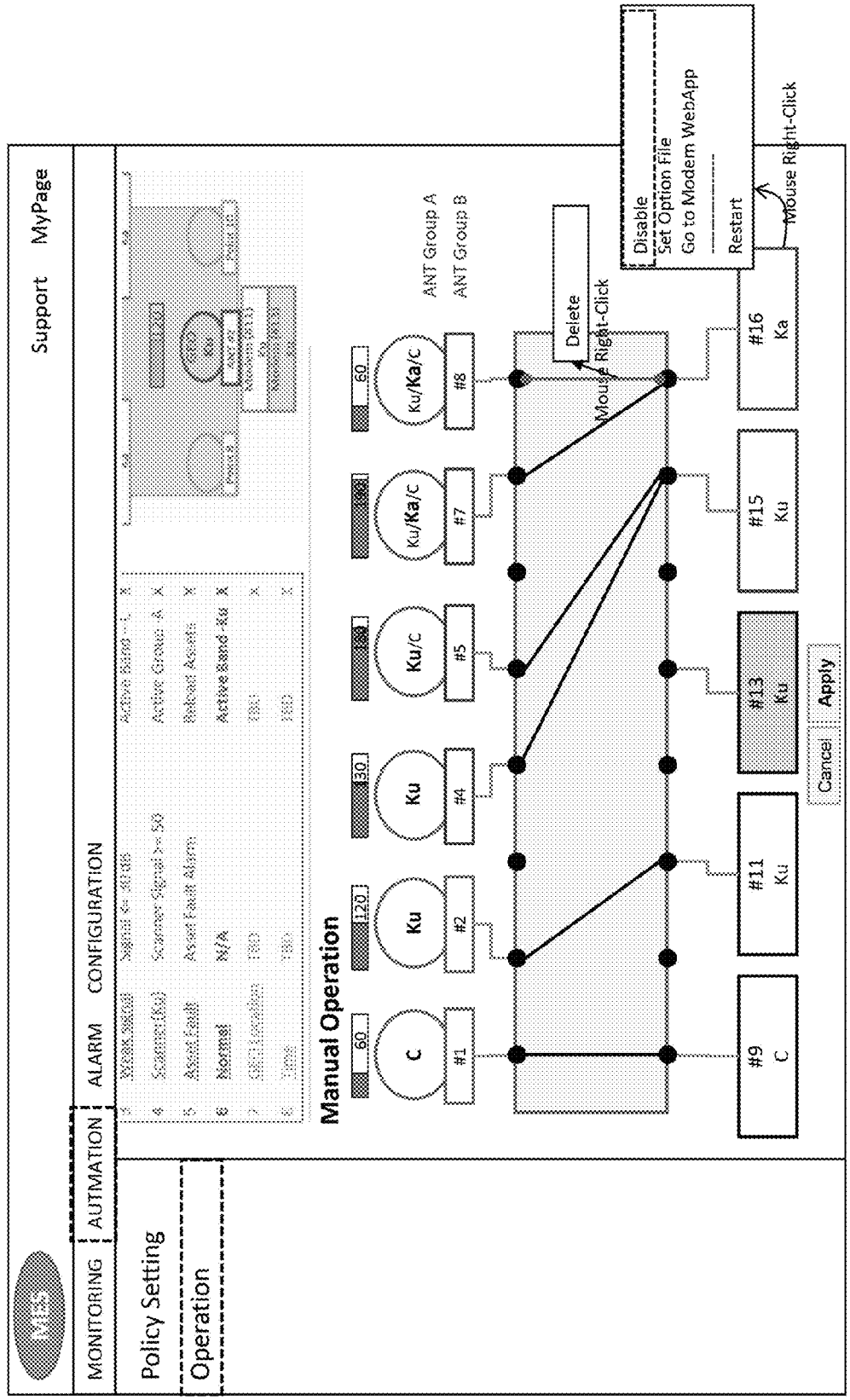
FIG. 24 illustrates another example of a UXI for a setting about mediation of a second processor.

Like an example of FIGS. 23 and 24, the second processor 200 may provide an automatic mode and a manual mode. When the automatic mode is selected, the second processor 200 may automatically perform mediation without intervention of a user. The second processor 200 may display a current satellite communication state and an applied condition through a UXI.

The user may directly switch a connection between an antenna 50 and a modem 70 of FIG. 2 in the manual mode. The second processor 200 may allow the user to determine whether use a satellite network through a UXI. For example, the UXI may provide a menu capable of selecting to enable and disable the satellite network.

Figure 25:
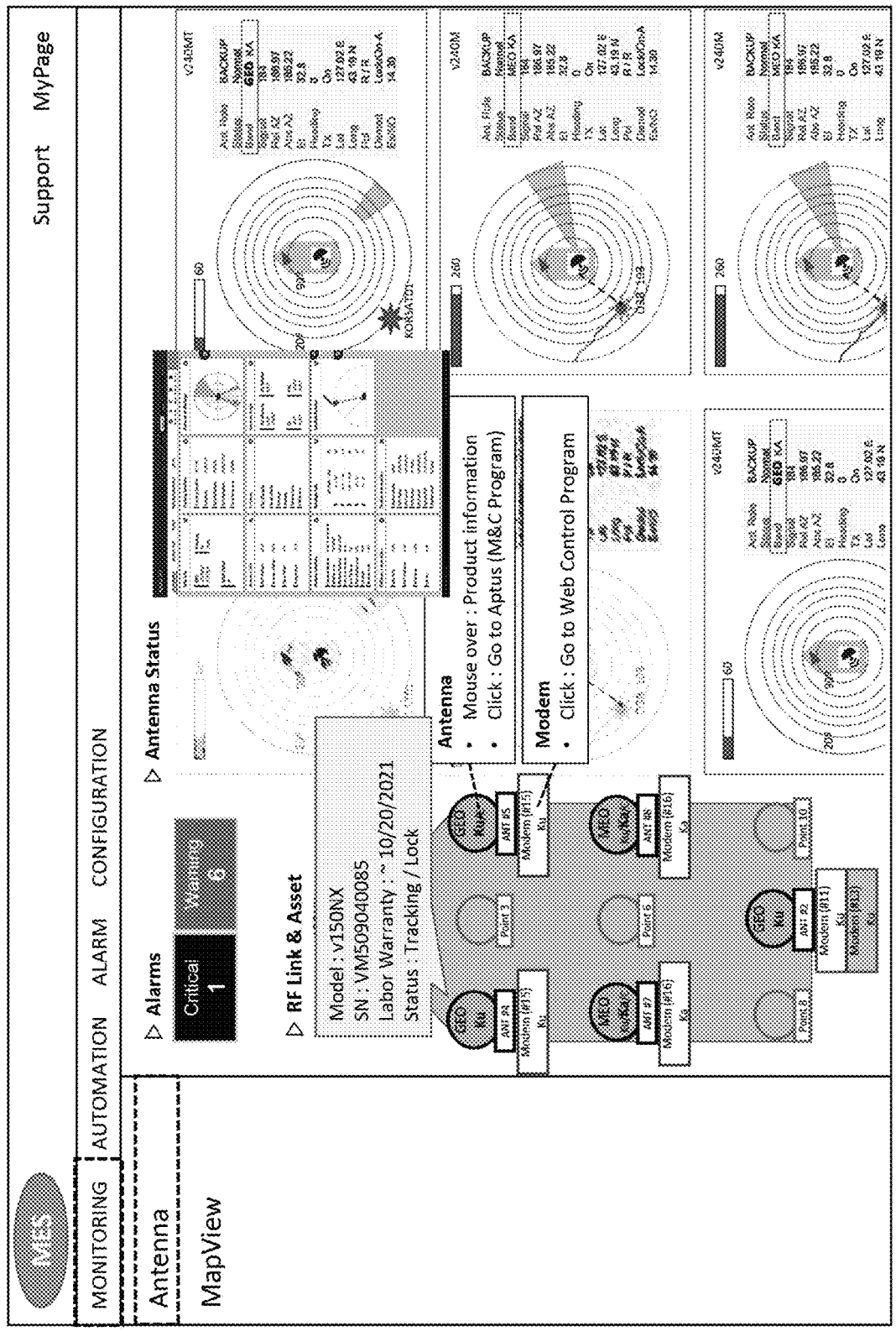
FIG. 25 illustrates an example of a UXI about monitoring data of a second processor.

An example of FIG. 25 may indicate a monitoring UXI for the antenna 50. The monitoring data may include a monitoring screen about an alarm, an RF link, and an asset.

The alarm item may provide an alarm count. The item about the RF link and the asset may provide an RF connection state between the antenna 50 and the modem 70, product information, and information about an asset. Furthermore, the second processor 200 may provide detailed information of the antenna 50 through the monitoring UXI.

The second processor 200 may display location information of the installed antenna 50 and detailed state information for each antenna 50 on a dashboard. As a result, the second processor 200 may provide a UXI capable of determining an operation state of the satellite communication asset at a glance.

The second processor 200 may provide information capable of predicting a blockage according to a location. When it is able to move the cursor of the mouse on the antenna icon, the second processor 200 may display product information of the antenna 50 using a help balloon.

In this case, the second processor 200 may provide a detailed configuration value of the antenna 50 through an antenna configuration program.

Figure 26:
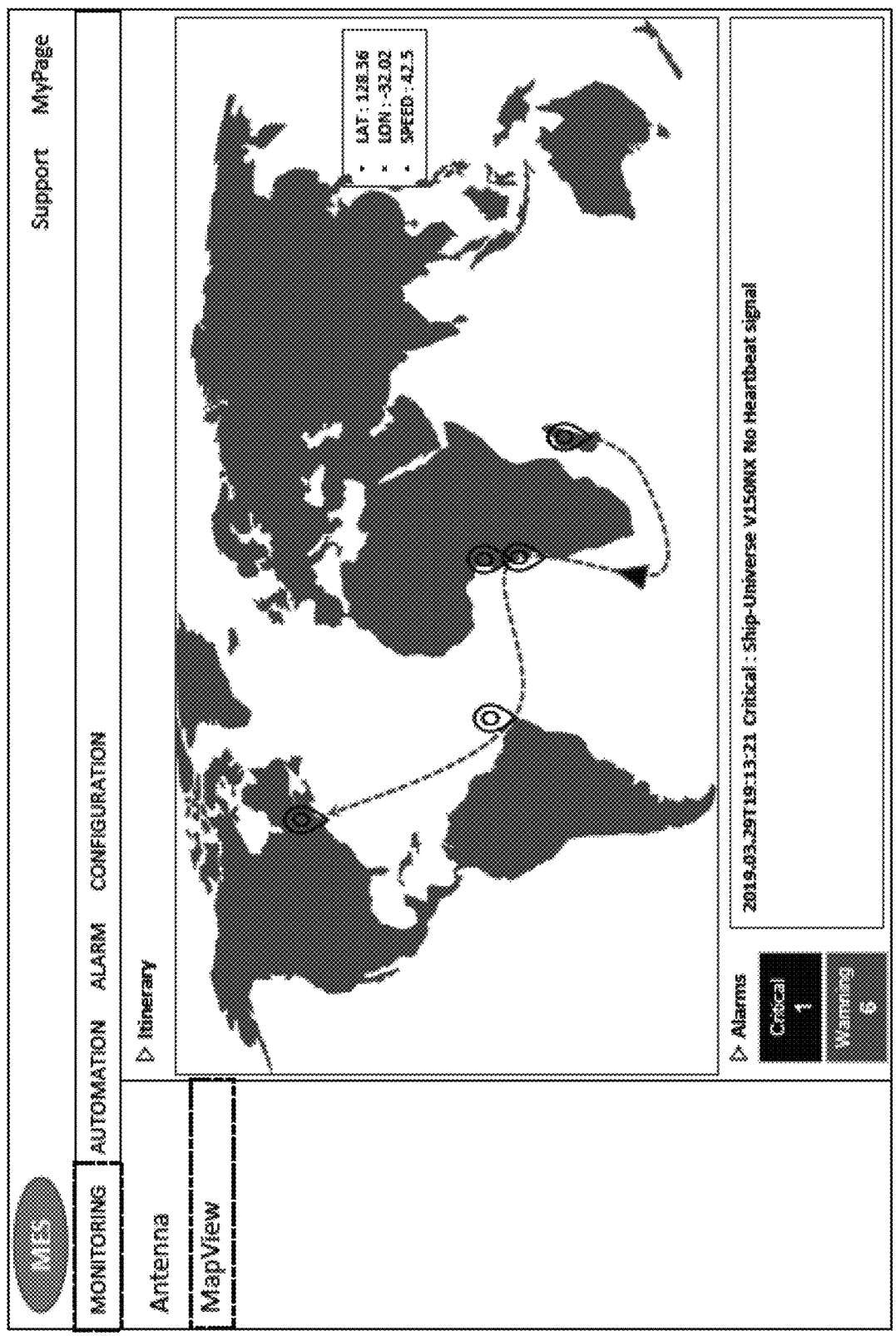
FIG. 26 illustrates another example of a UXI about monitoring data of a second processor.

Like an example of FIG. 26, the second processor 200 may provide a map view. The second processor 200 may display an alarm count or a signal level of an active antenna on the map view and may provide a function of changing a view mode.

The map view may provide a journey of a mobile vehicle, a current location of the mobile vehicle, and a state of a ship and may include a currently generated alarm message.

Figure 27:
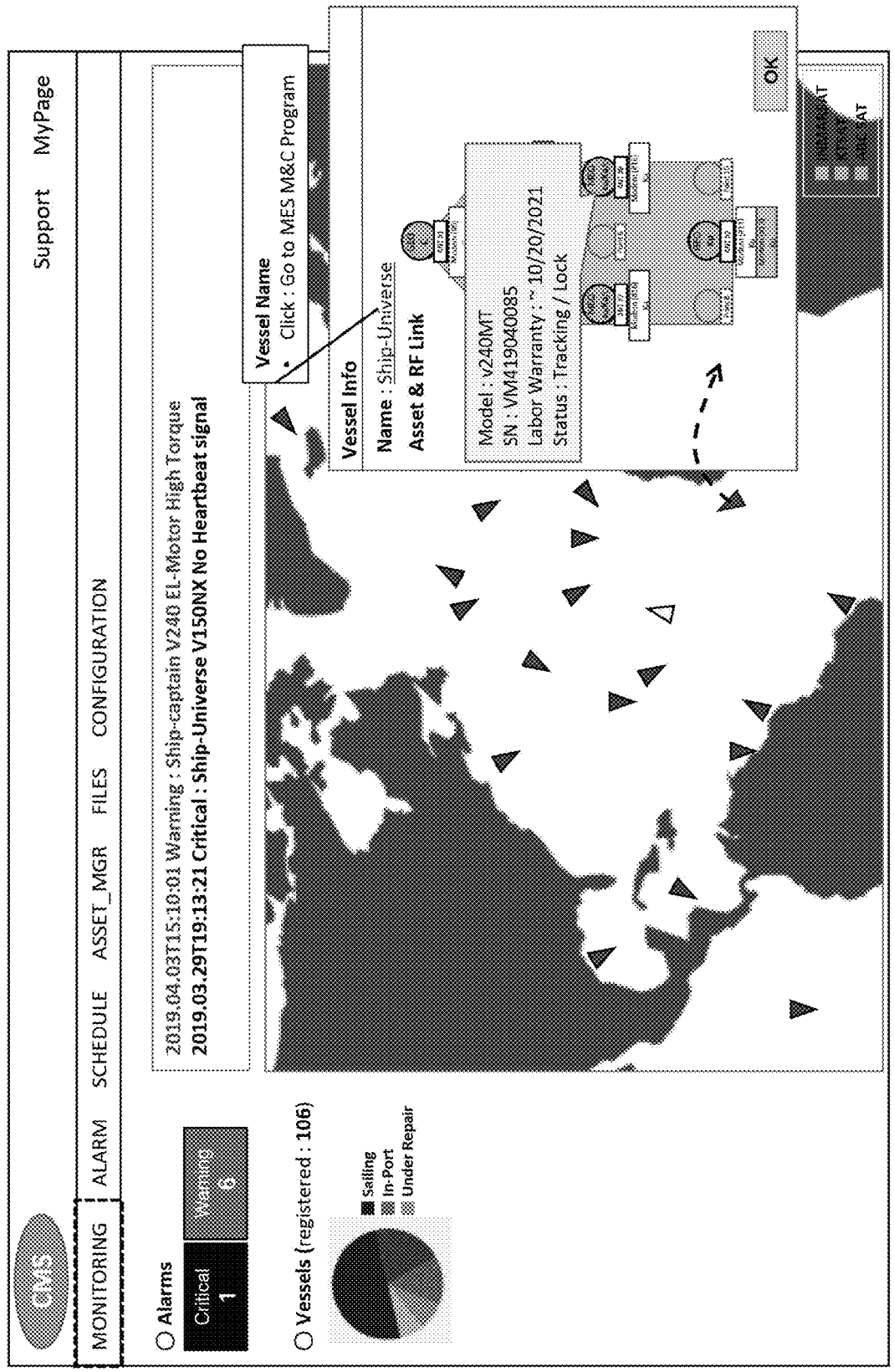
FIG. 27 illustrates another example of a UXI about monitoring data of a second processor.

Like an example of FIG. 27, a first processor 100 of FIG. 2 may display monitoring data about a plurality of mobile vehicles. The first processor 100 may provide an operation situation of a ship, an alarm count, a current location, a current alarm member on a map, and a detailed state of the ship.

The methods according to the above-described exemplary embodiments of the inventive concept may be implemented with program instructions which may be executed through various computer means and may be recorded in computer-readable media. The media may also include, alone or in combination with the program instructions, data files, data structures, and the like. The program instructions recorded in the media may be designed and configured specially for the exemplary embodiments of the inventive concept or be known and available to those skilled in computer software. Computer-readable media include magnetic media such as hard disks, floppy disks, and magnetic tape; optical media such as compact disc-read only memory (CD-ROM) disks and digital versatile discs (DVDs); magneto-optical media such as floptical disks; and hardware devices that are specially configured to store and perform program instructions, such as read-only memory (ROM), random access memory (RAM), flash memory, and the like. Program instructions include both machine codes, such as produced by a compiler, and higher level codes that may be executed by the computer using an interpreter. The described hardware devices may be configured to act as one or more software modules to perform the operations of the above-described exemplary embodiments of the inventive concept, or vice versa.

Software may include computer programs, codes, instructions or one or more combinations thereof and may configure a processing unit to operate in a desired manner or may independently or collectively control the processing unit. Software and/or data may be permanently or temporarily embodied in any type of machine, components, physical equipment, virtual equipment, computer storage media or units or transmitted signal waves so as to be interpreted by the processing unit or to provide instructions or data to the processing unit. Software may be dispersed throughout computer systems connected via networks and may be stored or executed in a dispersion manner. Software and data may be recorded in one or more computer-readable storage media.

While a few exemplary embodiments have been shown and described with reference to the accompanying drawings, it will be apparent to those skilled in the art that various modifications and variations can be made from the foregoing descriptions. For example, adequate effects may be achieved even if the foregoing processes and methods are carried out in different order than described above, and/or the aforementioned elements, such as systems, structures, devices, or circuits, are combined or coupled in different forms and modes than as described above or be substituted or switched with other components or equivalents.

Therefore, other implements, other embodiments, and equivalents to claims are within the scope of the following claims.

What is claimed is:

1. A satellite communication device, comprising:
   a first processor configured to generate schedule data about a satellite communication asset;
   a second processor located on a mobile vehicle spaced apart from the first processor and configured to generate a control signal based on the schedule data; and
   a mediator configured to dynamically switch a link between at least one antenna and at least one modem based on the control signal; and
   wherein the second processor is configured to receive location information of the second processor, obtain a communication speed, service cost information, and a bandwidth of each of a plurality of service providers which provide satellite communication based on the location information, and generate the control signal to change a service provider based on the communication speed, the service cost information, and the bandwidth.

2. A satellite communication method, comprising:
   generating schedule data about a satellite communication asset;
   generating a control signal based on the schedule data, on a mobile vehicle spaced apart from a location where the schedule data is generated; and
   dynamically switching a link between at least one antenna and at least one modem based on the control signal; and
   wherein the generating of the control signal includes:
   receiving location information of a point where the control signal is generated;
   obtaining a communication speed, service cost information, and a bandwidth of each of a plurality of service providers which provide satellite communication based on the location information; and
   generating the control signal to change a service provider based on the communication speed, the service cost information, and the bandwidth.

3. The satellite communication method of claim 2, wherein the schedule data includes a policy for the control signal, a condition for the control signal, and an instruction according to the policy and the condition.

4. The satellite communication method of claim 3, wherein the instruction includes a configuration parameter for the satellite communication asset.

5. A satellite communication device, comprising:
   a processor configured to generate a control signal based on schedule data; and
   a mediator configured to dynamically switch a link between at least one antenna and at least one modem based on the control signal, and
   wherein the processor is configured to receive location information of the processor, obtain a communication speed, service cost information, and a bandwidth of each of a plurality of service providers which provide satellite communication based on the location information, and generate the control signal to change a service provider based on the communication speed, the service cost information, and the bandwidth.

* * * * *